United States Patent
Shemy et al.

(10) Patent No.: US 12,399,718 B2
(45) Date of Patent: *Aug. 26, 2025

(54) APPARATUSES, METHODS, AND SYSTEMS FOR HASHING INSTRUCTIONS

(71) Applicant: Intel Corporation, Santa Clara, CA (US)

(72) Inventors: Regev Shemy, Kiryat Ata (IL); Zeev Sperber, Zichron Yackov (IL); Wajdi Feghali, Boston, MA (US); Vinodh Gopal, Westborough, MA (US); Amit Gradstein, Binyamina (IL); Simon Rubanovich, Haifa (IL); Sean Gulley, Sudbury, MA (US); Ilya Albrekht, Tempe, AZ (US); Jacob Doweck, Haifa (IL); Jose Yallouz, Haifa (IL); Ittai Anati, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,985

(22) Filed: Jun. 17, 2023

(65) Prior Publication Data
US 2024/0036865 A1    Feb. 1, 2024

Related U.S. Application Data

(63) Continuation of application No. 17/688,728, filed on Mar. 7, 2022, now Pat. No. 11,681,530, which is a
(Continued)

(51) Int. Cl.
G06F 9/30     (2018.01)
G06F 9/38     (2018.01)
H04L 9/06     (2006.01)

(52) U.S. Cl.
CPC ...... *G06F 9/30145* (2013.01); *G06F 9/30036* (2013.01); *G06F 9/30038* (2023.08);
(Continued)

(58) Field of Classification Search
None
See application file for complete search history.

(56) References Cited

U.S. PATENT DOCUMENTS 7,684,563 B1    3/2010    Olson et al.
8,160,242 B2    4/2012    Grinchuk et al.
(Continued)

FOREIGN PATENT DOCUMENTS

CN    101894229 A    11/2010
CN    107094369 A    8/2017
(Continued)

OTHER PUBLICATIONS

ARM Architecture Reference Manual, "ARMv8 and ARM v8-A architecture profile," ARM DDI 0487D.a, 110 Fulbourn Road, Cambridge, England CB1 9NJ, retrieved from https://static.docs.arm.com/ddi0487/da/DDI0487D_a_armv8_arm.pdf?_ga=2.118486921.1618531128.155259426 . . . , 2013-2018, 7476 pages.
(Continued)

*Primary Examiner* — Michael Sun
(74) *Attorney, Agent, or Firm* — NICHOLSON DE VOS WEBSTER & ELLIOTT LLP

(57) ABSTRACT

Systems, methods, and apparatuses relating to performing hashing operations on packed data elements are described. In one embodiment, a processor includes a decode circuit to decode a single instruction into a decoded single instruction, the single instruction including at least one first field that identifies eight 32-bit state elements A, B, C, D, E, F, G, and H for a round according to a SM3 hashing standard and at least one second field that identifies an input message; and
(Continued)

an execution circuit to execute the decoded single instruction to: rotate state element C left by 9 bits to form a rotated state element C, rotate state element D left by 9 bits to form a rotated state element D, rotate state element G left by 19 bits to form a rotated state element G, rotate state element H left by 19 bits to form a rotated state element H, perform two rounds according to the SM3 hashing standard on the input message and state element A, state element B, rotated state element C, rotated state element D, state element E, state element F, rotated state element G, and rotated state element H to generate an updated state element A, an updated state element B, an updated state element E, and an updated state element F, and store the updated state element A, the updated state element B, the updated state element E, and the updated state element F into a location specified by the single instruction.

24 Claims, 36 Drawing Sheets

Related U.S. Application Data continuation of application No. 17/537,373, filed on Nov. 29, 2021, now Pat. No. 11,567,772, which is a continuation of application No. 17/087,536, filed on Nov. 2, 2020, now Pat. No. 11,188,335, which is a continuation of application No. 16/370,459, filed on Mar. 29, 2019, now Pat. No. 10,824,428.

(52) U.S. Cl.
CPC ...... *G06F 9/30043* (2013.01); *G06F 9/30196* (2013.01); *G06F 9/3887* (2013.01); *G06F 9/3888* (2023.08); *H04L 9/0643* (2013.01)

(56) References Cited

U.S. PATENT DOCUMENTS

| | | | |
|---|---|---|---|
| 8,856,546 B2 | 10/2014 | Gueron et al. | |
| 9,027,104 B2 | 5/2015 | Wolrich et al. | |
| 9,658,854 B2* | 5/2017 | Wolrich | G06F 9/30036 |
| 9,985,648 B1 | 5/2018 | Wu et al. | |
| 10,148,428 B2* | 12/2018 | Wolrich | G06F 9/30145 |
| 10,152,326 B2 | 12/2018 | Yap et al. | |
| 10,503,510 B2 | 12/2019 | Wolrich et al. | |
| 10,686,591 B2 | 6/2020 | Wolrich et al. | |
| 2005/0089160 A1 | 4/2005 | Crispin et al. | |
| 2010/0250966 A1* | 9/2010 | Olson | G06F 9/3836 712/205 |
| 2011/0142228 A1 | 6/2011 | Crispin et al. | |
| 2012/0128149 A1 | 5/2012 | Boersma et al. | |
| 2014/0093069 A1 | 4/2014 | Wolrich et al. | |
| 2014/0195782 A1 | 7/2014 | Yap et al. | |
| 2015/0006856 A1 | 1/2015 | Rash et al. | |
| 2015/0186139 A1* | 7/2015 | Wolrich | H04L 9/0643 712/208 |
| 2015/0280917 A1 | 10/2015 | Wolrich et al. | |
| 2016/0070931 A1* | 3/2016 | Gueron | G06F 9/30007 380/28 |
| 2016/0092688 A1* | 3/2016 | Wolrich | G06F 9/30036 713/190 |
| 2017/0255469 A1 | 9/2017 | Wolrich et al. | |
| 2019/0095202 A1 | 3/2019 | Malladi et al. | |
| 2022/0188114 A1 | 6/2022 | Shemy et al. | |

FOREIGN PATENT DOCUMENTS

| | | |
|---|---|---|
| CN | 108959123 A | 12/2018 |
| CN | 109508206 A | 3/2019 |
| CN | 114510272 A | 5/2022 |
| CN | 114546490 A | 5/2022 |
| EP | 3189617 A1 | 7/2017 |
| EP | 3343357 A1 | 7/2018 |
| WO | 2016/036491 A1 | 3/2016 |

OTHER PUBLICATIONS

European Search Report and Search Opinion, EP App. No. 20156066.1, Aug. 25, 2020, 9 pages.
European Search Report and Search Opinion, EP App. No. 22156135.0, Mar. 28, 2022, 11 pages.
European Search Report and Search Opinion, EP App. No. 22161283.1, Mar. 28, 2022, 10 pages.
FIPS PUB 180-4, "Secure Hash Standard (SHS)," Information Technology Laboratory, National Institute of Standards and Technology, publication available from http://dx.doi.org/10.6028/NIST.FIPS.180-4, Aug. 2015, 36 pages.
Intel, "Intel 64 and IA-32 Architectures Software Developer's Manual", Combined vols. 1, 2A, 2B, 2C, 2D, 3A, 3B, 3C, 3D and 4, Order No. 325462-069US, https://software.intel.com/sites/default/files/managed/39/c5/325462-sdm-vol-1-2abcd-3abcd.pdf, Jan. 2019, 4898 pages.
Notice of Allowance, U.S. Appl. No. 16/370,459, Jun. 25, 2020, 10 pages.
Notice of Allowance, U.S. Appl. No. 17/087,536, Aug. 5, 2021, 10 pages.
Notice of Allowance, U.S. Appl. No. 17/537,373, Nov. 14, 2022, 2 pages.
Notice of Allowance, U.S. Appl. No. 17/537,373, Oct. 6, 2022, 10 pages.
Notice of Allowance, U.S. Appl. No. 17/688,728, Feb. 13, 2023, 10 pages.
Notice of Allowance, U.S. Appl. No. 17/688,728, May 17, 2023, 2 pages.
Office Action, EP App. No. 20156066.1, Apr. 1, 2022, 5 pages.
Office Action, EP App. No. 20156066.1, Aug. 5, 2022, 4 pages.
Office Action, EP App. No. 22156135.0, Feb. 20, 2023, 4 pages.
Office Action, EP App. No. 22161283.1, Feb. 20, 2023, 4 pages.
Shen S., et al., "The SM3 Cryptographic Hash Function draft-sca-cfrg-sm3-02," Network Working Group, Internet-Draft, https://tools.ietf.org/html/draft-sca-cfrg-sm3-02, Jan. 8, 2018, 71 pages.
Wikipedia, "SHA-2," Retrieved from https://en.wikipedia.org/wiki/SHA-2 on Mar. 26, 2019, 8 pages.
Intention to Grant, EP App. No. 22156135.0, Jun. 26, 2024, 6 pages.
Intention to Grant, EP App. No. 22161283.1, Jun. 19, 2024, 6 pages.
Intention to Grant, EP App. No. 20156066.1, Feb. 5, 2024, 6 pages.
Bin et al., "Implementation of Extended Instruction Set for AES Fast Algorithm", vol. 40 No. 6, Jun. 2012, 7 pages.
First Office Action, CN App. No. 202210136333.1, Apr. 18, 2025, 13 pages (6 pages of English Translation and 7 pages of Original Document).
Li et al., "Efficient Implementation for Hash Function SHA-512", vol. 33 No.7, Apr. 2007, 4 pages.
Office Action, CN App. No. 202210347963.3, Jun. 5, 2025, 07 pages of Original Document only.

* cited by examiner $ABCDEFGH \leftarrow V^{(i)}$

FOR $j = 0$ TO 63

$SS1 \leftarrow ((A \lll 12) + E + (T_j \lll j)) \lll 7$ $SS2 \leftarrow SS1 \oplus ((A \lll 12))$ $TT1 \leftarrow FF_j(A,B,C) + D + SS2 + W'_j$ $TT2 \leftarrow GG_j(E,F,G) + H + SS1 + W_j$ $D \leftarrow C$ $C \leftarrow B \lll 9$ $B \leftarrow A$ $A \leftarrow TT1$ $H \leftarrow G$ $G \leftarrow F \lll 19$ $F \leftarrow E$ $E \leftarrow P_0(TT2)$

ENDFOR $V^{(i+1)} \leftarrow ABCDEFGH \oplus V^{(i)}$

312

SINGLE ROUND 313

```
FETCH A SINGLE INSTRUCTION HAVING AN OPCODE THAT INDICATES TWO ROUNDS OF
HASHING ACCORDING TO A SM3 HASHING STANDARD ARE TO BE PERFORMED AND AT
LEAST ONE FIRST FIELD THAT IDENTIFIES EIGHT (E.G., 32-BIT) STATE ELEMENTS A, B, C,
D, E, F, G, AND H FOR A ROUND ACCORDING TO THE SM3 HASHING STANDARD AND AT
LEAST ONE SECOND FIELD THAT IDENTIFIES AN INPUT MESSAGE (E.G., AND A LOCATION
TO WRITE A RESULTANT) 502
```
↓
```
DECODE THE SINGLE INSTRUCTION INTO A DECODED SINGLE INSTRUCTION 504
```
↓
```
RETRIEVE DATA ASSOCIATED WITH THE IDENTIFIED SOURCE OPERANDS 506
```
↓
```
SCHEDULE THE DECODED SINGLE INSTRUCTION FOR EXECUTION 508
```
↓
```
EXECUTE THE DECODED SINGLE INSTRUCTION TO ROTATE STATE ELEMENT C LEFT BY
9 BITS TO FORM A ROTATED STATE ELEMENT C, ROTATE STATE ELEMENT D LEFT BY 9
BITS TO FORM A ROTATED STATE ELEMENT D, ROTATE STATE ELEMENT G LEFT BY 19
BITS TO FORM A ROTATED STATE ELEMENT G, ROTATE STATE ELEMENT H LEFT BY 19
BITS TO FORM A ROTATED STATE ELEMENT H, AND
PERFORM TWO ROUNDS ACCORDING TO THE SM3 HASHING STANDARD ON THE INPUT
MESSAGE AND STATE ELEMENT A, STATE ELEMENT B, ROTATED STATE ELEMENT C,
ROTATED STATE ELEMENT D, STATE ELEMENT E, STATE ELEMENT F, ROTATED STATE
ELEMENT G, AND ROTATED STATE ELEMENT H TO GENERATE AN UPDATED STATE
ELEMENT A, AN UPDATED STATE ELEMENT B, AN UPDATED STATE ELEMENT E, AND AN
UPDATED STATE ELEMENT F
510
```
↓
```
COMMIT THE EXECUTED INSTRUCTION TO STORE THE UPDATED STATE ELEMENT A,
THE UPDATED STATE ELEMENT B, THE UPDATED STATE ELEMENT E, AND THE UPDATED
STATE ELEMENT F INTO A LOCATION SPECIFIED BY THE SINGLE INSTRUCTION 512
```

┌─────────────────────────────────────────────────────────────────────┐
│ FETCH A SINGLE INSTRUCTION HAVING AN OPCODE THAT INDICATES A PRE-ROTATION │
│ ACCORDING TO A SM3 HASHING STANDARD IS TO BE PERFORMED AND AT LEAST ONE │
│ FIELD THAT IDENTIFIES FOUR (E.G., 32-BIT) INITIAL STATE ELEMENTS C, D, G, AND H FOR │
│ AN INITIAL ROUND OF A DATA BLOCK (E.G., FOR INPUT INTO SINGLE INSTRUCTION │
│ VSM3RNDS2) ACCORDING TO THE SM3 HASHING STANDARD (E.G., AND A LOCATION TO │
│ WRITE A RESULTANT) 702 │
└─────────────────────────────────────────────────────────────────────┘
                                   ↓
┌─────────────────────────────────────────────────────────────────────┐
│ DECODE THE SINGLE INSTRUCTION INTO A DECODED SINGLE INSTRUCTION 704 │
└─────────────────────────────────────────────────────────────────────┘
                                   ↓
┌─────────────────────────────────────────────────────────────────────┐
│ RETRIEVE DATA ASSOCIATED WITH THE IDENTIFIED SOURCE OPERAND 706 │
└─────────────────────────────────────────────────────────────────────┘
                                   ↓
┌─────────────────────────────────────────────────────────────────────┐
│ SCHEDULE THE DECODED SINGLE INSTRUCTION FOR EXECUTION 708 │
└─────────────────────────────────────────────────────────────────────┘
                                   ↓
┌─────────────────────────────────────────────────────────────────────┐
│ EXECUTE THE DECODED SINGLE INSTRUCTION TO ROTATE INITIAL STATE ELEMENT C │
│ RIGHT BY 9 BITS TO FORM A PRE-ROTATED STATE ELEMENT C, ROTATE INITIAL STATE │
│ ELEMENT D RIGHT BY 9 BITS TO FORM A PRE-ROTATED STATE ELEMENT D, ROTATE │
│ INITIAL STATE ELEMENT G RIGHT BY 19 BITS TO FORM A PRE-ROTATED STATE ELEMENT │
│ G, ROTATE INITIAL STATE ELEMENT H RIGHT BY 19 BITS TO FORM A PRE-ROTATED │
│ STATE ELEMENT H │
│ 710 │
└─────────────────────────────────────────────────────────────────────┘
                                   ↓
┌─────────────────────────────────────────────────────────────────────┐
│ COMMIT THE EXECUTED INSTRUCTION TO STORE THE PRE-ROTATED STATE ELEMENT │
│ C, PRE-ROTATED STATE ELEMENT D, PRE-ROTATED STATE ELEMENT G, AND PRE- │
│ ROTATED STATE ELEMENT H INTO A LOCATION SPECIFIED BY THE SINGLE INSTRUCTION │
│ 712 │
└─────────────────────────────────────────────────────────────────────┘

FETCH A SINGLE INSTRUCTION HAVING AN OPCODE THAT INDICATES A POST-ROTATION ACCORDING TO A SM3 HASHING STANDARD IS TO BE PERFORMED AND AT LEAST ONE FIELD THAT IDENTIFIES FOUR (E.G., 32-BIT) UPDATED STATE ELEMENTS C, D, G, AND H GENERATED (E.G., BY SINGLE INSTRUCTION VSM3RNDS2) FOR A FINAL ROUND OF A DATA BLOCK ACCORDING TO THE SM3 HASHING STANDARD (E.G., AND A LOCATION TO WRITE A RESULTANT) 902

DECODE THE SINGLE INSTRUCTION INTO A DECODED SINGLE INSTRUCTION 904

RETRIEVE DATA ASSOCIATED WITH THE IDENTIFIED SOURCE OPERAND 906

SCHEDULE THE DECODED SINGLE INSTRUCTION FOR EXECUTION 908

EXECUTE THE DECODED SINGLE INSTRUCTION TO ROTATE UPDATED STATE ELEMENT C LEFT BY 9 BITS TO FORM A FINAL STATE ELEMENT C OF THE DATA BLOCK, ROTATE UPDATED STATE ELEMENT D LEFT BY 9 BITS TO FORM A FINAL STATE ELEMENT D OF THE DATA BLOCK, ROTATE UPDATED STATE ELEMENT G LEFT BY 19 BITS TO FORM A FINAL STATE ELEMENT G OF THE DATA BLOCK, ROTATE UPDATED STATE ELEMENT H LEFT BY 19 BITS TO FORM A FINAL STATE ELEMENT H OF THE DATA BLOCK 910

COMMIT THE EXECUTED INSTRUCTION TO STORE THE FINAL STATE ELEMENT C, THE FINAL STATE ELEMENT D, THE FINAL STATE ELEMENT D, AND THE FINAL STATE ELEMENT H INTO A LOCATION SPECIFIED BY THE SINGLE INSTRUCTION 912

```
┌─────────────────────────────────────────────────────────────────────────┐
│ FETCH A SINGLE INSTRUCTION HAVING AN OPCODE THAT INDICATES TWO ROUNDS OF│
│ HASHING ACCORDING TO A SHA512 HASHING STANDARD ARE TO BE PERFORMED AND  │
│ AT LEAST ONE FIRST FIELD THAT IDENTIFIES EIGHT (E.G., 64-BIT) STATE     │
│ ELEMENTS A, B, C, D, E, F, G, AND H FOR A ROUND ACCORDING TO THE SHA512 │
│ HASHING STANDARD AND AT LEAST ONE SECOND FIELD THAT IDENTIFIES AN INPUT │
│ MESSAGE (E.G., AND A LOCATION TO WRITE A RESULTANT) 1802                │
└─────────────────────────────────────────────────────────────────────────┘
                                    │
                                    ▼
┌─────────────────────────────────────────────────────────────────────────┐
│ DECODE THE SINGLE INSTRUCTION INTO A DECODED SINGLE INSTRUCTION 1804    │
└─────────────────────────────────────────────────────────────────────────┘
                                    │
                                    ▼
┌─────────────────────────────────────────────────────────────────────────┐
│ RETRIEVE DATA ASSOCIATED WITH THE IDENTIFIED SOURCE OPERANDS 1806       │
└─────────────────────────────────────────────────────────────────────────┘
                                    │
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  SCHEDULE THE DECODED SINGLE INSTRUCTION FOR EXECUTION 1808
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                    │
                                    ▼
┌─────────────────────────────────────────────────────────────────────────┐
│ EXECUTE THE DECODED SINGLE INSTRUCTION TO PERFORM TWO ROUNDS            │
│ ACCORDING TO THE SHA512 HASHING STANDARD ON THE INPUT MESSAGE AND STATE │
│ ELEMENTS A, B, C, D, E, F, G, AND H TO GENERATE AN UPDATED STATE        │
│ ELEMENT A, AN UPDATED STATE ELEMENT B, AN UPDATED STATE ELEMENT E, AND  │
│ AN UPDATED STATE ELEMENT F 1810                                         │
└─────────────────────────────────────────────────────────────────────────┘
                                    │
                                    ▼
┌─────────────────────────────────────────────────────────────────────────┐
│ COMMIT THE EXECUTED INSTRUCTION TO STORE THE UPDATED STATE ELEMENT A,   │
│ THE UPDATED STATE ELEMENT B, THE UPDATED STATE ELEMENT E, AND THE       │
│ UPDATED STATE ELEMENT F INTO A LOCATION SPECIFIED BY THE SINGLE         │
│ INSTRUCTION 1812                                                        │
└─────────────────────────────────────────────────────────────────────────┘
```

*FIG. 18*

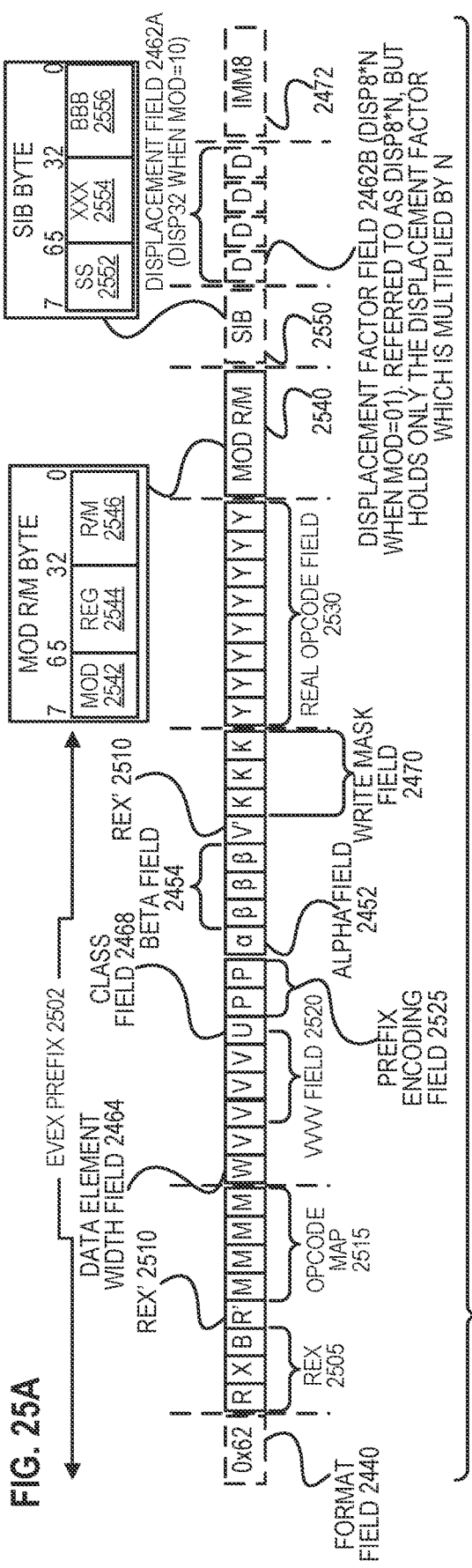
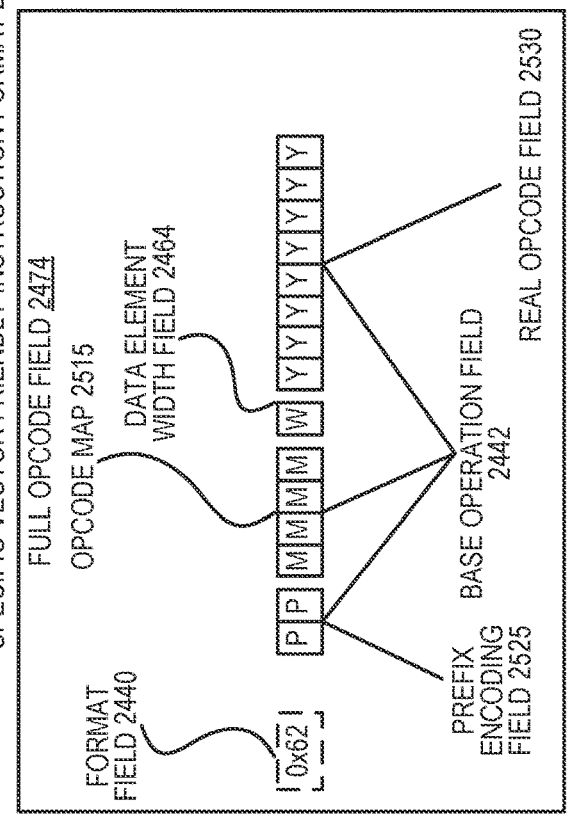
FIG. 25A
FIG. 25B
FIG. 25C

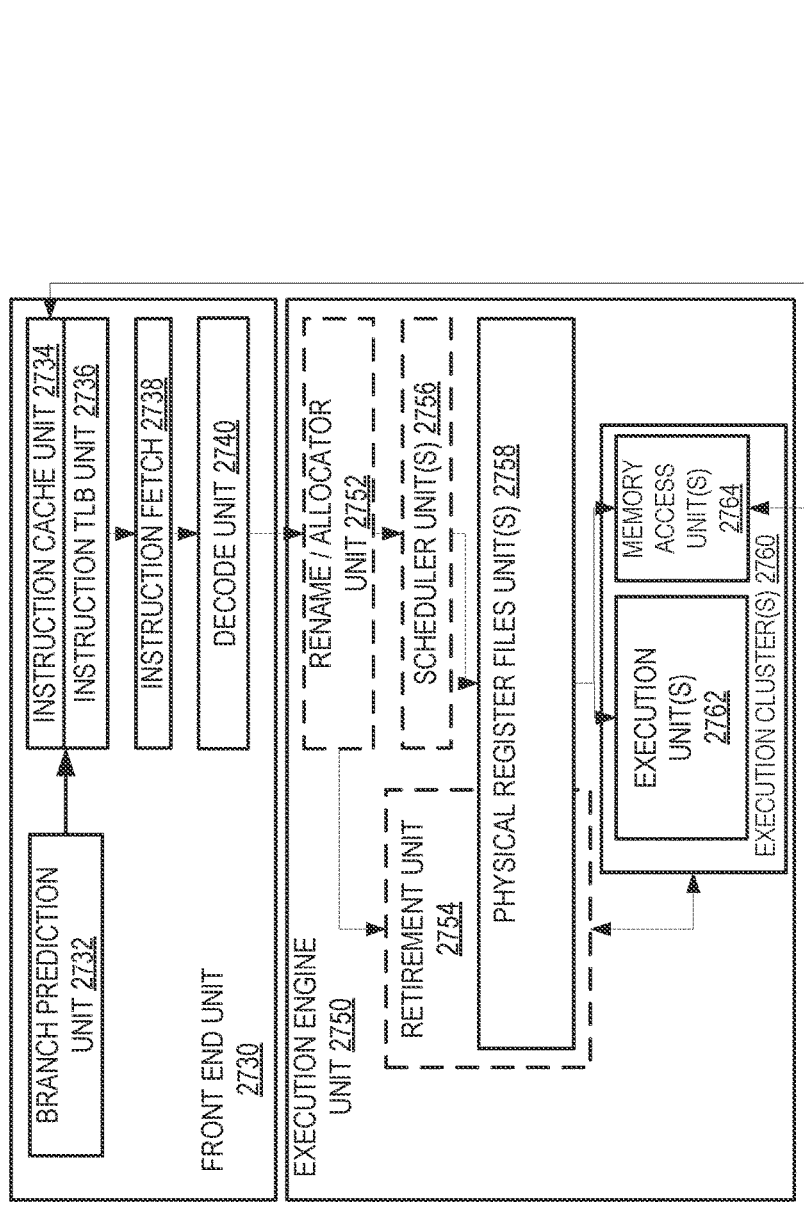
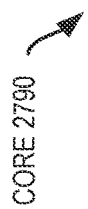
FIG. 27A
FIG. 27B

APPARATUSES, METHODS, AND SYSTEMS FOR HASHING INSTRUCTIONS

CROSS-REFERENCE TO RELATED APPLICATIONS

The present application is a continuation application claiming priority from U.S. patent application Ser. No. 17/688,728 filed Mar. 7, 2022, now U.S. Pat. No. 11,681,530, which is a continuation application claiming priority from U.S. patent application Ser. No. 17/537,373 filed Nov. 29, 2021, now U.S. Pat. No. 11,567,7724, which is a continuation application claiming priority from U.S. patent application Ser. No. 17/087,536 filed Nov. 2, 2020, now U.S. Pat. No. 11,188,335, which is a continuation application claiming priority from U.S. patent application Ser. No. 16/370,459 filed Mar. 29, 2019, now U.S. Pat. No. 10,824,428, each of which is incorporated herein by reference in its entirety.

TECHNICAL FIELD

The disclosure relates generally to electronics, and, more specifically, an embodiment of the disclosure relates to processor circuitry for hashing operations.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode circuit decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates a compression function of a SM3 hashing standard according to embodiments of the disclosure.

FIG. 5 illustrates a method of processing a hashing instruction according to a SM3 hashing standard according to embodiments of the disclosure.

FIG. 7 illustrates a method of processing a pre-rotation instruction according to a SM3 hashing standard according to embodiments of the disclosure.

FIG. 9 illustrates a method of processing a post-rotation instruction according to a SM3 hashing standard according to embodiments of the disclosure.

FIG. 18 illustrates a method of processing a hashing instruction according to a SHA512 hashing standard according to embodiments of the disclosure.

FIG. 25A is a block diagram illustrating fields for the generic vector friendly instruction formats in FIGS. 24A and 24B according to embodiments of the disclosure.

FIG. 25B is a block diagram illustrating the fields of the specific vector friendly instruction format in FIG. 25A that make up a full opcode field according to one embodiment of the disclosure.

FIG. 25C is a block diagram illustrating the fields of the specific vector friendly instruction format in FIG. 25A that make up a register index field according to one embodiment of the disclosure.

FIG. 27A is a block diagram illustrating both an exemplary in-order pipeline and an exemplary register renaming, out-of-order issue/execution pipeline according to embodiments of the disclosure.

FIG. 27B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
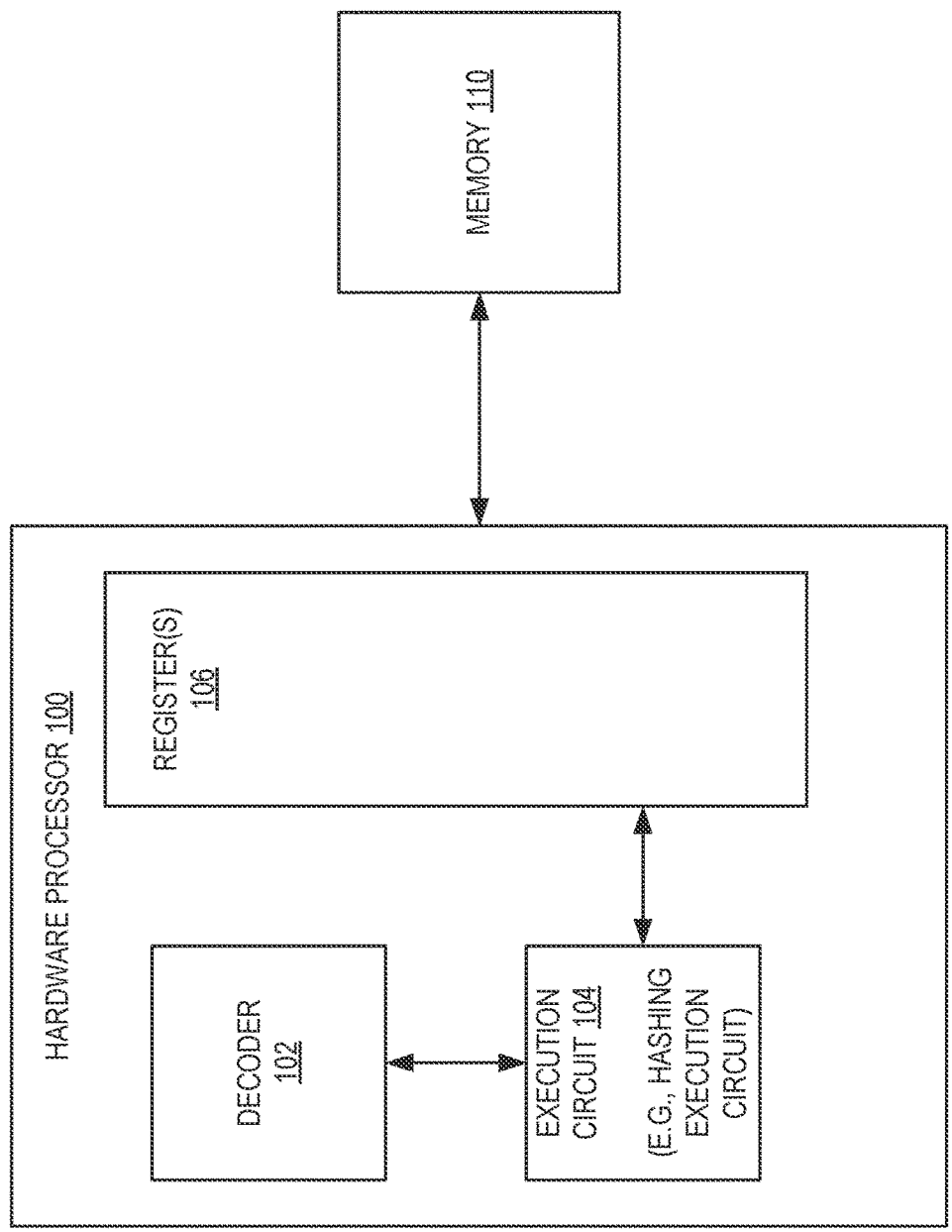
FIG. 1 illustrates a hardware processor coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform a hashing operation or operations. For example, software may request a hashing operation and a hardware processor (e.g., a core or cores thereof) may perform the operation in response to the request. One non-limiting example of a hashing operation is a round (or rounds) of hashing according to a (e.g., cryptographic) hashing standard. A hashing standard may include one or more hash functions that take a message as an input, generate a corresponding hash value or digest by applying the hash function(s) to the message, and output the hash value or digest. The hash value may include an updated state word. Typically, the same hash value (or digest) should be generated if the same hash function is evaluated with the same message. Such hash functions are used for various purposes, such as for verification (e.g., verifying the integrity of files, data, or messages), identification (e.g., identifying files, data, or messages), authentication (e.g., generating message authentication codes), generating digital signatures, generating pseudorandom numbers, etc. As one illustrative example, a hash function is used to generate a hash value for a given (input) message. At a later time, a hash value may be recomputed for the given message using the same hash function. If the hash values are identical, then it can be assumed that the message has not been changed. In contrast, if the hash values are different, then it can be assumed that the message has been changed.

One example of a hashing standard is a SM3 hashing standard. A SM3 hashing standard has been published by the Chinese Commercial Cryptography Association Office and approved by the Chinese government. An English language description of a SM3 hashing standard has been published as the Internet Engineering Task Force (IETF) and titled "The SM3 Cryptographic Hash Function" by S. Shen et al, on Jan. 8, 2018. In one embodiment, a SM3 hashing standard takes an input message as 512-bit blocks (e.g., with 32-bit elements) and generates a 256-bit hash (or digest) value. Certain embodiments herein provide for an instruction or instructions (e.g., as discussed in reference to FIGS. 3-16) that are improvements to the functioning of a processor (e.g., of a computer) itself. For example, including dedicated instruction(s) for a SM3 hashing standard reduces power consumption, reduces the total number of instructions to be decoded/executed to generate a hash (or digest) output value, and increases the performance (e.g., speed of execution) of a hashing operation according to a SM3 hashing standard. Instruction decode circuitry (e.g., a decoder) not having such an instruction as a part of its instruction set would not decode as discussed herein. An execution circuit not having such an instruction as a part of its instruction set would not execute as discussed herein.

Another example of a hashing standard is a SHA512 (or SHA384) hashing standard. A SHA512 (and SHA384) hashing standard has been published in August 2015 by the National Institute of Standards and Technology (NIST) as "Federal Information Processing Standard (FIPS) 180-4 and titled "Secure Hash Standard (SHS)". In one embodiment, a SHA512 hashing standard takes an input message as 1024-bit blocks (e.g., with 64-bit elements) and generates a 512-bit hash (or message digest) value. Certain embodiments herein provide for an instruction or instructions (e.g., as discussed in reference to FIGS. 17-23) that are improvements to the functioning of a processor (e.g., of a computer) itself. For example, including dedicated instruction(s) for a SHA512 hashing standard reduces power consumption, reduces the total number of instructions to be decoded/executed to generate a hash (or digest) output value, and increases the performance (e.g., speed of execution) of a hashing operation according to a SHA512 hashing standard. Instruction decode circuitry (e.g., a decoder) not having such an instruction as a part of its instruction set would not decode as discussed herein. An execution circuit not having such an instruction as a part of its instruction set would not execute as discussed herein.

FIG. 1 illustrates a hardware processor 100 coupled to a memory 110 according to embodiments of the disclosure. Depicted hardware processor 100 includes a hardware decode circuit 102 (e.g., decode unit or decoder) and a hardware execution circuit 104 (e.g., execution unit). Depicted hardware processor 100 includes register(s) 106. Registers may include one or more registers to perform operations in, e.g., additionally or alternatively to access of (e.g., load or store) data in memory 110. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decode circuit 102 may receive an (e.g., single) instruction (e.g., macro-instruction) and decode the instruction, e.g., into micro-instructions and/or micro-operations. Hardware execution circuit 104 may execute the decoded instruction (e.g., macro-instruction) to perform an operation or operations. For example, an instruction to be decoded by decode circuit 102 and for the decoded instruction to be executed by execution circuit 104 may be any instruction discussed herein, e.g., in FIGS. 3-23. Hardware execution circuit 104 may be any of the execution circuits in the Figures. In certain embodiment, hardware execution circuit 104 is (e.g., only) a hashing execution circuit, for example, that is utilized separately from a general execution circuit or execution unit (e.g., one that performs non-hashing specific instructions).

The decode circuit 102, execution circuit 104, and registers 106 may be of a single core of the processor, e.g., and multiple cores each with an instance of the circuitry may be included. The processor (e.g., and core thereof) may be a processor and/or core according to any of the disclosure herein.

Figure 2:
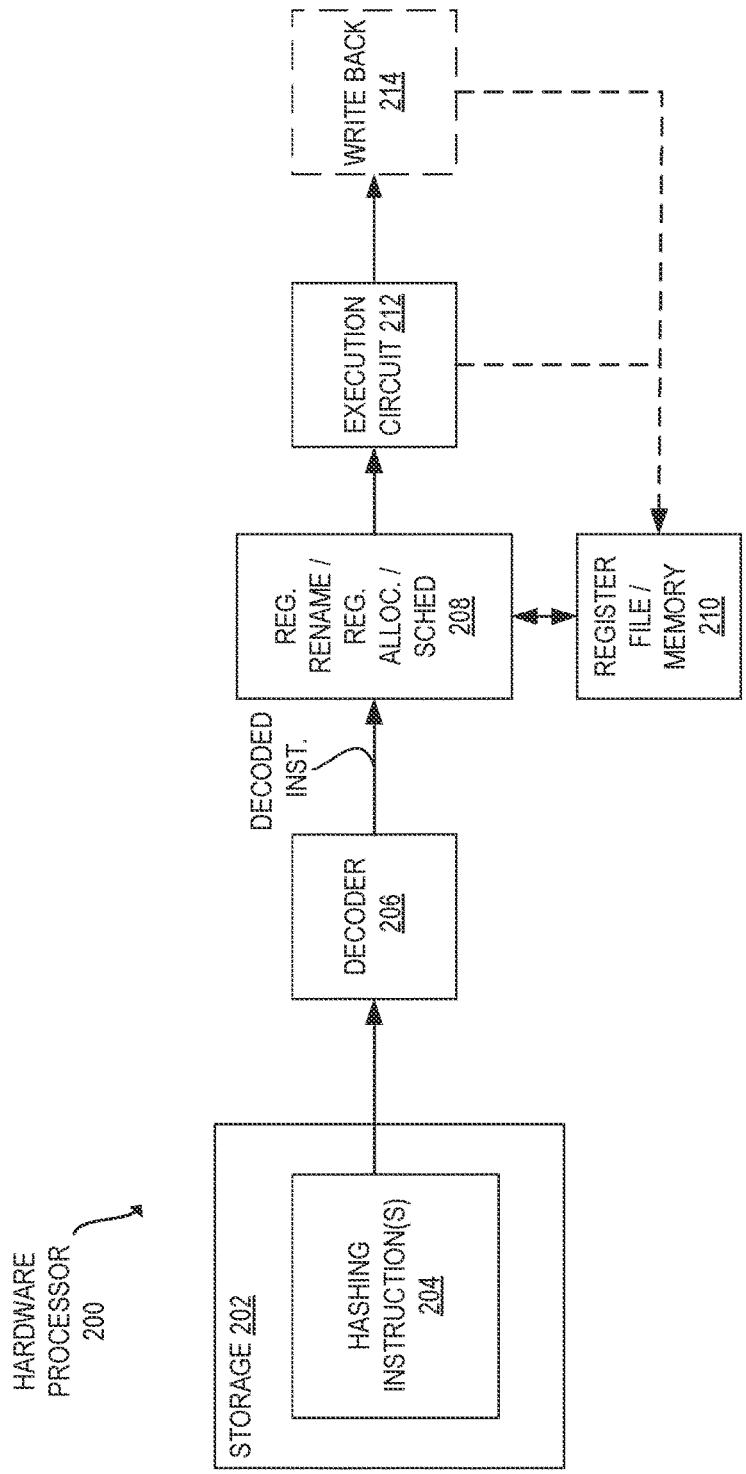
FIG. 2 illustrates a hardware processor coupled to storage that includes one or more hashing instructions according to embodiments of the disclosure.

FIG. 2 illustrates a hardware processor 200 coupled to storage 202 that includes one or more hashing instructions 204 according to embodiments of the disclosure. In certain embodiments, a hashing instruction is according to any of the disclosure herein. In one embodiment, e.g., in response to a request to perform an operation, the instruction (e.g., macro-instruction) is fetched from storage 202 and sent to decode circuit 206. In the depicted embodiment, the decode circuit 206 (e.g., decoder) decodes the instruction into a decoded instruction (e.g., one or more micro-instructions or micro-operations). The decoded instruction is then sent for execution, e.g., via scheduler circuit 208 to schedule the decoded instruction for execution.

In certain embodiments, (e.g., where the processor/core supports out-of-order (OoO) execution), the processor includes a register rename/allocator circuit coupled to register file/memory circuit 210 (e.g., unit) to allocate resources and perform register renaming on registers (e.g., vector registers associated with a logical operation and test instruction). In certain embodiments, (e.g., for out-of-order execution), the processor includes one or more scheduler circuits 208 coupled to the decode circuit. The scheduler circuit(s) may schedule one or more operations associated with decoded instructions, including one or more operations decoded from a logical operation and test instruction, for execution on the execution circuit 212.

In certain embodiments, a write back circuit 214 is included to write back results of an instruction to a destination (e.g., write them to a register(s) and/or memory), for example, so those results are visible within a processor (e.g., visible outside of the execution circuit that produced those results).

One or more of these components (e.g., decode circuit 206, register rename/register allocator/scheduler 208, execution circuit 212, register file/memory 210, or write back circuit 214) may be in a single core of a hardware processor (e.g., and multiple cores each with an instance of these components. Hashing instruction 204 may be dedicated instruction(s) for a SM3 hashing standard. Hashing instruction 204 may be dedicated instruction(s) for a SHA512 hashing standard.

Instructions for a SM3 Hashing Standard

In certain embodiments, an SM3 hashing function accepts a message as input. The message may represent a bit string of arbitrary length. The SM3 hashing function performs a number of operations using the input message and generates a hash value or digest having a length of 256-bits after padding and iterative compression.

FIG. 3 illustrates a compression function 312 of a SM3 hashing standard according to embodiments of the disclosure.

Initially, the 256-bit state value V(i) is partitioned into eight 32-bit state elements (e.g., words) A, B, C, D, E, F, G, and H. The initial state value V(0) for the first iteration is a constant defined by the SM3 hashing function. The state words A through H are specified in big-endian format according to the SM3 hashing function but their format in an implementation may vary if desired.

An iterative procedure is then performed on the sequence of blocks. The depicted SM3 hashing standard includes sixty-four iterations or "rounds" (i.e., from j ranging from 0 to 63). As shown, a single round 313 includes a number of different operations. The leftward pointing arrow symbol (←) represents storing, assigning, or equating the value or parameter on the right to the value or parameter on the left. The symbol "<<<" represents a left rotate operation followed by a number of bits to rotate. The symbol ">>>" represents a right rotate operation followed by a number of bits to rotate. The symbol of the encircled plus sign (⊕) represents a logical exclusive OR (XOR) operation. Tj is a constant having a value as specified in the SM3 hash function that depends on the iteration (i.e., the value of j). For example, Tj may have value. The variables SS1, SS2, TT1, and TT2 are internal 79cc4519 for $0 \leq j \leq 15$ and the value 7a879d8a for $16 \leq j \leq 63$ intermediate values used in the iterations.

FFj is a Boolean function which varies with round number (j) according to Function 1:

$$FFj(X, Y, Z) = X \text{ XOR } Y \text{ XOR } Z \, (0 \leq j \leq 15); \text{ or Function 1}$$
$$= (X \text{ AND } Y) OR (X \text{ AND } Z) OR (Y \text{ AND } Z) \, (16 \leq j \leq 63)$$

GGj is a Boolean function which varies with round number (j) according to Function 2:

$$GGj(X, Y, Z) = X \text{ XOR } Y \text{ XOR } Z \, (0 \leq j \leq 15); \text{ or Function 2}$$
$$= (X \text{ AND } Y) OR (\text{NOT } X \text{ AND } Z)(16 \leq j \leq 63)$$

P0 is a permutation function in compression function according to Function 3:

$$P0(X) = X \text{ XOR}(X <<< 9) \text{XOR}(X <<< 17) \quad \text{Function 3}$$

Notice that the term Wj is added to the evaluation of the Boolean function GGj. Also, the term W'j is added to the evaluation of the Boolean function FFj. The terms Wj and W'j represent message terms, message inputs, or simply messages. For iterations 0 to 15, the terms W0 to W15 are obtained from the 512-bit block being compressed. In particular, the 512-bit message block being compressed is divided or partitioned into sixteen 32-bit words referenced in big-endian format as W0 to W15. The remaining messages Wj and W'j are calculated during a message extension or message expansion portion of the SM3 hashing function.

The Wj messages for iterations 16 to 67 may be calculated according to the following Function 4:

$$Wj=P1(Wj\text{-}16 \text{ XOR } Wj\text{-}9 \text{ XOR}(Wj\text{-}3<<<15))\text{XOR} \\ (Wj\text{-}13<<<7)\text{XOR } Wj\text{-}6 \qquad \text{Function 4}$$

In Function 4, P1(X) is a permutation function for message expansion that is defined by the following Function 5:

$$P1(X)=X \text{ XOR}(X<<<15)\text{XOR}(X<<<23) \qquad \text{Function 5}$$

The Wj messages for iterations 16 to 67 may be calculated according to Function 4 with the permutation function P1 according to Function 5. Notice that the calculation of a Wj message for a given round (e.g., round j) depend on messages from earlier rounds. In particular, as can be readily seen in Function 4, the Wj message for a given round (e.g., round j) depends on the prior round messages Wj-16, Wj-13, Wj-9, Wj-6, and Wj-3. Wj-3 is the message from three rounds back relative to round j, Wj-16 is the message from sixteen rounds back relative to round j, and so on.

The W'j messages may be calculated or derived from the Wj messages according to the following Function 6:

$$W'j=Wj \text{ XOR } Wj+4 \qquad \text{Function 6}$$

Notice that the W'j message depends on the Wj message from the same round as well as on the Wj+4 message from four rounds ahead. Since W0 to W15 are divided or obtained from the 512-bit message block being compressed, messages W'0 to W'11 may be determined using Function 6 based on the initially known messages W0 to W15. The remaining messages W'12 to W'63 may be determined from messages W16 to W67, which may be calculated using Functions 4-5. Notice that W64 to W67 may be calculated, even though they are not input directly into the compression function, but are needed to calculate W'60 to W'63.

As shorthand herein, a value may include a round indicator with it (e.g., W[0] for round 0 of a value of a word or W[63] for round sixty-three of a value of a word) or not, but it should be understood that hashing by rounds allows for those values to be referenced by a round. Thus, in this disclosure, a value indicator may be assigned to a particular round. As one example, values W[i], W[i+1], W[i+4], W[i+5] where index i indicates the current round. For example, a first round (i=0) including the values (e.g., data words) of W[0], W[1], W[4] and W[5], and a third round (i=3) including the values W[2], W[3], W[6], and W[7] (e.g., each time 4 different message words). As another example, values A-H may be particular values for each round (e.g., "i"), for example, A[i], B[i], C[i], D[i], E[i], G[i], H[i] or $A_i$, $B_i$, $C_i$, $D_i$, $E_i$, $F_i$, $G_i$, $H_i$ depending on the naming format of the round references).

Figure 4A:
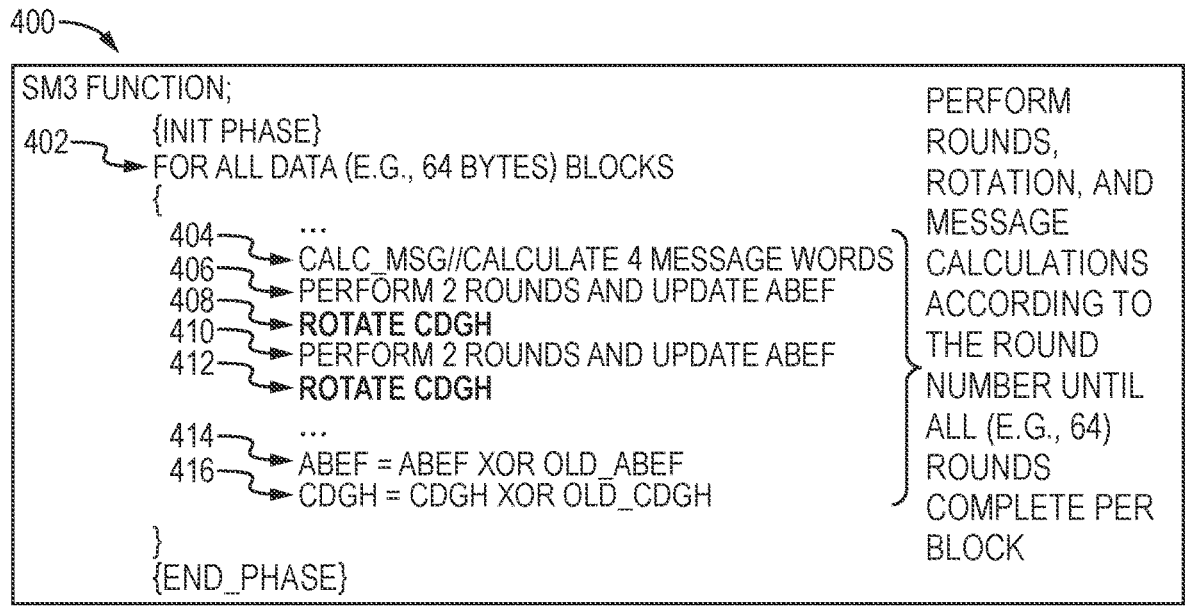
FIG. 4A illustrates a section of pseudocode to perform hashing according to a SM3 hashing standard according to embodiments of the disclosure.

FIG. 4A illustrates a section of pseudocode 400 to perform hashing according to a SM3 hashing standard according to embodiments of the disclosure. Pseudocode 400 is to perform hashing operations according to a SM3 hashing standard for each data block (e.g., which may be 512-bits, i.e., 64 bytes). Thus, for each block 402, a message calculation 404 (e.g., one or more message calculation instructions) is performed, followed by two rounds of hashing operations 406, a rotation of state words C, D, G, and H 408 (e.g., for that particular round), then additional sections of two rounds of hashing operations 410 and rotation of state words C, D, G, and H 412 (e.g., for that particular round), followed by a logical XOR (e.g., for each bit position) according to 414 and 416. Logical XOR operation produces an output of true (e.g., logical one) for each section (e.g., bit position) if an odd number of its multiple arguments (e.g., in a same section of each of the values being compared) are true, and false (e.g., logical zero) otherwise. In one embodiment, each rotation (408, 412, etc.) performed requires its own instruction, and thus consumes the resources of a set of stages of an instruction pipeline, e.g., fetch, decode, schedule, execution, and commit. In certain embodiments, the rotations (e.g., 408, 412) are repeated (e.g., sixteen times) until all (e.g., 64) rounds are complete per data block. For example, according to a SM3 hashing standard, each input block may include 64 bytes of input and thus will be using 32 calls for an instruction that performs two rounds of hashing operations (e.g., 406 or 410) with a corresponding 32 calls for a rotation instruction (e.g., 408 or 412).

In one embodiment, block 402 calculation is a block digest calculation that includes 64 rounds and message word calculations and rounds performed. In one embodiment, message calculation (e.g., 404) calculates a plurality (e.g., four) message words using either the input word or previous calculated words, calculating the next plurality (e.g., four) words relevant for the next rounds calculations. In certain embodiments, there are two (e.g., parallel) workloads: (i) message word calculation (e.g., using VSM3MSG1 and VSM3MSG2 instructions or input loading) for calculating the message words, and (ii) rounds calculation that uses the calculated message words. In one embodiment, these operations are iterated through for each round (e.g., other than the first 16 words read by input, and not by performing the VSM3MSG1 and VSM3MSG2 instructions).

Figure 4B:
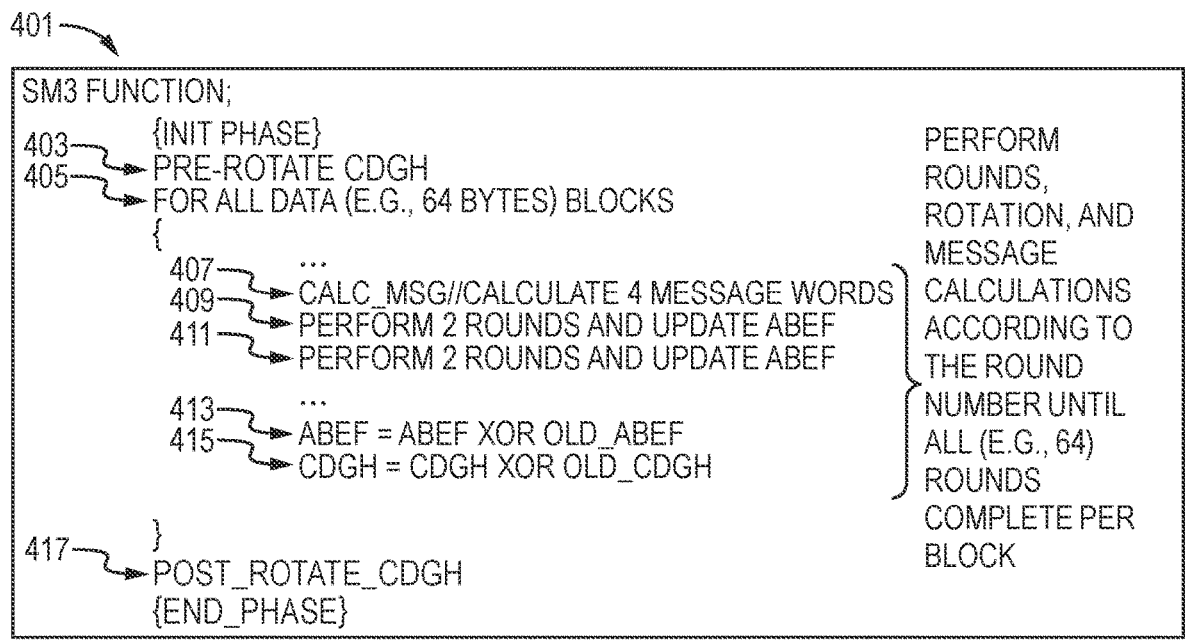
FIG. 4B illustrates another section of pseudocode to perform hashing according to a SM3 hashing standard according to embodiments of the disclosure.

FIG. 4B illustrates another section of pseudocode 401 to perform hashing according to a SM3 hashing standard according to embodiments of the disclosure. As compared to the pseudocode 400 in FIG. 4A, the pseudocode 401 in FIG. 4B includes a single instruction that performs both rotation of state elements C, D, G, and H and two rounds of hashing operations. Thus, for each block 405, a message calculation 407 (e.g., from the input data block or one or more message calculation instructions as discussed herein) is performed, followed by two rounds of hashing operations 409 that also perform (e.g., before the hashing operations) a rotation of state words C, D, G, and H, then one or more instances of additional instructions that each perform two rounds of hashing operations and rotation (e.g., before the hashing operations) of state words C, D, G, and H (411), followed by a logical XOR (e.g., for each bit position) according to 413 and 415 (e.g., for each single block of data). In one embodiment, the old value (e.g., OLD_ABEF and OLD_CDGH) is sourced from the first value of A-H (e.g., when starting each block such at the beginning the first A-H values are the initial values defined by A SM3 hashing standard).

For example, according to a SM3 hashing standard, each input block may include 64 bytes of input and thus will be using 32 calls for an instruction that performs two rounds of hashing operations that also performs (e.g., before the hashing operations) a rotation of state words C, D, G, and H (e.g., 409 or 411) without utilizing the processor resources for a corresponding 32 calls for a rotation instruction (e.g., 408 or 412 in FIG. 4A). Thus, embodiments of an instruction that performs two rounds of SM3 hashing operations that also performs (e.g., before the hashing operations) a rotation of SM3 state words C, D, G, and H reduces the total number of instructions in pseudocode 401 which saves power, processing resources, and time by removing the decoding, scheduling, committing, etc. for the removed 32 calls for a rotation instruction (e.g., 408 or 412 in FIG. 4A), e.g., for each block with additional pre rotation 403 and post rotation 417 called when iterating through the loop. Examples of an instruction that performs two rounds of SM3 hashing operations that also performs (e.g., before the hashing operations) a rotation of SM3 state words C, D, G, and H are discussed below in reference to FIGS. 5 and 6. Pre-rotate instruction 403 is discussed below in reference to FIGS. 7-8 and post-rotate instruction 417 is discussed below in reference to FIGS. 9-10.

In one embodiment, block 405 calculation is a block digest calculation that includes 64 rounds and message word calculations and rounds performed. In one embodiment, message calculation (e.g., 407) calculates a plurality (e.g., four) message words using either the input word or previous calculated words, calculating the next plurality (e.g., four) words relevant for the next rounds calculations. In certain embodiments, there are two (e.g., parallel) workloads: (i) message word calculation (e.g., using VSM3MSG1 and VSM3MSG2 instructions or input loading) for calculating the message words, and (ii) rounds calculation that uses the calculated message words. In one embodiment, these operations are iterated through for each round (e.g., other than the first 16 words read by input, and not by performing the VSM3MSG1 and VSM3MSG2 instructions).

FIG. 5 illustrates a method 500 of processing a (e.g., two rounds of) hashing instruction according to a SM3 hashing standard according to embodiments of the disclosure. A processor (e.g., or processor core) may perform method 500, e.g., in response to receiving a request to execute an instruction from software. Depicted method 500 includes processing a SM3 hashing standard instruction by: fetch a single instruction having an opcode that indicates two rounds of hashing according to a SM3 hashing standard are to be performed and at least one first field that identifies eight (e.g., 32-bit) state elements A, B, C, D, E, F, G, and H for a round (e.g., "i) according to the SM3 hashing standard and at least one second field that identifies an input message (e.g., and a location to write a resultant) at 502, decode the instruction into a decoded instruction at 504, retrieve data associated with the identified source operands at 506, (optionally) schedule the decoded instruction for execution at 508, execute the decoded instruction to rotate state element C left by 9 bits to form a rotated state element C, rotate state element D left by 9 bits to form a rotated state element D, rotate state element G left by 19 bits to form a rotated state element G, rotate state element H left by 19 bits to form a rotated state element H, and (e.g., after those rotations) perform two rounds according to the SM3 hashing standard on the input message and state element A, state element B, rotated state element C, rotated state element D, state element E, state element F, rotated state element G, and rotated state element H to generate an updated state element A, an updated state element B, an updated state element E, and an updated state element F at 510, and commit the executed instruction to store the updated state element A, the updated state element B, the updated state element E, and the updated state element F into a location specified by the single instruction at 512.

The opcode may correspond to (e.g., identifies) the vector instruction mnemonic of VSM3RNDS2 (where (optional usage of) "V" represents a vector operation (e.g., VEX as discussed below), "SM3" represents the hashing standard being SM3, and "RNDS2" represents (e.g., only) two rounds of hashing being formed by the single instruction.

In one embodiment, an instruction has the following format for its fields: VSM3RNDS2 SOURCE/DESTINATION, SOURCE 1, SOURCE 2// where source/destination is a first packed data source (e.g., register) and destination, source 1 is the second packed data source (e.g., register), and source 2 is the third packed data source (e.g., which may be a register or memory address). In one embodiment, each of the registers used is a (e.g., 128-bit) XMM register (e.g., XMM1, XMM2, etc.).

Pseudocode for the performance of this instruction may be as follows (e.g., where dword is a doubleword size of 32-bits for each element, [x] is an element position indexed with x being from 0 to n, where n−1 is the total number of elements, << is a left rotation (that wraps around) for a given number of bits, >> is a right rotation (that wraps around) for a given number of bits, A is a logical (e.g., binary) XOR operator, | is a logical (e.g., binary) OR operator that outputs a high bit (one) if either bit or both bits in a respective bit position is set to high (one), & is a logical (e.g., binary) AND operator, and ? is a conditional operator (e.g., if condition is true ? then value X: otherwise value Y):

```
// DEFINITIONS
#define ROTL32(x, n) (((x) << (n)) ^ ((x) >> (32-(n))))
#define P0(x) (x ^ rotl32(x, 9) ^ rotl32(x, 17))
#define P1(x) (x ^ rotl32(x, 15) ^ rotl32(x, 23))
#define FF0(x, y, z) (x ^ y ^ z)
#define FF1(x, y, z) (((x) & (y)) | ((x) & (z)) | ((y) & (z)))
#define GG0(x, y, z) (x ^ y ^z)
#define GG1(x, y, z) (((x) & (y)) ^ (~(x) & (z)))
#define FF(x, y, z, i) (i<16 ? FF0(x, y, z) : FF1(x, y, z))
#define GG(x, y, z, i) (i<16 ? GG0(x, y, z) : GG1(x, y, z))
// INSTRUCTION FLOW
A[0] = SRC1.dword[0]
B[0] = SRC1.dword[1]
C[0] = SRCDST.dword[0]
D[0] = SRCDST.dword[1]
E[0] = SRC1.dword[2]
F[0] = SRC1.dword[3]
G[0] = SRCDST.dword[2]
H[0] = SRCDST.dword[3]
W[0] = SRC2.dword[0]
W[1] = SRC2.dword[1]
W[4] = SRC2.dword[2]
W[5] = SRC2.dword[3]
C[0] = ROTL32(C[0], 9)
D[0] = ROTL32(D[0], 9)
G[0] = ROTL32(G[0], 19)
H[0] = ROTL32(H[0], 19)
CONST = IMM<16 ? (0x79cc4519 : 0x7a879d8a);
CONST = ROTL32(CONST,IMM)
FOR i in 0 to 1:
    S1 = ROTL32((ROTL32(A[i], 12) + E[i] + CONST), 7)
    S2 = S1 ^ ROTL32(A[i], 12)
    T1 = FF(A[i], B[i], C[i], IMM) + D[i] + S2 + W[i]^W[i+4]
    T2 = GG(E[i], F[i], G[i], IMM) + H[i] + S1 + W[i]
    D[i+1] = C[i]
    C[i+1] = ROTL32[B,9]
    B[i+1] = A[i]
    A[i+1] = T1
    H[i+1] = G[i]
    G[i+1] = ROTL32(F[i], 19)
    F[i+1] = E[i]
    E[i+1] = PO(T2)
SRCDST.dword[0] = A[2]
SRCDST.dword[1] = B[2]
SRCDST.dword[2] = E[2]
SRCDST.dword[3] = F[2]
```

Including such rotation operations (underlined in the above example) with a single instruction that also performs a round (e.g., two rounds) of an SM3 hashing standard thus improves the performance of a computer (e.g., processor thereof).

Figure 6:
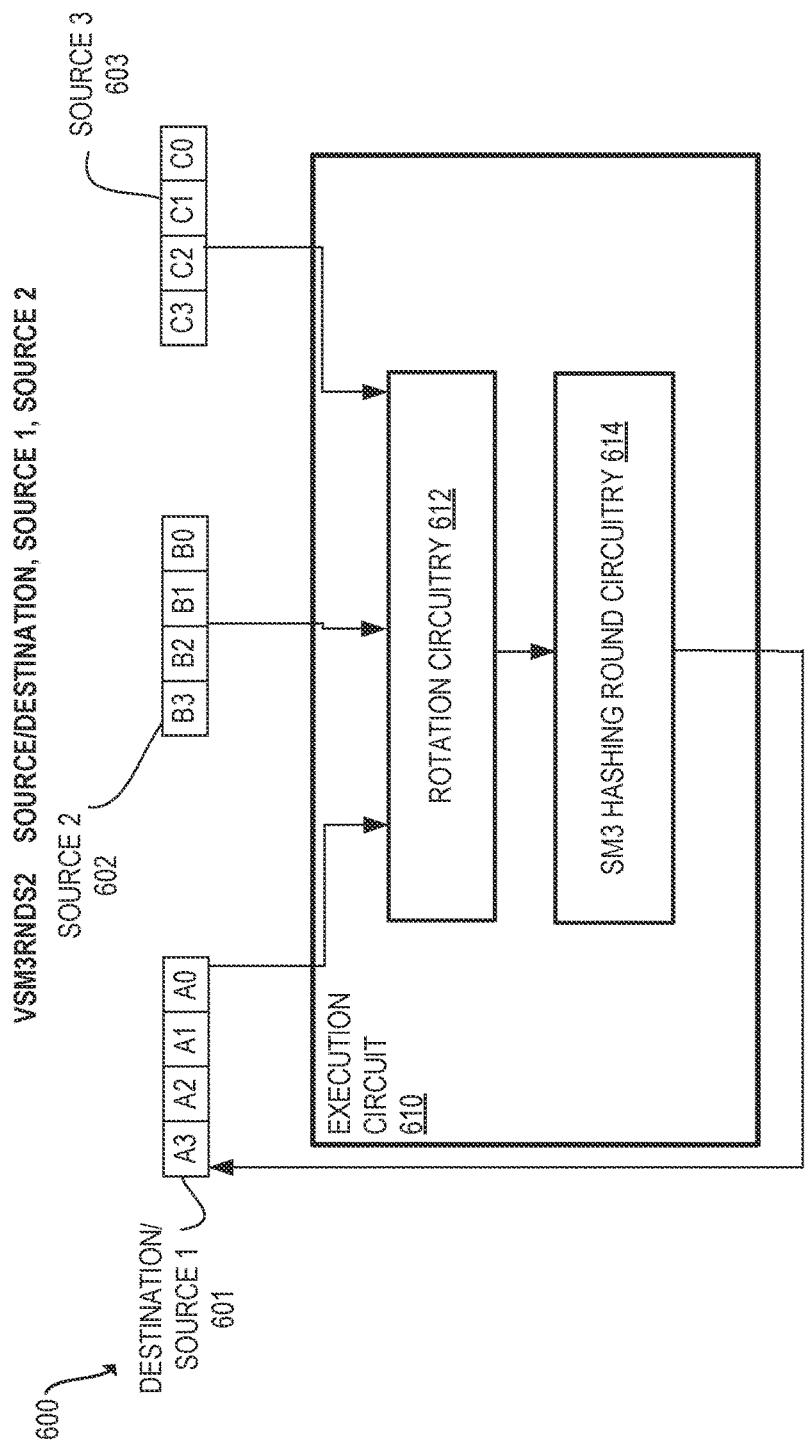
FIG. 6 illustrates circuitry including an execution circuit with rotation circuitry and SM3 hashing round circuitry according to embodiments of the disclosure.

However, in certain embodiments the rotations (underlined in the above example) for all rounds (e.g., 64 rounds) on a data block of input messages is correct except for the beginning call and the end call for the single instruction that performs this rotation (e.g., underlined in the above example) and also performs (e.g., only) two rounds of an SM3 hashing standard (e.g., SM3RNDS2 as discussed in reference to FIGS. 5-6). Thus, to correct this issue, a pre-rotation instruction (e.g., pre-rotate CDGH at 403 in FIG. 4B) (e.g., as discussed in reference to FIGS. 7-8) and post-rotation instruction (e.g., post-rotate CDGH at 417 in FIG. 4B) (e.g., as discussed in reference to FIGS. 9-10) are added to an instruction set architecture for a processor that supports the single instruction that performs this rotation (e.g., underlined in the above example) and also performs two rounds of an SM3 hashing standard (e.g., SM3RNDS2 as discussed in reference to FIGS. 5-6).

Figure 10:
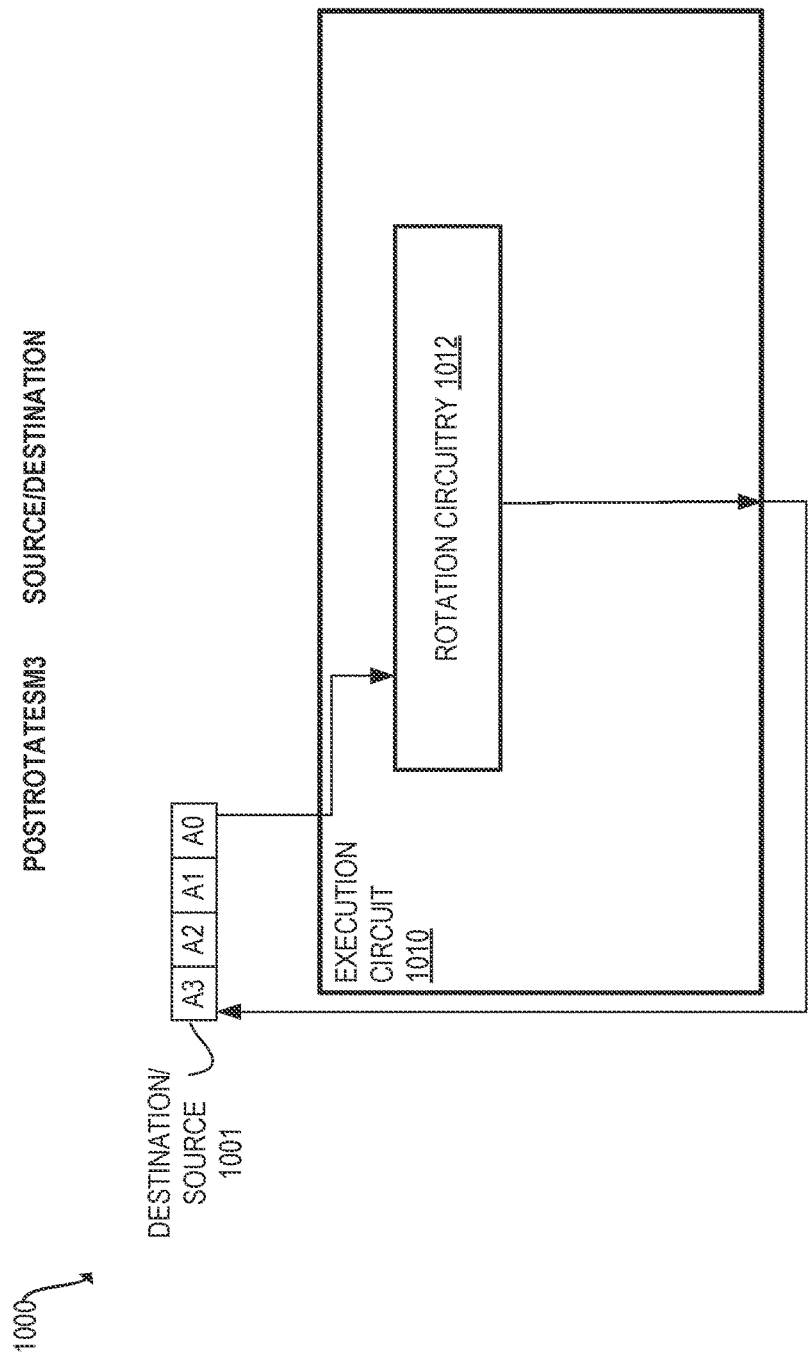
FIG. 10 illustrates circuitry including an execution circuit with rotation circuitry according to embodiments of the disclosure.

As one example, each input data block (e.g., 64 bytes of input) uses 32 calls (e.g., requests to decode/execute, etc.) of a single instruction that performs this rotation (e.g., underlined in the above example) and also performs two rounds of an SM3 hashing standard (e.g., SM3RNDS2 as discussed in reference to FIGS. 5-6), 13 calls of an intermediate scheduling instruction (e.g., VSM3MSG1 as discussed in reference to FIGS. 11-13 below), 13 calls of a final scheduling instruction (e.g., VSM3MSG2 as discussed in reference to FIGS. 14-16 below), one call of a pre-rotation instruction (e.g., pre-rotate CDGH at 403 in FIG. 4B) (e.g., as discussed in reference to FIGS. 7-8), and one call of a post-rotation instruction (e.g., post-rotate CDGH at 417 in FIG. 4B) (e.g., as discussed in reference to FIGS. 9-10).

In one embodiment, for each input data block there are 13 calls each for VSM3MSG1 instruction and VSM3MSG2 instruction because in the first four rounds the input data message words (e.g., first 16 message words) are read directly from the input data block, for example, in an embodiment where each pair of VSM3MSG1 and VSM3MSG2 instructions calculate four words, with 68 words total, and the first 16 message words are sourced from the input data block, and the rest of the 52 words are calculated using 13 calls to a pair of VSM3MSG1 and VSM3MSG2 instructions.

In one embodiment, the width of each element in the input operands is 32-bits. In the Figures herein, e.g., FIGS. 4-23, data may be loaded from a register/memory and or stored in a register or memory. In certain embodiments, the first packed data source (input) and the second packed data source (input) each have the same number of bits. In certain embodiments, the resultant packed data destination (output) has the same number of bits as the number of bits in the first packed data source (input) or the second packed data source (input).

In certain embodiments, a VSM3RNDS2 instruction (e.g., its opcode) indicates the rotational values above (e.g., 12 for functions S1 and S2; 9 for underlined functions C[i] and D[i], 19 for underlined functions G[i] and H[i], 9 for function C[i+1]; 19 for function G[i+1]; 9 and 17 for function P0; and 15 and 23 for function P1). This improves the functioning of a computer as these values are thus not to be supplied as operands (e.g., and thus it will not utilize the time and energy taken to load those operands) to those embodiments of the instruction.

In certain embodiments, some or all of the data may be accessed in (e.g., system) memory. The input and output vector values and sizes herein are also examples, and other values and sizes may be utilized. The data may be according to big-endian or little-endian order.

FIG. 6 illustrates circuitry 600 including an execution circuit 610 with rotation circuitry 612 and SM3 hashing round circuitry 614 according to embodiments of the disclosure. In certain embodiments, decode circuit (e.g., decode circuit 102 in FIG. 1 or decode circuit 206 in FIG. 2) decodes an instruction into a decoded instruction that causes execution circuit 610 to perform a rotation operation with rotation circuitry 612 and SM3 hashing round circuitry 614 (for example, the decoded instruction indicates to execution circuit 610 which components to use, e.g., here to use the rotation circuitry 612 and SM3 hashing round circuitry 614, the direction(s) of rotation, and the values of the rotation constants and hashing constants). In the depicted embodiment, an instruction format may include one or more fields that identifies the first packed data destination/source 601, second packed data source 602, and the third packed data source 603. In the depicted embodiment, the first packed data destination/source 601, second packed data source 602, and the third packed data source 603 each include four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 601 is a four element location that stores state elements C, D, G, and H, respectively, second packed data source 602 is a four element location that stores state elements A, B, E, and F, respectively, and the third packed data source 603 is a four element location that stores input message elements WM, W[i+1], W[i+4], and W[i+5], respectively for each round "i". Input message elements may be sourced from a scheduling instruction(s).

In certain embodiments, rotation circuitry 612 of execution circuit 610 performs a rotation operation on each element such that element C from the first element of first packed data source 601 is left rotated nine bits at 32-bit granularity, element D from the second element of first packed data source 601 is left rotated nine bits at 32-bit granularity, element G from the third element of first packed data source 601 is left rotated nineteen bits at 32-bit granularity, and element H from the fourth element of first packed data source 601 is left rotated nineteen bits at 32-bit granularity as indicated by the instruction (e.g., by the opcode). In one embodiment, the rotation operations are performed on each element in parallel.

The execution circuit 610 then causes the results of the rotations from rotation circuitry 612 to be sent to SM3 hashing round circuitry 614, for example, along with the other operands (e.g., with the other operands bypassing the rotation circuitry 612). In certain embodiments, the SM3 hashing round circuitry 614 performs hashing operations (e.g., two rounds as discussed above) on the results of the rotations from rotation circuitry 612 and the state elements A, B, E, and F from the second packed data source 602 and the input message elements WM, W[i+1], W[i+4], and W[i+5] from the third packed data source 603 to generate a hash two round result (e.g., including updated state elements A, B, E, and F). The packed data hashing result (e.g., updated state elements A, B, E, and F) may then be stored (e.g., committed to be visible by other instructions) into destination 601.

FIG. 7 illustrates a method 700 of processing a pre-rotation instruction according to a SM3 hashing standard according to embodiments of the disclosure. A processor (e.g., or processor core) may perform method 700, e.g., in response to receiving a request to execute an instruction from software. Depicted method 700 includes processing a SM3 hashing standard instruction by: fetch a single instruction having an opcode that indicates a pre-rotation according to a SM3 hashing standard is to be performed and at least one field that identifies four (e.g., 32-bit) initial state elements C, D, G, and H for an initial round of a data block (e.g., for input into single instruction VSM3RNDS2 in the format that is assumes to be correct) according to the SM3 hashing standard (e.g., and a location to write a resultant) at 702, decode the instruction into a decoded instruction at 704, retrieve data associated with the identified source operands at 706, (optionally) schedule the decoded instruction for execution at 708, execute the decoded instruction to rotate initial state element C right by 9 bits to form a pre-rotated state element C, rotate initial state element D right by 9 bits to form a pre-rotated state element D, rotate initial state element G right by 19 bits to form a pre-rotated state element G, rotate initial state element H right by 19 bits to form a pre-rotated state element H at 710, and commit the executed instruction to store the pre-rotated state element C, pre-rotated state element D, pre-rotated state element G, and pre-rotated state element H into a location specified by the single instruction at 712.

The opcode may correspond to (e.g., identifies) the vector instruction mnemonic of PREROTATESM3 (e.g., where "PREROTATESM3" represents pre-rotating (e.g., reverse rotating) state elements C, D, G, and G according to a SM3 hashing standard).

In one embodiment, an instruction has the following format for its fields: PREROTATESM3 SOURCE/DESTINATION// where source/destination is a first packed data source (e.g., register) and destination. In one embodiment, each the source/destination is a register (e.g., a XMM register).

Thus, such an embodiment of a pre-rotation instruction provides data that, when input into single instruction that performs this rotation (e.g., underlined in the above example) and also performs two rounds of an SM3 hashing standard (e.g., SM3RNDS2 as discussed in reference to FIGS. 5-6), produces a correct output for a first round of a plurality of rounds for an input message. In one embodiment, the width of each element in the input operand is 32-bits. In the Figures herein, e.g., FIGS. 4-23, data may be loaded from a register/memory and or stored in a register or memory. In certain embodiments, the first packed data source (input) and the second packed data source (input) each have the same number of bits. In certain embodiments, the resultant packed data destination (output) has the same number of bits as the number of bits in the first packed data source (input) or the second packed data source (input).

In certain embodiments, some or all of the data may be accessed in (e.g., system) memory. The input and output vector values and sizes herein are also examples, and other values and sizes may be utilized. The data may be according to big-endian or little-endian order.

Figure 8:
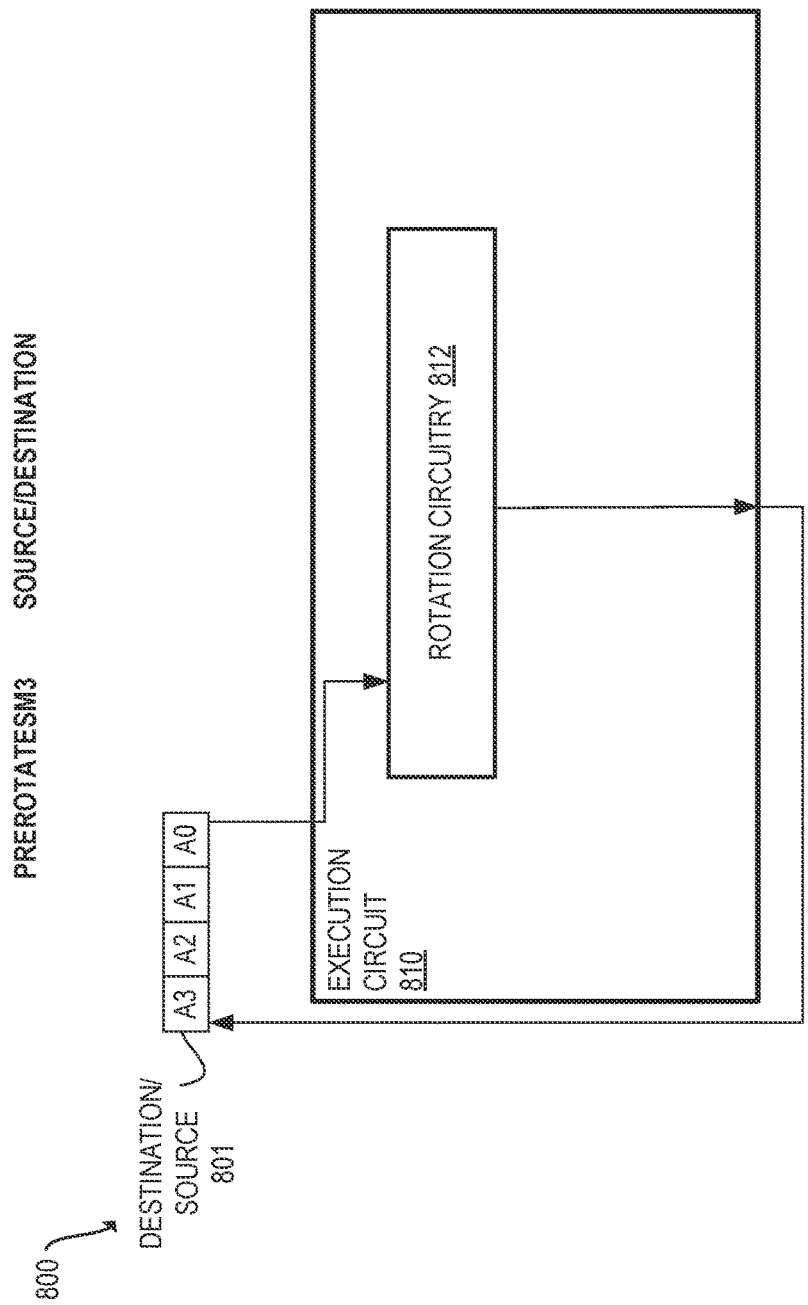
FIG. 8 illustrates circuitry including an execution circuit with rotation circuitry according to embodiments of the disclosure.

FIG. 8 illustrates circuitry 800 including an execution circuit 810 with rotation circuitry 812 according to embodiments of the disclosure. In certain embodiments, decode circuit (e.g., decode circuit 102 in FIG. 1 or decode circuit 206 in FIG. 2) decodes an instruction into a decoded instruction that causes execution circuit 810 to perform a pre-rotation operation with rotation circuitry 812 for an initial SM3 hashing round (for example, the decoded instruction indicates to execution circuit 810 which components to use, e.g., here to use the rotation circuitry 812, the direction of rotation(s), and the values of the rotation constants). In the depicted embodiment, an instruction format may include one or more fields that identifies the first packed data destination/source 801. In the depicted embodiment, the first packed data destination/source 801 includes four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 801 is a four element location that stores state elements C, D, G, and H, respectively. Input message elements may be sourced from a scheduling instruction(s).

In certain embodiments, rotation circuitry 812 of execution circuit 810 performs a pre-rotation operation on each element such that element C from the first element of first packed data source 801 is right rotated nine bits at 32-bit granularity, element D from the second element of first packed data source 801 is right rotated nine bits at 32-bit granularity, element G from the third element of first packed data source 801 is right rotated nineteen bits at 32-bit granularity, and element H from the fourth element of first packed data source 801 is right rotated nineteen bits at 32-bit granularity as indicated by the instruction (e.g., by the opcode). In one embodiment, the pre-rotation operations are performed on each element in parallel.

The packed data pre-rotation result (e.g., pre-rotated state elements C, D, G, and H) may then be stored (for example, committed to be visible by other instructions, e.g., which include a SM3RNDS2 instruction) into destination 801.

FIG. 9 illustrates a method 900 of processing a post-rotation instruction according to a SM3 hashing standard according to embodiments of the disclosure. A processor (e.g., or processor core) may perform method 900, e.g., in response to receiving a request to execute an instruction from software. Depicted method 900 includes processing a SM3 hashing standard instruction by: fetch a single instruction having an opcode that indicates a post-rotation according to a SM3 hashing standard is to be performed and at least one field that identifies four (e.g., 32-bit) updated state elements C, D, G, and H for a final round of a data block (e.g., C, D, G, and H output for a final round from a single instruction VSM3RNDS2) according to the SM3 hashing standard (e.g., and a location to write a resultant) at 902, decode the instruction into a decoded instruction at 904, retrieve data associated with the identified source operands at 906, (optionally) schedule the decoded instruction for execution at 908, execute the decoded instruction to rotate updated state element C left by 9 bits to form a final state element C of the data block, rotate updated state element D left by 9 bits to form a final state element D of the data block, rotate updated state element G left by 19 bits to form a final state element G of the data block, rotate updated state element H left by 19 bits to form a final state element H of the data block at 910, and commit the executed instruction to store the final state element C, final state element D, final state element G, and final state element H into a location specified by the single instruction at 912.

The opcode may correspond to (e.g., identifies) the vector instruction mnemonic of POSTROTATESM3 (e.g., where "POSTROTATESM3" represents post-rotating state elements C, D, G, and G according to a SM3 hashing standard).

In one embodiment, an instruction has the following format for its fields: POSTROTATESM3 SOURCE/DESTINATION// where source/destination is a first packed data source (e.g., register) and destination. In one embodiment, each the source/destination is a register (e.g., a XMM register).

Thus, such an embodiment of a post-rotation instruction provides data that, when taking output from a single instruction that performs this rotation (e.g., underlined in the above example) and also performs two rounds of an SM3 hashing standard (e.g., SM3RNDS2 as discussed in reference to FIGS. 5-6), produces a correct output for a last round of a plurality of rounds for an input message. In one embodiment, the width of each element in the input operand is 32-bits. In the Figures herein, e.g., FIGS. 4-23, data may be loaded from a register/memory and or stored in a register or memory. In certain embodiments, the first packed data source (input) and the second packed data source (input) each have the same number of bits. In certain embodiments, the resultant packed data destination (output) has the same number of bits as the number of bits in the first packed data source (input) or the second packed data source (input).

In certain embodiments, some or all of the data may be accessed in (e.g., system) memory. The input and output vector values and sizes herein are also examples, and other values and sizes may be utilized. The data may be according to big-endian or little-endian order.

FIG. 10 illustrates circuitry 1000 including an execution circuit 1010 with rotation circuitry 1012 according to embodiments of the disclosure. In certain embodiments, decode circuit (e.g., decode circuit 102 in FIG. 1 or decode circuit 206 in FIG. 2) decodes an instruction into a decoded instruction that causes execution circuit 1010 to perform a post-rotation operation with rotation circuitry 1012 for a final SM3 hashing round (for example, the decoded instruction indicates to execution circuit 1010 which components to use, e.g., here to use the rotation circuitry 1012, the direction of rotation(s), and the values of the rotation constants). In the depicted embodiment, an instruction format may include one or more fields that identifies the first packed data destination/source 1001. In the depicted embodiment, the first packed data destination/source 1001 includes four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 1001 is a four element location that stores state elements C, D, G, and H, respectively. Input message elements may be sourced from a SM3RNDS2 instruction.

In certain embodiments, rotation circuitry 1012 of execution circuit 1010 performs a post-rotation operation on each element such that element C from the first element of first packed data source 1001 is left rotated nine bits at 32-bit granularity, element D from the second element of first packed data source 1001 is left rotated nine bits at 32-bit granularity, element G from the third element of first packed data source 1001 is left rotated nineteen bits at 32-bit granularity, and element H from the fourth element of first packed data source 1001 is left rotated nineteen bits at 32-bit granularity as indicated by the instruction (e.g., by the opcode). In one embodiment, the post-rotation operations are performed on each element in parallel.

The packed data post-rotation result (e.g., post-rotated state elements C, D, G, and H) may then be stored (for example, committed to be visible by other instructions) into destination 1001.

Figure 11:
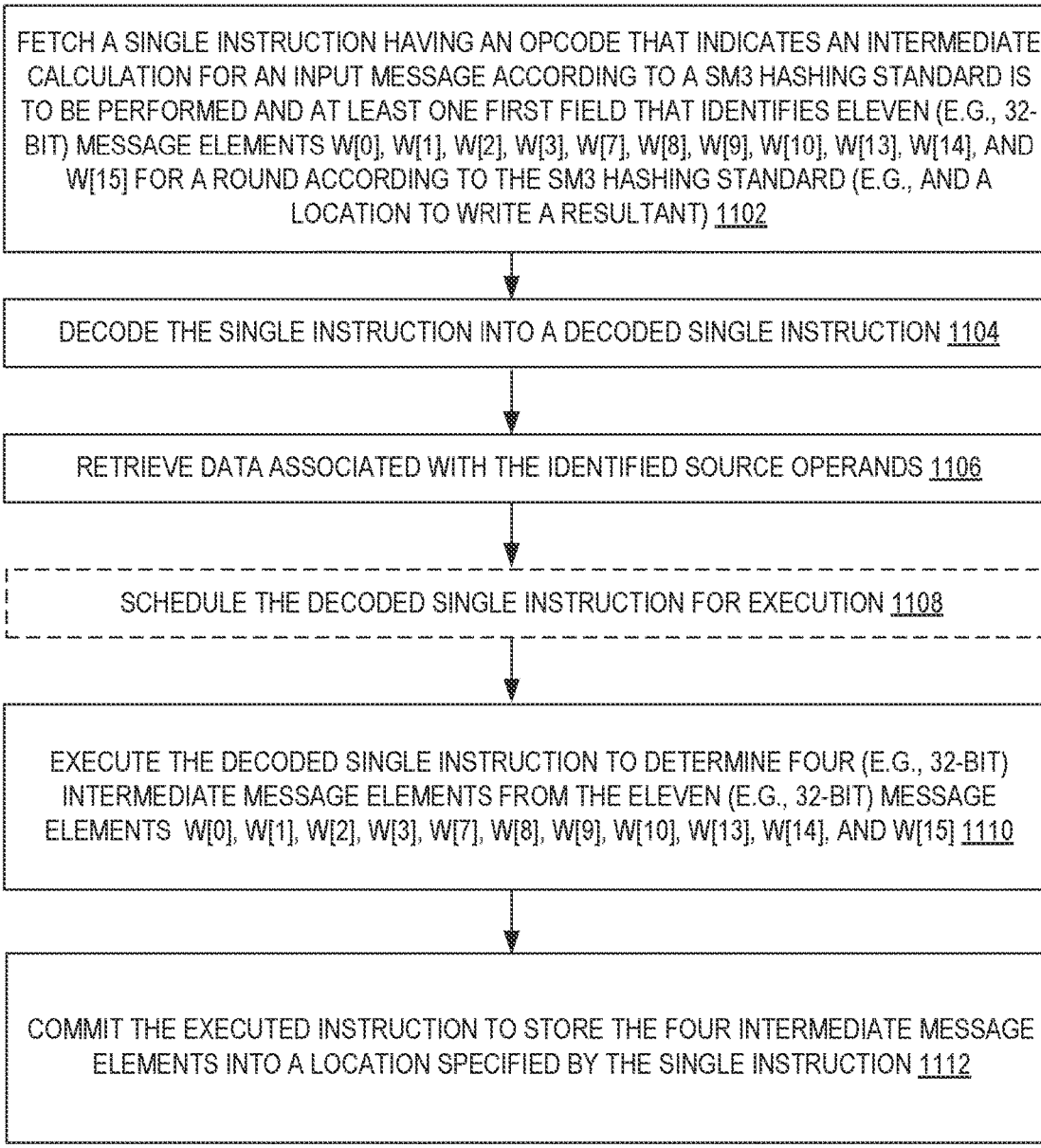
FIG. 11 illustrates a method of processing an intermediate message instruction according to a SM3 hashing standard according to embodiments of the disclosure.
Figure 12:
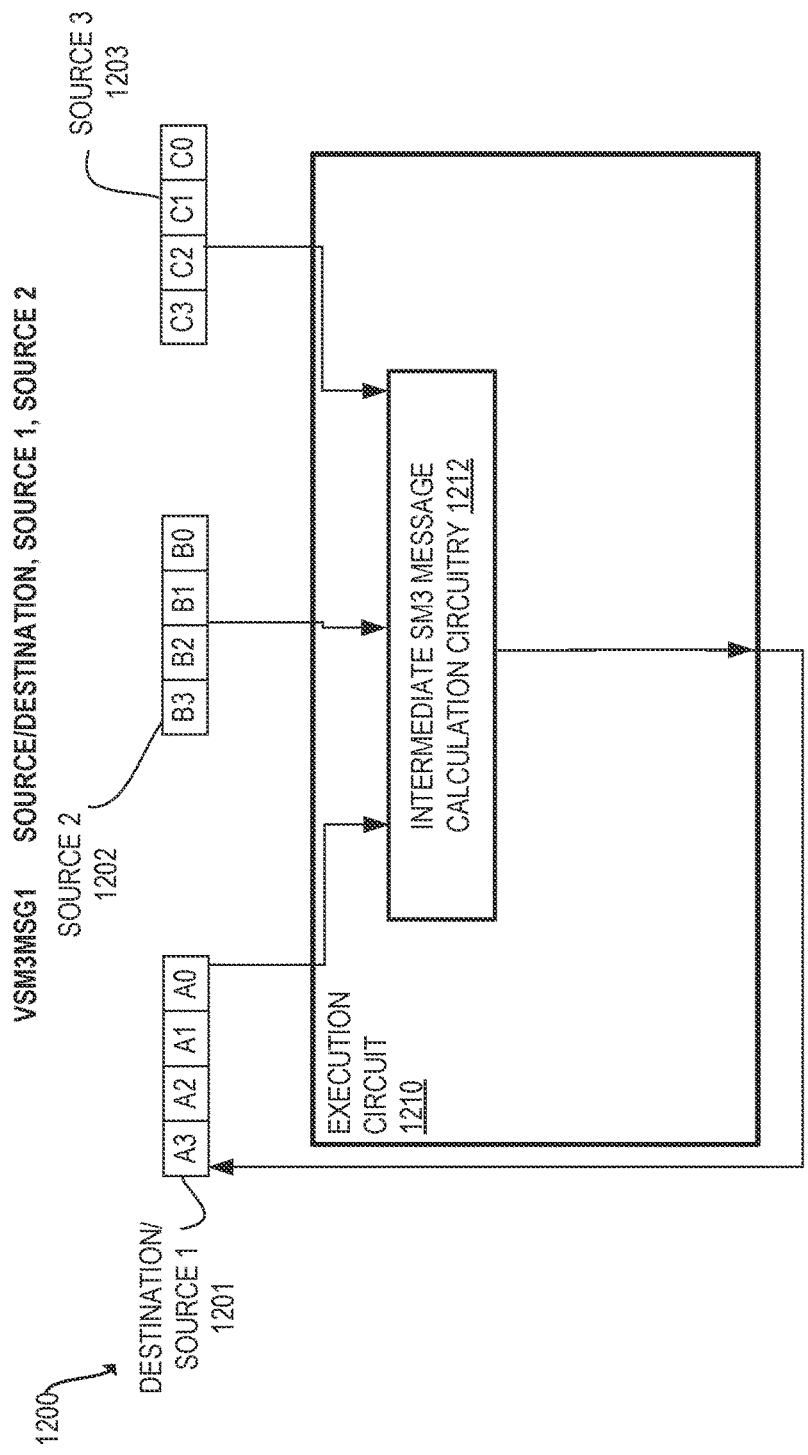
FIG. 12 illustrates circuitry including an execution circuit with intermediate SM3 message calculation circuitry according to embodiments of the disclosure.
Figure 13:
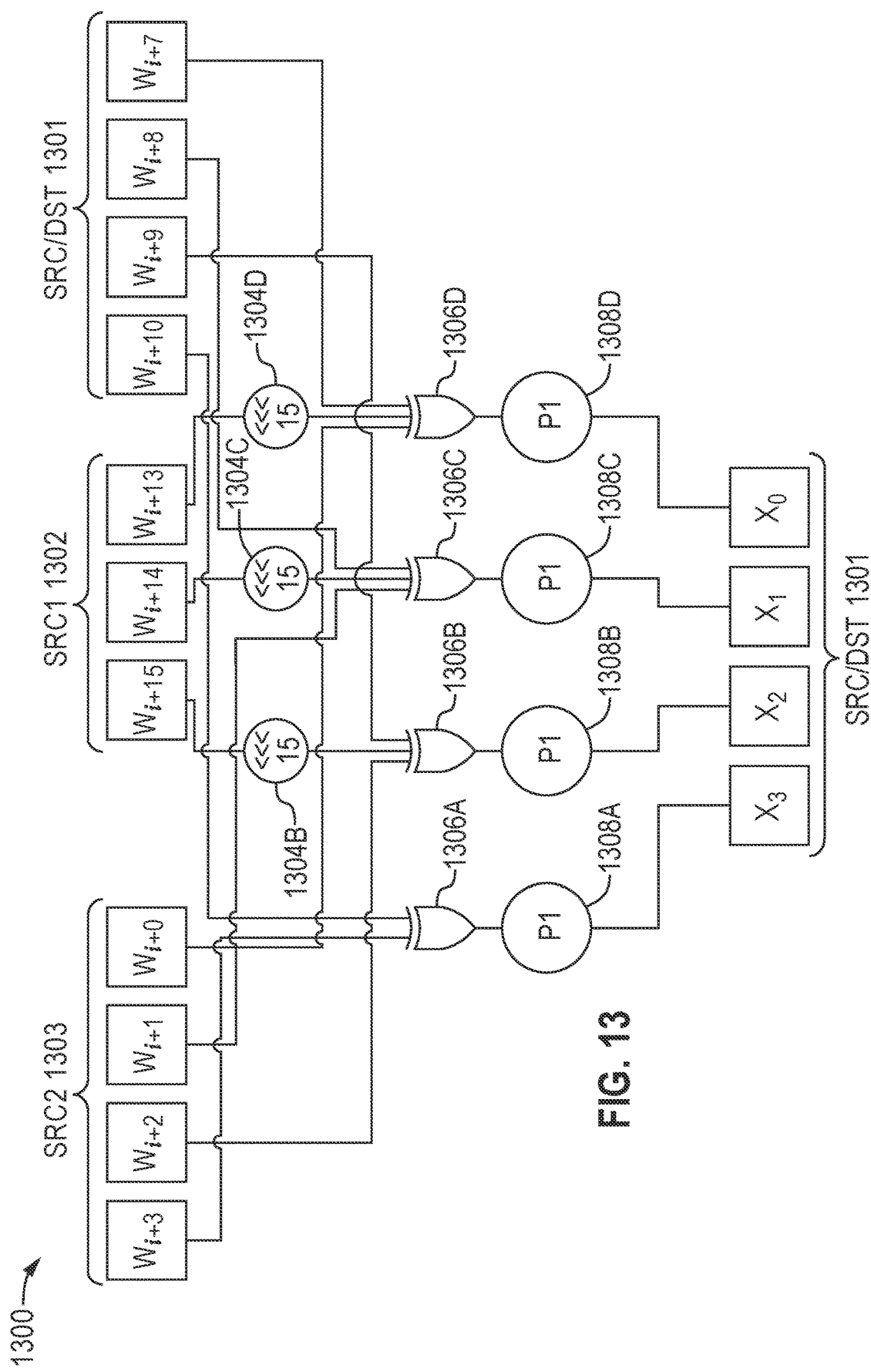
FIG. 13 illustrates intermediate SM3 message calculation circuitry according to embodiments of the disclosure.
Figure 14:
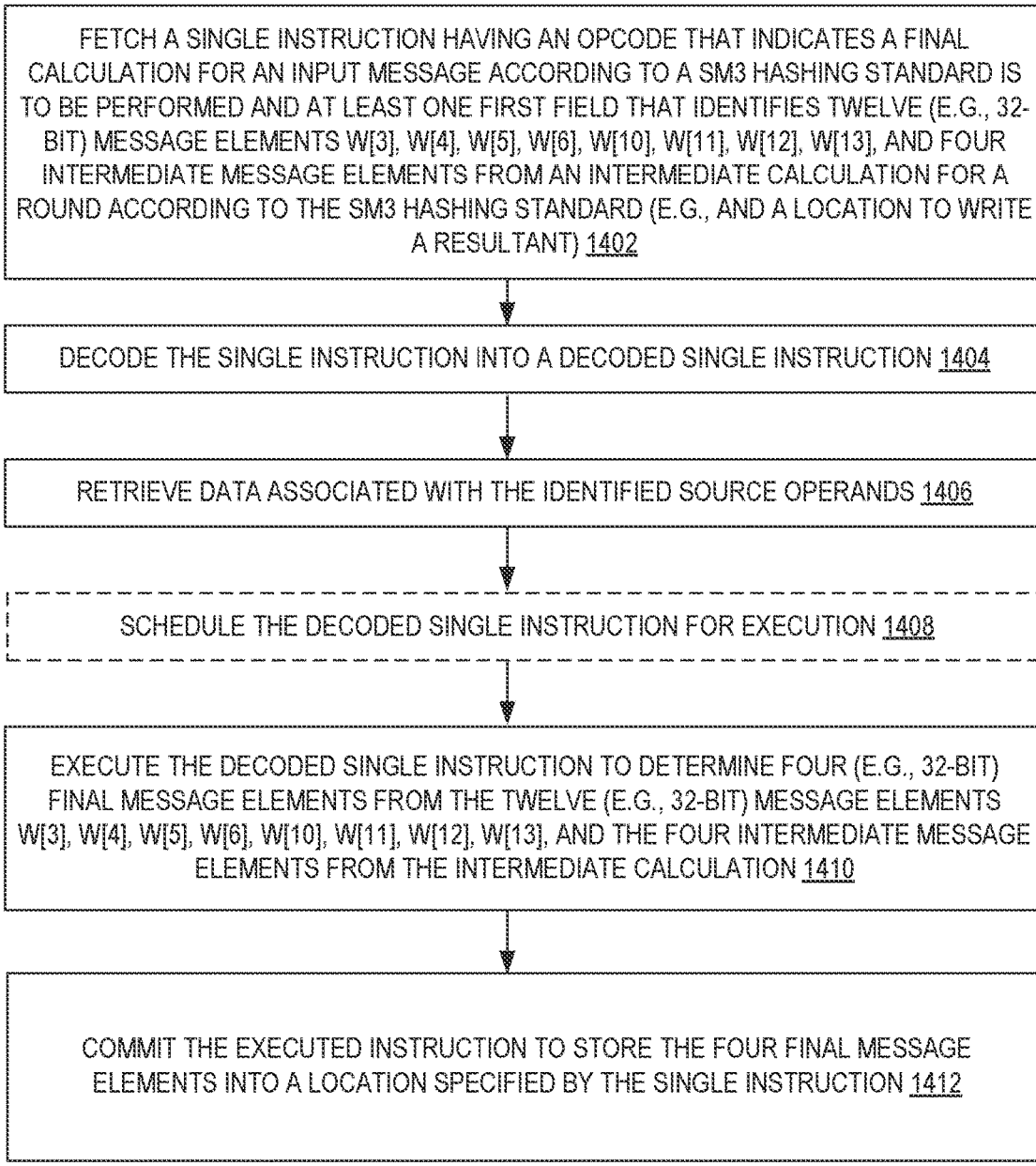
FIG. 14 illustrates a method of processing a final message instruction according to a SM3 hashing standard according to embodiments of the disclosure.
Figure 15:
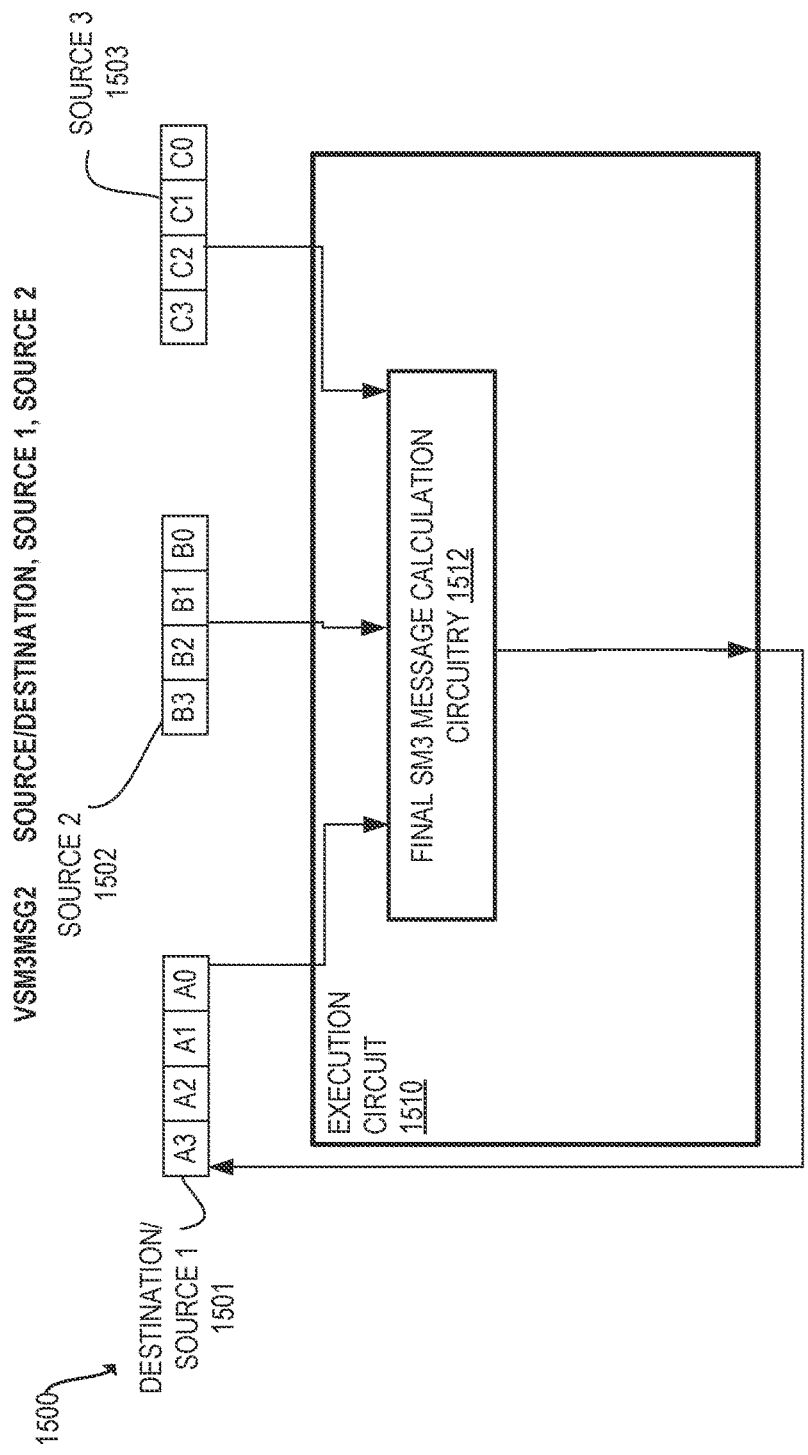
FIG. 15 illustrates circuitry including an execution circuit with final SM3 message calculation circuitry according to embodiments of the disclosure.
Figure 16:
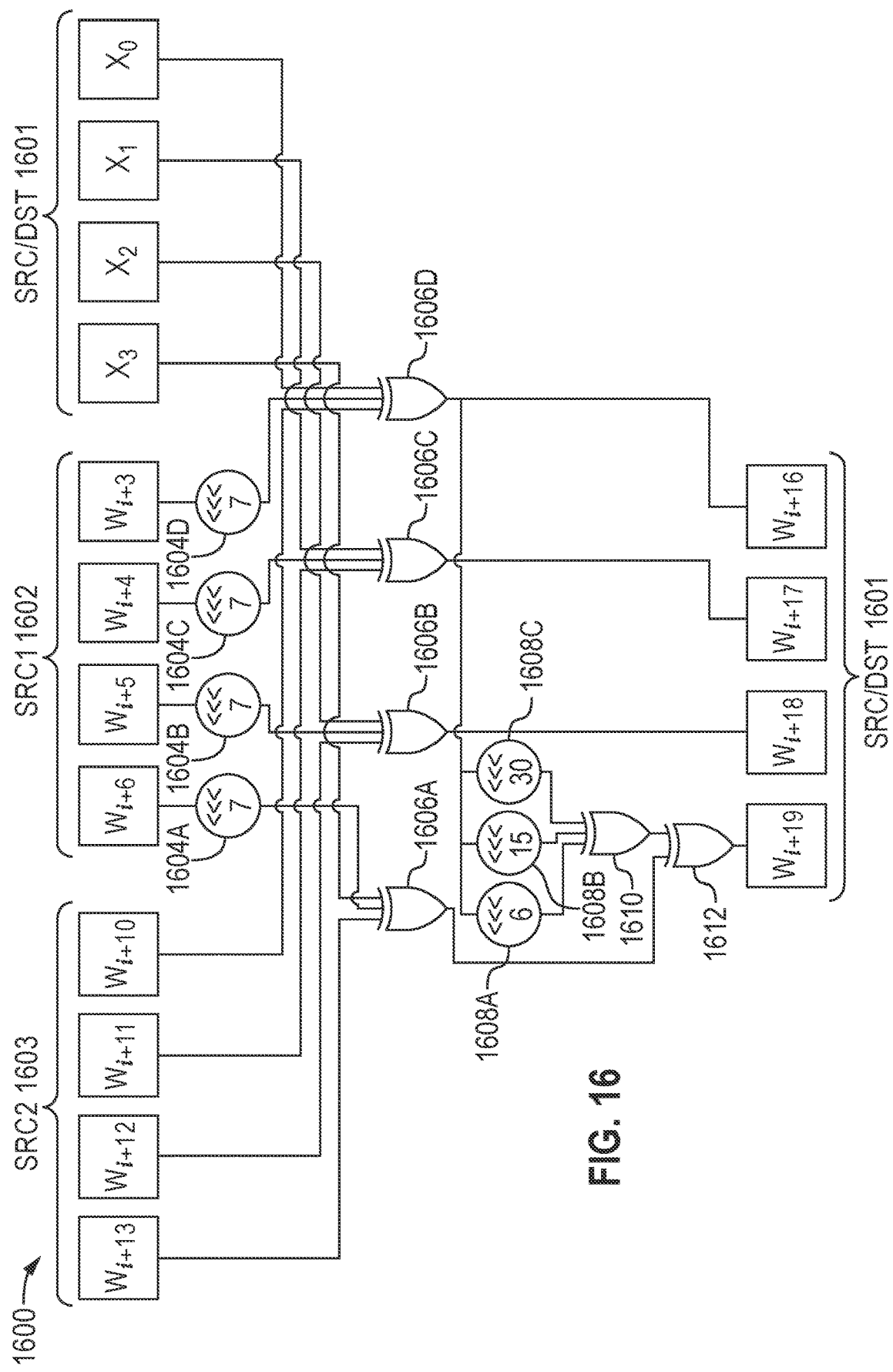
FIG. 16 illustrates final SM3 message calculation circuitry according to embodiments of the disclosure.

As discussed in reference to FIGS. 4A and 4B, certain embodiments herein utilize scheduling instruction(s) to generate input message elements (e.g., for consumption by a SM3RNDS2 instruction). FIGS. 11-13 depict embodiments for an intermediate message instruction, and FIGS. 14-16 depict embodiments for a final message instruction.

FIG. 11 illustrates a method 1100 of processing an intermediate message instruction according to a SM3 hashing standard according to embodiments of the disclosure. A processor (e.g., or processor core) may perform method 1100, e.g., in response to receiving a request to execute an instruction from software. Depicted method 1100 includes processing a SM3 hashing standard instruction by: fetch a single instruction having an opcode that indicates an intermediate calculation for an input message according to a SM3 hashing standard is to be performed and at least one first field that identifies eleven (e.g., 32-bit) message elements W[i], W[i+1], W[i+2], W[i+3], W[i+7], W[i+8], W[i+9], W[i+10], W[i+13], W[i+14], and W[i+15] for a round "i" (e.g., an immediately previous round) according to the SM3 hashing standard (e.g., and a location to write a resultant) at 1102, decode the instruction into a decoded instruction at 1104, retrieve data associated with the identified source operands at 1106, (optionally) schedule the decoded instruction for execution at 1108, execute the decoded instruction to determine four (e.g., 32-bit) intermediate message elements (e.g., X[3], X[2], X[1], and X[0] in FIG. 13) from the eleven (e.g., 32-bit) message elements W[i], W[i+1], W[i+2], W[i+3], W[i+7], W[i+8], W[i+9], W[i+10], W[i+13], W[i+14], and W[i+15] at 1110, and commit the executed instruction to store the four intermediate message elements into a location specified by the single instruction at 1112.

The opcode may correspond to (e.g., identifies) the vector instruction mnemonic of VSM3MSG1 (e.g., where (optional usage of) "V" represents a vector operation (e.g., VEX as discussed below), "SM3" represents the hashing standard being SM3, and "MSG1" represents an intermediate message "1" used to generate a final message "2", with the data from that final message used as an input of a SM3RNDS2 instruction).

In one embodiment, an instruction has the following format for its fields: VSM3MSG1 SOURCE/DESTINATION, SOURCE 1, SOURCE 2// where source/destination is a first packed data source (e.g., register) and destination, source 1 is the second packed data source (e.g., register), and source 2 is the third packed data source (e.g., which may be a register or memory address). In one embodiment, each of the registers used is a (e.g., 128-bit) XMM register (e.g., XMM1, XMM2, etc.).

Pseudocode for the performance of this instruction may be as follows (e.g., where dword is a doubleword size of 32-bits for each element, [x] is an element position indexed with x being from 0 to n, where n−1 is the total number of elements, << is a left rotation (that wraps around) for a given number of bits, >> is a right rotation (that wraps around) for a given number of bits, ∧ is a logical (e.g., binary) XOR operator, | is a logical (e.g., binary) OR operator that outputs a high bit (one) if either bit or both bits in a respective bit position is set to high (one), & is a logical (e.g., binary) AND operator, and ? is a conditional operator (e.g., if condition is true ? then value X: otherwise value Y):

```
// DEFINITIONS
#define ROTL32(x, n) (((x) << (n)) ^ ((x) >> (32-(n))))
#define P1(x) (x ^ rotl32(x, 15) ^ rotl32(x, 23))
// INSTRUCTION FLOW:
W[7] = SRCDST.dword[0]
W[8] = SRCDST.dword[1]
W[9] = SRCDST.dword[2]
W[10] = SRCDST.dword[3]
W[13] = SRC1.dword[0]
W[14] = SRC1.dword[1]
W[15] = SRC1.dword[2]
W[0] = SRC2.dword[0]
W[1] = SRC2.dword[1]
W[2] = SRC2.dword[2]
W[3] = SRC2.dword[3]
TMP3 = W[10] ^ W[3]
TMP2 = W[9] ^ W[2] ^ ROTL32(W[15], 15)
TMP1 = W[8] ^ W[1] ^ ROTL32(W[14], 15)
TMP0 = W[7] ^ W[0] ^ ROTL32(W[13], 15)
SRCDST.dword[0] = P1(TMP0)
SRCDST.dword[1] = P1(TMP1)
SRCDST.dword[2] = P1(TMP2)
SRCDST.dword[3] = P1(TMP3)
```

FIG. 12 illustrates circuitry 1200 including an execution circuit 1210 with intermediate SM3 message calculation circuitry 1212 according to embodiments of the disclosure. In certain embodiments, decode circuit (e.g., decode circuit 102 in FIG. 1 or decode circuit 206 in FIG. 2) decodes an instruction into a decoded instruction that causes execution circuit 1210 to perform a SM3 message calculation operation with intermediate SM3 message calculation circuitry 1212 (for example, the decoded instruction indicate to execution circuit 1210 which components to use, e.g., here to use the intermediate SM3 message calculation circuitry 1212). In the depicted embodiment, an instruction format may include one or more fields that identifies the first packed data destination/source 1201, second packed data source 1202, and the third packed data source 1203. In the depicted embodiment, the first packed data destination/source 1201, second packed data source 1202, and the third packed data source 1203 each include four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 1201 is a four element location that stores input message elements W[i+7], W[i+8], W[i+9], and W[i+10], respectively, second packed data source 1202 is a three (e.g., or four, with one element not utilized) element location that stores input message elements W[i+13], W[i+14], and W[i+15], respectively, and the third packed data source 1203 is a four element location that stores input message elements W[i+0], W[i+1], W[i+2], and W[i+3], respectively. Input message elements may be sourced from an input message, e.g., a hashing input. The input message may be from a previous message (e.g., a previous round to the round the current message is being determined).

In certain embodiments, intermediate SM3 message calculation circuitry 1212 of execution circuit 1210 performs message generation operations on the input message elements to generate a plurality (e.g., four) intermediate message elements as indicated by the instruction (e.g., by the opcode). In one embodiment, the message generation operations are performed on each element in parallel. In one embodiment, the intermediate SM3 message calculation circuitry 1212 is an instance of the intermediate SM3 message calculation circuitry 1300 in FIG. 13. The packed data intermediate message result (e.g., X[3], X[2], X[1], and X[0]) may then be stored (e.g., committed to be visible by other instructions) into destination 1201, for example, for use by a next (e.g., in program order) of the pair of message scheduling instructions.

FIG. 13 illustrates intermediate SM3 message calculation circuitry 1300 according to embodiments of the disclosure. Note that the element reference format of W[x] may be the same as $W_{i+x}$ in FIG. 13, where X is an integer and i is the round number. In one embodiment, first packed data destination/source 1301 is a four element location (e.g., register) that stores input message elements W[i+7], W[i+8], W[i+9], and W[i+10], respectively, second packed data source 1202 is a three (e.g., or four, with one element not utilized) element location (e.g., register) that stores input message elements W[i+13], W[i+14], and W[i+15], respectively, and the third packed data source 1303 is a four element location (e.g., register) that stores input message elements W[i+0], W[i+1], W[i+2], and W[i+3], respectively. Input message elements may be sourced from an input message, e.g., a hashing input. The input message may be from a previous message (e.g., a previous round to the round the current message is being determined for).

In the depicted embodiment, the input message elements are routed according to the couplings (e.g., wires) as shown to: the left (e.g., 15 bits to the left with a 32 bit element size) shifter circuits 1304B-1304D, XOR logic gate circuits 1306A-1306D, and permutation function circuits 1308A-1308D (e.g., to perform the permutation function in function 5 above). The output of four intermediate message elements (e.g., X[0], X[1], X[2], and X[3]) from the intermediate SM3 message calculation circuitry 1300 may then be saved to first packed data destination/source 1301. A logic gate circuit may be implemented with positive or negative logic gates.

FIG. 14 illustrates a method 1400 of processing a final message instruction according to a SM3 hashing standard according to embodiments of the disclosure. Final message instruction may be next (e.g., in program order) to an intermediate message instruction that is providing its output as an input to the final message instruction. A processor (e.g., or processor core) may perform method 1400, e.g., in response to receiving a request to execute an instruction from software. Depicted method 1400 includes processing a SM3 hashing standard instruction by: fetch a single instruction having an opcode that indicates a final calculation for an input message according to a SM3 hashing standard is to be performed and at least one first field that identifies twelve (e.g., 32-bit) message elements W[i+3], W[i+4], W[i+5], W[i+6], W[i+10], W[i+11], W[i+12], W[i+13], and four intermediate message elements from an intermediate calculation (e.g., from an instance of instruction VSM3MSG1) for a round according to the SM3 hashing standard (e.g., and a location to write a resultant) at 1402, decode the instruction into a decoded instruction at 1404, retrieve data associated with the identified source operands at 1406, (optionally) schedule the decoded instruction for execution at 1408, execute the decoded instruction to determine four (e.g., 32-bit) final message elements from the twelve (e.g., 32-bit) message elements W[i+3], W[i+4], W[i+5], W[i+6], W[i+10], W[i+11], W[i+12], W[i+13], and the four intermediate message elements from the intermediate calculation at 1410, and commit the executed instruction to store the four final message elements into a location specified by the single instruction at 1412.

The opcode may correspond to (e.g., identifies) the vector instruction mnemonic of VSM3MSG2 (e.g., where (optional usage of) "V" represents a vector operation (e.g., VEX as discussed below), "SM3" represents the hashing standard being SM3, and "MSG1" represents a final message "2" generated from an intermediate message "1", with the data from the final message used as an input of a SM3RNDS2 instruction).

In one embodiment, an instruction has the following format for its fields: VSM3MSG2 SOURCE/DESTINATION, SOURCE 1, SOURCE 2// where source/destination is a first packed data source (e.g., register) and destination, source 1 is the second packed data source (e.g., register), and source 2 is the third packed data source (e.g., which may be a register or memory address). In one embodiment, each of the registers used is a (e.g., 128-bit) XMM register (e.g., XMM1, XMM2, etc.).

Pseudocode for the performance of this instruction may be as follows (e.g., where dword is a doubleword size of 32-bits for each element, [x] is an element position indexed with x being from 0 to n, where n−1 is the total number of elements, << is a left rotation (that wraps around) for a given number of bits, >> is a right rotation (that wraps around) for a given number of bits, A is a logical (e.g., binary) XOR operator, | is a logical (e.g., binary) OR operator that outputs a high bit (one) if either bit or both bits in a respective bit position is set to high (one), & is a logical (e.g., binary) AND operator, and ? is a conditional operator (e.g., if condition is true ? then value X: otherwise value Y):

```
// DEFINITIONS
#define ROTL32(x, n) (((x) << (n)) ^ ((x) >> (32-(n))))
// INSTRUCTION FLOW
WTMP[0] = SRCDST.dword[0]
WTMP[1] = SRCDST.dword[1]
WTMP[2] = SRCDST.dword[2]
WTMP[3] = SRCDST.dword[3]
W[3] = SRC1.dword[0]
W[4] = SRC1.dword[1]
W[5] = SRC1.dword[2]
W[6] = SRC1.dword[3]
W[10] = SRC2.dword[0]
W[11] = SRC2.dword[1]
W[12] = SRC2.dword[2]
W[13] = SRC2.dword[3]
W[16] = (ROTL32(W[3], 7) ^ W[10] ^ WTMP[0]
W[17] = (ROTL32(W[4], 7) ^ W[11] ^ WTMP[1]
W[18] = (ROTL32(W[5], 7) ^ W[12] ^ WTMP[2]
W[19] = (ROTL32(W[6], 7) ^ W[13] ^ WTMP[3]
W[19] = (W[19] ^ ROTL32(W[16], 6) ^ ROTL32(W[16], 15) ^ ROTL32(W[16], 30))
SRCDST.dword[0] = W[16]
SRCDST.dword[1] = W[17]
SRCDST.dword[2] = W[18]
SRCDST.dword[3] = W[19]
```

FIG. 15 illustrates circuitry 1500 including an execution circuit 1510 with final SM3 message calculation circuitry 1512 according to embodiments of the disclosure. In certain embodiments, decode circuit (e.g., decode circuit 102 in FIG. 1 or decode circuit 206 in FIG. 2) decodes an instruction into a decoded instruction that causes execution circuit 1510 to perform a SM3 message calculation operation with final SM3 message calculation circuitry 1512 (for example, the decoded instruction indicate to execution circuit 1510 which components to use, e.g., here to use the final SM3 message calculation circuitry 1512). In the depicted embodiment, an instruction format may include one or more fields that identifies the first packed data destination/source 1501, second packed data source 1502, and the third packed data source 1503. In the depicted embodiment, the first packed data destination/source 1501, second packed data source 1502, and the third packed data source 1503 each include four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 1501 is a four element location that stores intermediate message elements (e.g., X[0], X[1], X[2], and X[3]) from an intermediate SM3 message calculation instruction (e.g., VSM3MSG1), respectively, second packed data source 1502 is a four element location that stores input message elements W[i+3], W[i+4], W[i+5], and W[i+6], respectively, and the third packed data source 1503 is a four element location that stores input message elements W[i+10], W[i+11], W[i+12], and W[i+13], respectively. Input message elements may be sourced from an input message, e.g., a hashing input, and a previous intermediate SM3 message calculation instruction (e.g., VSM3MSG1). The input message may be from a previous message (e.g., a previous round to the round the current message is being determined).

In certain embodiments, final SM3 message calculation circuitry 1512 of execution circuit 1510 performs message generation operations on the input message elements and intermediate message elements to generate a plurality (e.g., four) final message elements as indicated by the instruction (e.g., by the opcode). In one embodiment, the message generation operations are performed on each element in parallel. In one embodiment, the final SM3 message calculation circuitry 1512 is an instance of the final SM3 message calculation circuitry 1600 in FIG. 16. The packed data final message result (e.g., W[i+16], W[i+17], W[i+18], and W[i+19]) may then be stored (e.g., committed to be visible by other instructions) into destination 1501, for example, for use by a next (e.g., in program order) of the pair of message scheduling instructions.

FIG. 16 illustrates final SM3 message calculation circuitry 1600 according to embodiments of the disclosure. Note that the element reference format of W[x] may be the same as $W_{i+x}$ in FIG. 16, where X is an integer and i is the round number. In one embodiment, first packed data destination/source 1601 is a four element location (e.g., register) that stores intermediate message elements (e.g., X[0], X[1], X[2], and X[3] from an intermediate SM3 message calculation instruction), respectively, second packed data source 1202 is a four element location (e.g., register) that stores input message elements W[i+3], W[i+4], W[i+5], and W[i+6], respectively, and the third packed data source 1603 is a four element location (e.g., register) that stores input message elements W[i+10], W[i+11], W[i+12], and W[i+13], respectively. Input message elements may be sourced from an input message, e.g., a hashing input. Input message elements may be sourced from an input message, e.g., a hashing input, and a previous intermediate SM3 message calculation instruction (e.g., VSM3MSG1). The input message may be from a previous message (e.g., a previous round to the round the current message is being determined).

In the depicted embodiment, the input message elements are routed according to the couplings (e.g., wires) as shown to: the left (e.g., 7 bits to the left with a 32 bit element size) shifter circuits 1604B-1304D, left (e.g., 6 bits to the left with a 32 bit element size) shifter circuit 1608A, left (e.g., 15 bits to the left with a 32 bit element size) shifter circuit 1608B, left (e.g., 30 bits to the left with a 32 bit element size) shifter circuit 1608C, XOR logic gate circuit 1610, and XOR logic gate circuit 1612. The output of four final message elements W[i+16], W[i+17], W[i+18], and W[i+19] from the final SM3 message calculation circuitry 1600 may then be saved to first packed data destination/source 1601 (e.g., for use as an input of a SM3RNDS2 instruction). A logic gate circuit may be implemented with positive or negative logic gates.

In certain embodiments, an execution circuit includes circuitry for both SM3 hashing standards and SHA512 hashing standards.

Instructions for a SHA512 Hashing Standard

Figure 17:
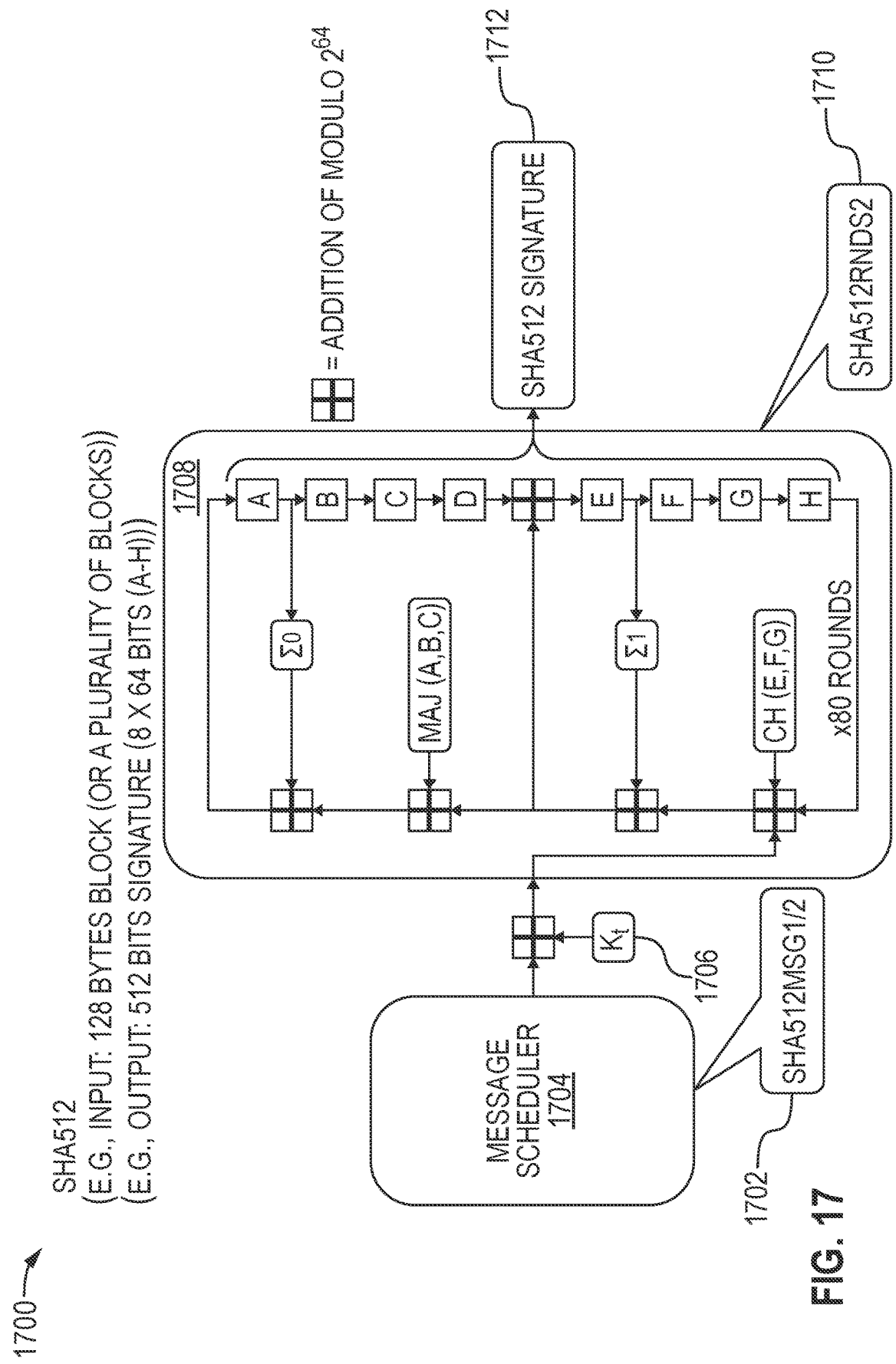
FIG. 17 illustrates SHA512 hashing circuitry according to embodiments of the disclosure.

FIG. 17 illustrates SHA512 hashing circuitry 1700 according to embodiments of the disclosure. Circuitry for each of Ch(x, y, z), Maj(x, y, z), $\Sigma_0$, $\Sigma_1$ (e.g., as defined below) implement (e.g., as execution circuitry for a SHA512 hashing instruction) respective compression functions that are defined according to the SHA512 (i.e., SHA-512) specification, and each state (e.g., state vector A-H) is initiated with a respective 64-bit (e.g., and not a 32-bit) initial value, and Wi, i=0 to 79 (e.g., and not 63), are (e.g., 64-bit) values derived from a (e.g., 1024-bit) message. Kt in constant storage 1706 represents a constant value to be used for the iteration t of the hash computation. In the below, "^" is the bitwise AND operation, "⊕" is the bitwise XOR ("exclusive-OR") operation, "¬" is the bitwise complement operation (e.g., it changes 1 to 0 and 0 to 1), ROTR" indicates to rotate right by "n" number of bits (e.g., circular rotate with wrapping around), and SHR" indicates to shift right by "n" number of bits (e.g., shift without wrapping around). The circuits depicted as a square with a plus in it are adder circuits that each add their respective addends modulo of some particular value (e.g., modulo $2^{32}$ or $2^{64}$) to produce their respective sums.

$Ch(x,y,z)=(x \char`\^ y)\oplus(\neg x \char`\^ z)$            Function 7

$Maj(x,y,z)=(x \char`\^ y)\oplus(x \char`\^ z)\oplus(y \char`\^ z)$            Function 8

$\Sigma_0(x)=ROTR^{28}(x)\oplus ROTR^{34}(x)\oplus ROTR^{39}(x)$            Function 9

$\Sigma_1(x)=ROTR^{14}(x)\oplus ROTR^{18}(x)\oplus ROTR^{41}(x)$            Function 10

$\sigma_0=ROTR^{1}(x)\oplus ROTR^{8}(x)\oplus SHR^{7}(x)$            Function 11

$\sigma_1(x)=ROTR^{19}(x)\oplus ROTR^{61}(x)\oplus SHR^{6}(x)$            Function 12

In certain embodiments, intermediate message instruction (e.g., VSHA512MSG1) according to a SHA512 hashing standard and final message instruction (e.g., VSHA512MSG2) according to a SHA512 hashing standard are decoded and executed (e.g., at 1702) to provide input messages (e.g., for one or two rounds of hashing), for example, and storing the input messages into storage 1704. In certain embodiments, execution circuitry 1708 generates (e.g., via decoding and executing of VSHA512RNDS2 instruction at 1710) two (or one in another embodiment) rounds of updated state elements (e.g., updated state elements A, B, E, and F). Updated state elements may then be used by hashing circuitry 1700 to produce (e.g., 512-bits) the SHA512 message digest (e.g., signature) (e.g., the message digest generated after 80 rounds of hashing on an input block).

In certain embodiments, a VSHA512RNDS2 instruction (e.g., its opcode) indicates the rotational and shift values above (e.g., 28, 34, and 39 for function 9; 14, 18, and 41 for function 10; 1, 8, and 7 for function 11; and 19, 61, and 6 for function 12). This improves the functioning of a computer as these values are thus not to be supplied as operands (e.g., and thus it will not utilize the time and energy taken to load those operands) to those embodiments of the instruction.

In one embodiment, a SHA384 hashing standard is the same as a SHA-512 hashing standard except that: the initial hash values h0 through h7 are different (e.g., taken from the 9th through 16th primes), and the output is constructed by omitting h6 and h7.

FIG. 18 illustrates a method 1800 of processing a hashing (e.g., round) instruction according to a SHA512 hashing standard according to embodiments of the disclosure. A processor (e.g., or processor core) may perform method 1800, e.g., in response to receiving a request to execute an instruction from software. Depicted method 1800 includes processing a SHA512 hashing standard instruction by: fetch a single instruction having an opcode that indicates two rounds of hashing according to a SHA512 hashing standard are to be performed and at least one first field that identifies eight (e.g., 64-bit) state elements (e.g., working variables) A, B, C, D, E, F, G, and H for a round according to the SHA512 hashing standard and at least one second field that identifies an input message (e.g., of the message schedule) (e.g., and a field that indicates a location to write a resultant) at 1802, decode the instruction into a decoded instruction at 1804, retrieve data associated with the identified source operands at 1806, (optionally) schedule the decoded instruction for execution at 1808, execute the decoded instruction to perform two rounds according to the SHA512 hashing standard on the input message and state elements A, B, C, D, E, F, G, and H to generate an updated state element A, an updated state element B, an updated state element E, and an updated state element F at 1810, and commit the executed instruction to store the updated state element A, the updated state element B, the updated state element E, and the updated state element F into a location specified by the single instruction at 1812.

The opcode may correspond to (e.g., identifies) the vector instruction mnemonic of VSHA512RNDS2 (e.g., where (optional usage of) "V" represents a vector operation (e.g., VEX as discussed below), "SHA512" represents the hashing standard being SHA512, and "RNDS2" represents (e.g., only) two rounds of hashing being formed by the single instruction).

In one embodiment, an instruction has the following format for its fields: VSHA512RNDS2 SOURCE/DESTINATION, SOURCE 1, SOURCE 2// where source/destination is a first packed data source (e.g., register) and destination, source 1 is the second packed data source (e.g., register), and source 2 is the third packed data source (e.g., which may be a register or memory address). In one embodiment, each of the registers used is a (e.g., 256-bit) YMM register (e.g., YMM1, YMM2, etc.). A memory address may be a reference to 256-bit of data, e.g., referred to as "m256".

Pseudocode for the performance of this instruction may be as follows (e.g., where qword is a quadword size of 64-bits for each element, [x] is an element position indexed with x being from 0 to n, where n−1 is the total number of elements, << is a left rotation (that wraps around) for a given number of bits, >> is a right rotation (that wraps around) for a given number of bits, ^ is a logical (e.g., binary) XOR operator, | is a logical (e.g., binary) OR operator that outputs a high bit (one) if either bit or both bits in a respective bit position is set to high (one), & is a logical (e.g., binary) AND operator, and ? is a conditional operator (e.g., if condition is true ? then value X: otherwise value Y):

```
// DEFINITIONS
#define ROL64(x, n) (((x) << (n)) ^ ((x) >> (64-(n))))
#define ROR64(x, n) (((x) >> (n)) ^ ((x) << (64-(n))))
#define SHR64(x, n) ((x) >> (n))
#define S0(a) (ROR64(a,28) ^ ROR64(a, 34) ^ ROR64(a,39))
#define S1(e) (ROR64(e,14) ^ ROR64(e, 18) ^ ROR64(e,41))
#define MAJ(a,b,c) (((a) & (b)) ^ ((a) & (c)) ^ ((b) & (c)))
#define CH(e,f,g) (((e) & (f)) ^ ((g) & ~(e)))
// INSTRUCTION FLOW
A[0] := SRC1.qword[3]
B[0] := SRC1.qword[2]
C[0] := SRCDST.qword[3]
D[0] := SRCDST.qword[2]
E[0] := SRC1.qword[1]
F[0] := SRC1.qword[0]
G[0] := SRCDST.qword[1]
H[0] := SRCDST.qword[0]
WK[0] := SRC2.qword[0]
WK[1] := SRC2.qword[1]
FOR i in 0 to 1:
    A[i+1] := CH(E[i], F[i], G[i]) + S1(E[i]) +
    WK[i] + H[i] + MAJ(A[i], B[i], C[i]) +
    S0(A[i])
    B[i+1] := A[i]
    C[i+1] := B[i]
    D[i+1] := C[i]
    E[i+1] := CH(E[i], F[i], G[i]) + S1(E[i]) +
    WK[i] + H[i] + D[i]
    F[i+1] := E[i]
    G[i+1] := F[i]
    H[i+1] := G[i]
SRCDST.qword[3] = A[2]
SRCDST.qword[2] = B[2]
SRCDST.qword[1] = E[2]
SRCDST.qword[0] = F[2]
```

In certain embodiments, a VSHA512RNDS2 instruction performs (e.g., only) two rounds of SHA512 operation using an initial SHA512 state (C, D, G, H) from the first operand, an initial SHA256 state (A, B, E, F) from the second operand, and a pre-computed sum of the next two round message quadwords and the corresponding round constants (e.g., from the implicit operand xmm0). In one embodiment, only the two lower qwords of XMM0 are used by the instruction. In certain embodiments, an updated SHA512 state (A, B, E, F) is written to the first operand, and the second operand can be used as the updated state (C, D, G, H) in later rounds.

Figure 19:
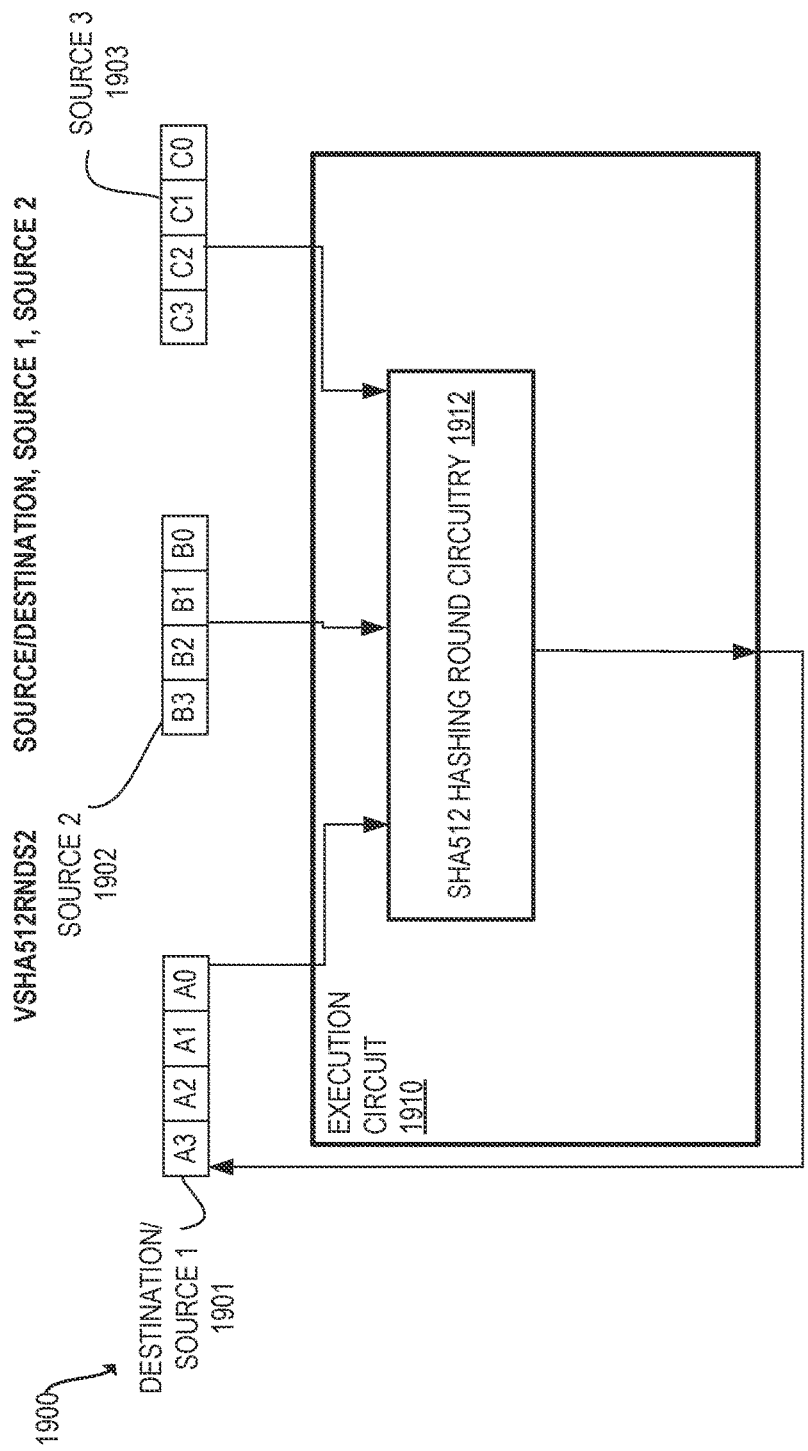
FIG. 19 illustrates circuitry including an execution circuit with SHA512 hashing round circuitry according to embodiments of the disclosure.

FIG. 19 illustrates circuitry 1900 including an execution circuit 1910 with SHA512 hashing round circuitry 1912 according to embodiments of the disclosure. In certain embodiments, decode circuit (e.g., decode circuit 102 in FIG. 1 or decode circuit 206 in FIG. 2) decodes an instruction into a decoded instruction that causes execution circuit 1910 to perform a hashing operation with SHA512 hashing round circuitry 1912 (for example, the decoded instruction indicates to execution circuit 1910 which components to use, e.g., here to use the SHA512 hashing round circuitry 1912, the direction(s) of rotation and shifting, and the values of the rotation constants and shifting constants). In the depicted embodiment, an instruction format may include one or more fields that identifies the first packed data destination/source 1901, second packed data source 1902, and the third packed data source 1903. In the depicted embodiment, the first packed data destination/source 1901, second packed data source 1902, and the third packed data source 1903 each include four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 1901 is a four element location that stores state elements C, D, G, and H, respectively, second packed data source 1902 is a four element location that stores state elements A, B, E, and F, respectively, and the third packed data source 1903 is a two element location (e.g., the first two elements of a four element location) that stores input message elements (e.g., each element being a pre-computed sum of message elements and corresponding round constants for the next round "0" and the round after next "1", respectively) (e.g., WK[0], and WK[1]), respectively where "WK" refers to W XOR K for a particular round [round]. In one embodiment, WK[i] uses message word [i] (referred to as "K") XORed with Key Const[i] (referred to as "K") for a particular round [i]. In certain embodiments, a message word is source either from (1) the input to a hash (e.g., for the first 16 words) or (2) resultant calculation (e.g., using the VSHA512MSG1/VSHA512MSG2 instructions) for the other the message words (e.g., for the rest 64 words). Input state elements (e.g., C, D, G, and H) may be sourced from a scheduling instruction(s).

In certain embodiments, SHA512 hashing round circuitry 1914 performs hashing operations (e.g., two rounds as discussed herein) on the state elements C, D, G, and H from first packed data destination/source 1901, the state elements A, B, E, and F from second packed data source 1902, and a pre-computed sum of the next 2 round message elements (e.g., 64-bit qwords) and the corresponding round constants from the third packed data source 1903 to generate a hash two round result (e.g., including updated state elements A, B, E, and F). The packed data hashing result (e.g., updated state elements A, B, E, and F) may then be stored (e.g., committed to be visible by other instructions) into destination 1901.

Figure 20:
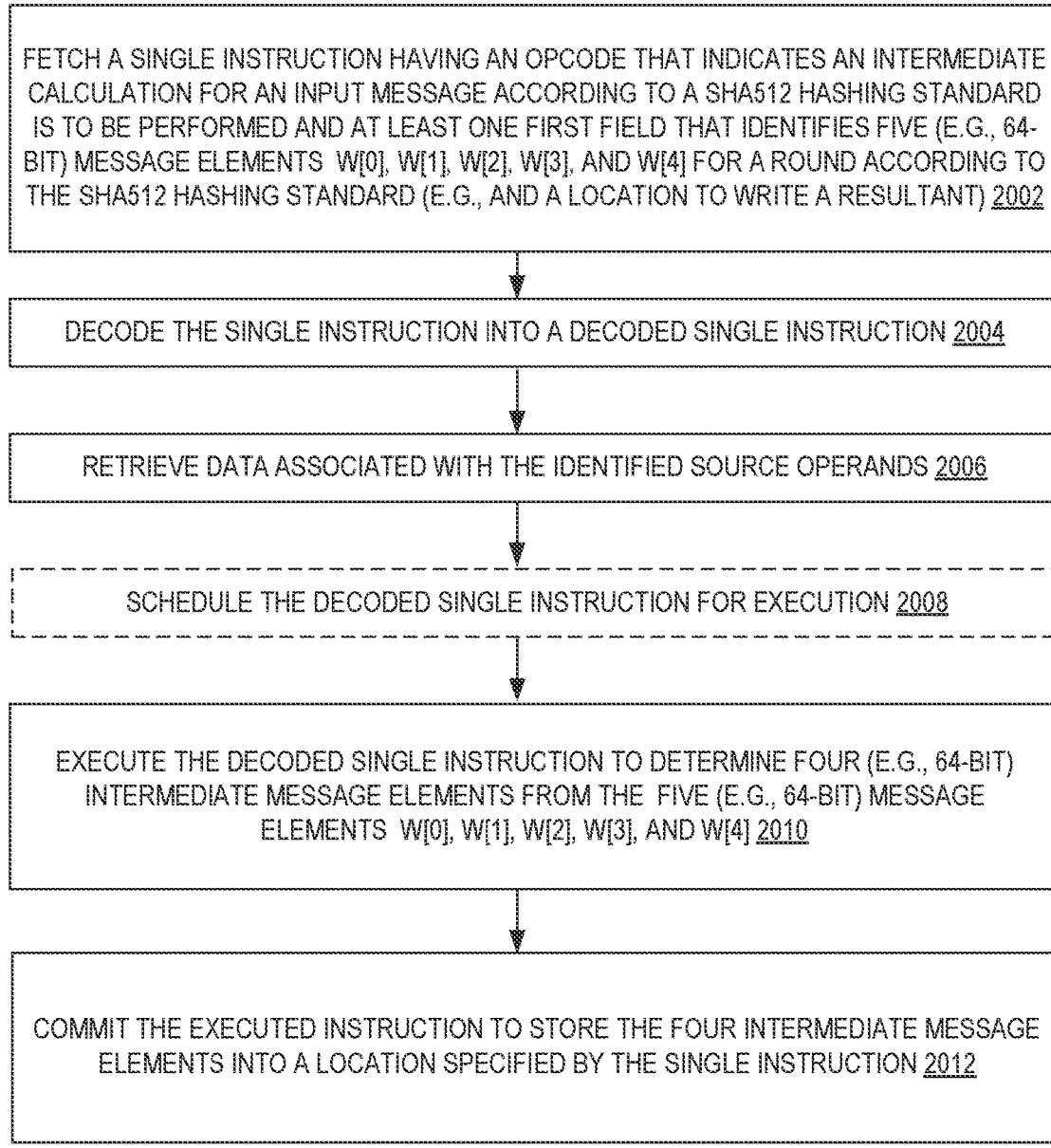
FIG. 20 illustrates a method of processing an intermediate message instruction according to a SHA512 hashing standard according to embodiments of the disclosure.

FIG. 20 illustrates a method 2000 of processing an intermediate message instruction according to a SHA512 hashing standard according to embodiments of the disclosure. A processor (e.g., or processor core) may perform method 2000, e.g., in response to receiving a request to execute an instruction from software. Depicted method 2000 includes processing a SHA512 hashing standard instruction by: fetch a single instruction having an opcode that indicates an intermediate calculation for an input message according to a SHA512 hashing standard is to be performed and at least one first field that identifies five (e.g., 64-bit) message elements W[i+0], W[i+1], W[i+2], W[i+3], and W[i+4] for a round "i" (e.g., an immediately previous round) according to the SHA512 hashing standard (e.g., and a location to write a resultant) at 2002, decode the instruction into a decoded instruction at 2004, retrieve data associated with the identified source operands at 2006, (optionally) schedule the decoded instruction for execution at 2008, execute the decoded instruction to determine four (e.g., 64-bit) intermediate message elements from the five (e.g., 64-bit) message elements W[i+0], W[i+1], W[i+2], W[i+3], and W[i+4] at 2010 (where "i" is the round number or other scheduling index), and commit the executed instruction to store the four intermediate message elements into a location specified by the single instruction at 2012.

The opcode may correspond to (e.g., identifies) the vector instruction mnemonic of VSHA512MSG1 (e.g., where (optional usage of) "V" represents a vector operation (e.g., VEX as discussed below), "SHA512" represents the hashing standard being SHA512, and "MSG1" represents an intermediate message "1" used to generate a final message "2", with the data from that final message used as an input of a VSHA512RNDS2 instruction).

In one embodiment, an instruction has the following format for its fields: VSHA512MSG1 SOURCE/DESTINATION, SOURCE 1// where source/destination is a first packed data source (e.g., register) and destination, and source 1 is the second packed data source (e.g., which may be a register or memory address). In one embodiment, each of the registers used is a (e.g., 256-bit) YMM register (e.g., YMM1, YMM2, etc.).

Pseudocode for the performance of this instruction may be as follows (e.g., where qword is a quadword size of 64-bits for each element, [x] is an element position indexed with x being from 0 to n, where n−1 is the total number of elements, << is a left rotation (that wraps around) for a given number of bits, >> is a right rotation (that wraps around) for a given number of bits, A is a logical (e.g., binary) XOR operator, | is a logical (e.g., binary) OR operator that outputs a high bit (one) if either bit or both bits in a respective bit position is set to high (one), & is a logical (e.g., binary) AND operator, and ? is a conditional operator (e.g., if condition is true ? then value X: otherwise value Y):

```
// DEFINITIONS
#define ROL64(x, n) (((x) << (n)) ^ ((x) >> (64-(n))))
#define ROR64(x, n) (((x) >> (n)) ^ ((x) << (64-(n))))
#define SHR64(x, n) ((x) >> (n))
#define s0(w) (ROR64(w,1) ^ ROR64(w,8) ^ SHR64(w,7))
// INSTRUCTION FLOW
W[4] := SRC1.qword[0]
W[3] := SRCDST.qword[3]
W[2] := SRCDST.qword[2]
W[1] := SRCDST.qword[1]
W[0] := SRCDST.qword[0]
SRCDST.qword[3] := W[3] + s0(W[4])
SRCDST.qword[2] := W[2] + s0(W[3])
SRCDST.qword[1] := W[1] + s0(W[2])
SRCDST.qword[0] := W[0] + s0(W[1])
```

In certain embodiments, a VSHA512MSG1 a is one of two SHA512 message scheduling instructions. In certain embodiments, the VSHA512MSG1 instruction performs an intermediate calculation for the next four SHA512 message quadwords.

Figure 21:
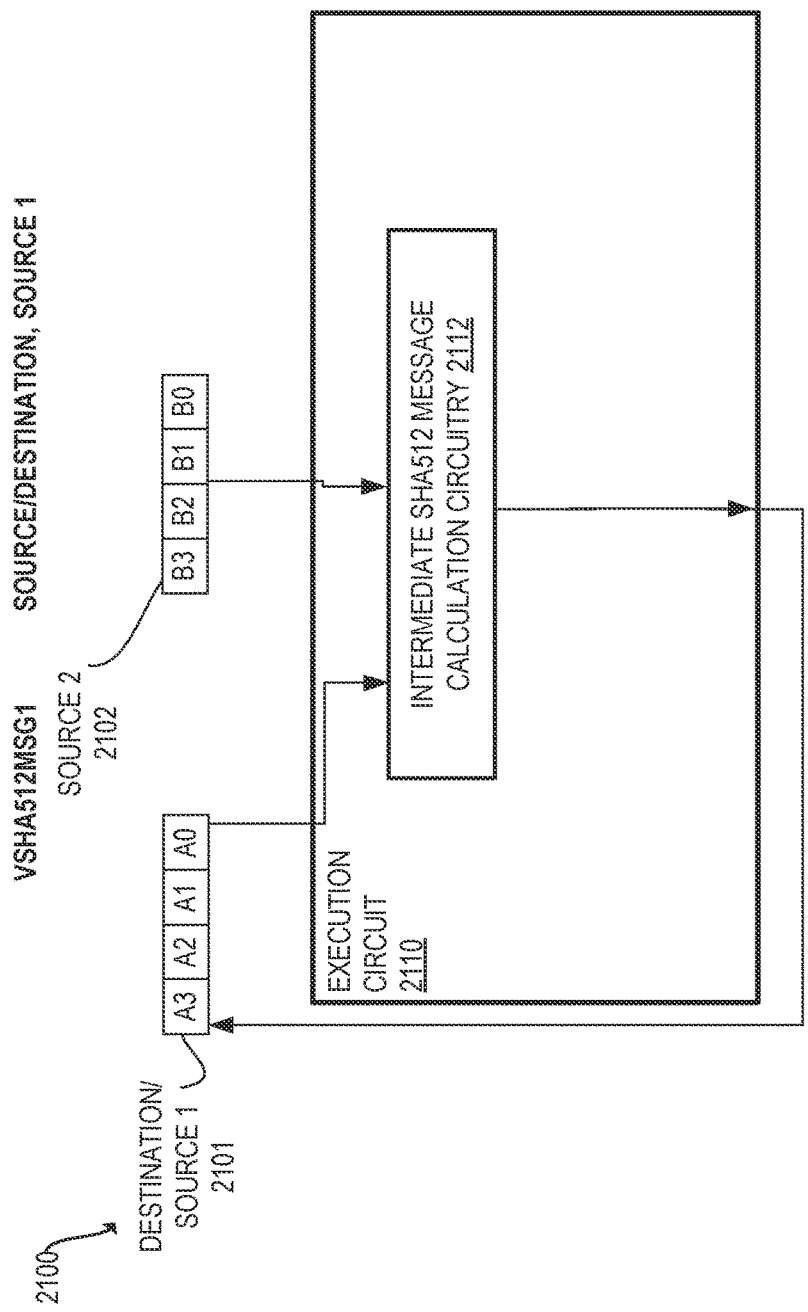
FIG. 21 illustrates circuitry including an execution circuit with intermediate SHA512 message calculation circuitry according to embodiments of the disclosure.

FIG. 21 illustrates circuitry 2100 including an execution circuit 2110 with intermediate SHA512 message calculation circuitry 2112 according to embodiments of the disclosure. In certain embodiments, decode circuit (e.g., decode circuit 102 in FIG. 1 or decode circuit 206 in FIG. 2) decodes an instruction into a decoded instruction that causes execution circuit 2110 to perform a SHA512 message calculation operation with intermediate SHA512 message calculation circuitry 2112 (for example, the decoded instruction indicate to execution circuit 2110 which components to use, e.g., here to use the intermediate SHA512 message calculation circuitry 2112). In the depicted embodiment, an instruction format may include one or more fields that identifies the first packed data destination/source 2101 and second packed data source 2102. In the depicted embodiment, the first packed data destination/source 2101 and second packed data source 2102 each include four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 2101 is a four element location that stores input message elements W[i], W[i+1], W[2], and W[i+3], respectively and second packed data source 2102 is a one (e.g., or four elements, with three elements not utilized) element location that stores input message element W[i+4]. Input message elements may be sourced from an input message, e.g., a hashing input. The input message may be from a previous message (e.g., a previous round to the round the current message is being determined).

In certain embodiments, intermediate SHA512 message calculation circuitry 2112 of execution circuit 2110 performs message generation operations on the input message elements to generate a plurality (e.g., four) intermediate message elements as indicated by the instruction (e.g., by the opcode). In one embodiment, the message generation operations are performed on each element in parallel. The packed data intermediate message result may then be stored (e.g., committed to be visible by other instructions) into destination 2101, for example, for use by a next (e.g., in program order) of the pair of message scheduling instructions.

Figure 22:
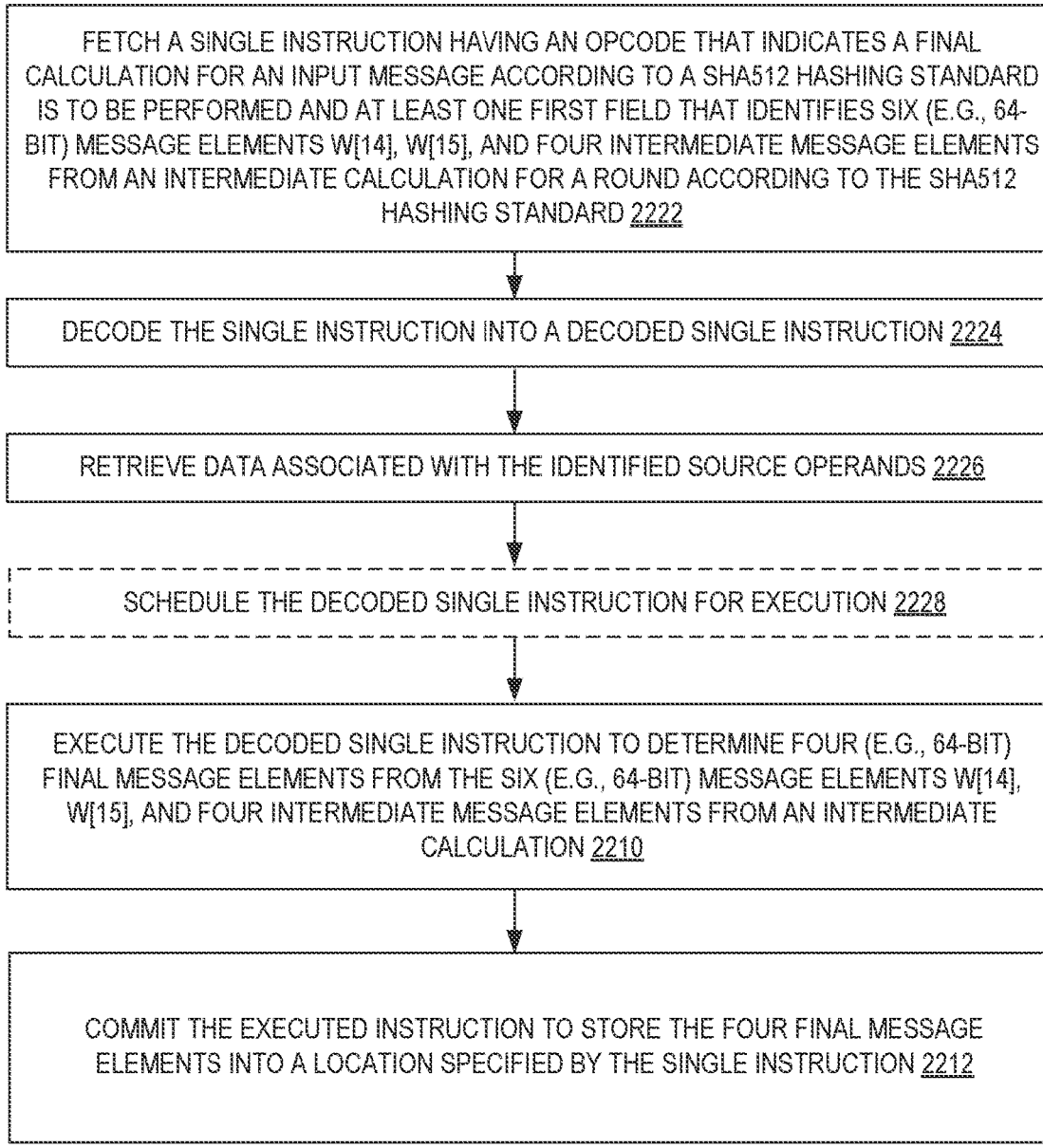
FIG. 22 illustrates a method of processing a final message instruction according to a SHA512 hashing standard according to embodiments of the disclosure.

FIG. 22 illustrates a method 2200 of processing a final message instruction according to a SHA512 hashing standard according to embodiments of the disclosure. Final message instruction may be next (e.g., in program order) to an intermediate message instruction that is providing its output as an input to the final message instruction. A processor (e.g., or processor core) may perform method 2200, e.g., in response to receiving a request to execute an instruction from software. Depicted method 2200 includes processing a SHA512 hashing standard instruction by: fetch a single instruction having an opcode that indicates a final calculation for an input message according to a SHA512 hashing standard is to be performed and at least one first field that identifies six (e.g., 64-bit) message elements W[i+14], W[i+15], and four intermediate message elements from an intermediate calculation for a round according to the SHA512 hashing standard at 2222, decode the instruction into a decoded instruction at 2204, retrieve data associated with the identified source operands at 2206, (optionally) schedule the decoded instruction for execution at 2208, execute the decoded instruction to determine four (e.g., 64-bit) final message elements from the six (e.g., 64-bit) message elements W[i+14], W[i+15], and four intermediate message elements from an intermediate calculation at 2210, and commit the executed instruction to store the four final message elements (e.g., W[i+16], W[i+17], W[i+18], and W[i+19]) into a location specified by the single instruction at 2212.

The opcode may correspond to (e.g., identifies) the vector instruction mnemonic of VSHA512MSG2 (e.g., where (optional usage of) "V" represents a vector operation (e.g., VEX as discussed below), "SHA512" represents the hashing standard being SHA512, and "MSG1" represents a final message "2" generated from an intermediate message "1", with the data from the final message used as an input of a VSHA512RNDS2 instruction).

In one embodiment, an instruction has the following format for its fields: VSHA512MSG2 SOURCE/DESTINATION, SOURCE 1// where source/destination is a first packed data source (e.g., register) and destination, and source 1 is the second packed data source (e.g., which may be a register or memory address). In one embodiment, each of the registers used is a (e.g., 256-bit) YMM register (e.g., YMM1, YMM2, etc.).

Pseudocode for the performance of this instruction may be as follows (e.g., where qword is a quadword size of 62-bits for each element, [x] is an element position indexed with x being from 0 to n, where n−1 is the total number of elements, << is a left rotation (that wraps around) for a given number of bits, >> is a right rotation (that wraps around) for a given number of bits, ^ is a logical (e.g., binary) XOR operator, | is a logical (e.g., binary) OR operator that outputs a high bit (one) if either bit or both bits in a respective bit position is set to high (one), & is a logical (e.g., binary) AND operator, and ? is a conditional operator (e.g., if condition is true ? then value X: otherwise value Y):

```
// DEFINITIONS
#define ROL64(x, n) (((x) << (n)) ^ ((x) >> (64-(n))))
#define ROR64(x, n) (((x) >> (n)) ^ ((x) << (64-(n))))
#define SHR64(x, n) ((x) >> (n))
#define s1(w) (ROR64(w,19) ^ ROR64(w, 61) ^ SHR64(w, 6))
// INSTRUCTION FLOW
W[14] := SRC1.qword[2]
W[15] := SRC1.qword[3]
W[16] := SRCDST.qword[0] + s1(W[14])
W[17] := SRCDST.qword[1] + s1(W[15])
W[18] := SRCDST.qword[2] + s1(W[16])
W[19] := SRCDST.qword[3] + s1(W[17])
SRCDST.qword[3] := W[19]
SRCDST.qword[2] := W[18]
SRCDST.qword[1] := W[17]
SRCDST.qword[0] := W[16]
```

In certain embodiments, a VSHA512MSG2 instruction is one of two SHA2 message scheduling instructions. In certain embodiments, a VSHA512MSG2 performs the final calculation for the next four SHA512 message quadwords.

Figure 23:
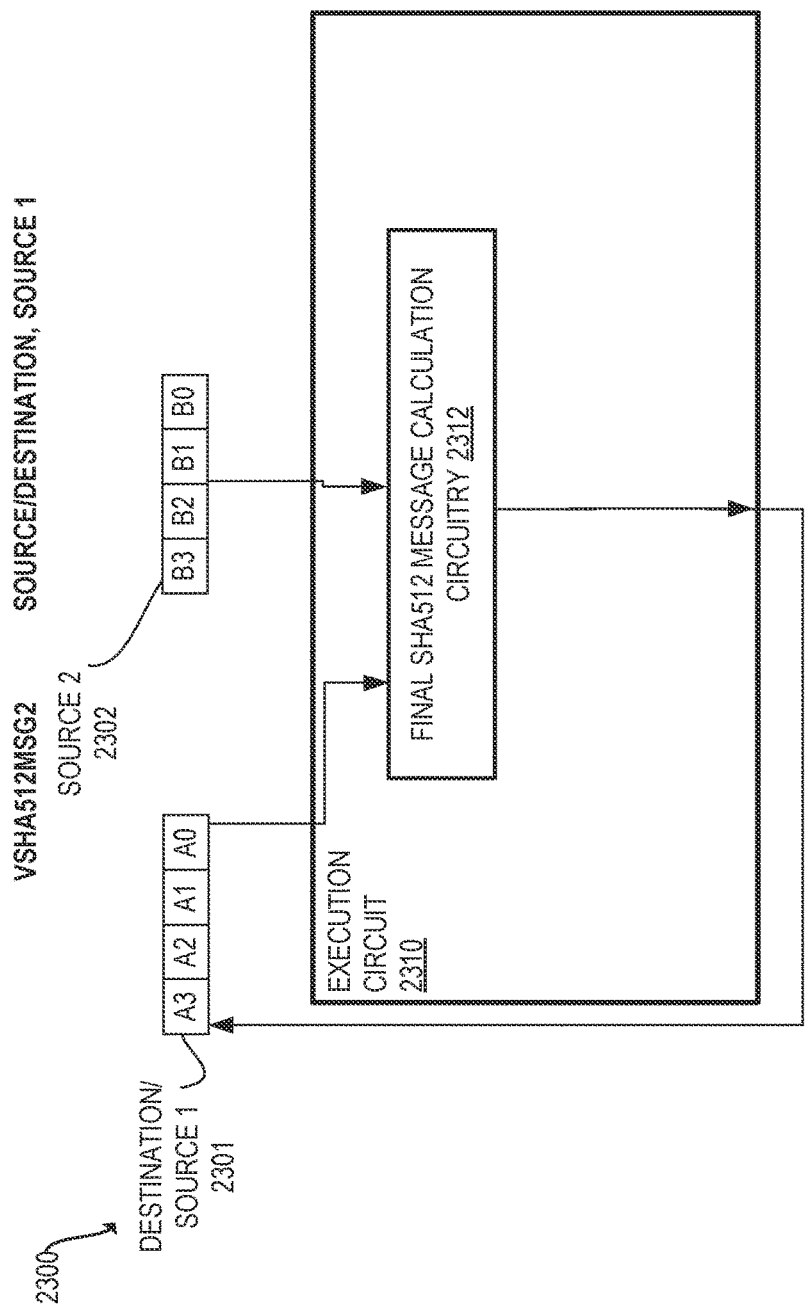
FIG. 23 illustrates circuitry including an execution circuit with final SHA512 message calculation circuitry according to embodiments of the disclosure.

FIG. 23 illustrates circuitry 2300 including an execution circuit 2310 with final SHA512 message calculation circuitry 2312 according to embodiments of the disclosure. In certain embodiments, decode circuit (e.g., decode circuit 102 in FIG. 1 or decode circuit 206 in FIG. 2) decodes an instruction into a decoded instruction that causes execution circuit 2310 to perform a SHA512 message calculation operation with final SHA512 message calculation circuitry 2312 (for example, the decoded instruction indicate to execution circuit 2310 which components to use, e.g., here to use the final SHA512 message calculation circuitry 2312). In the depicted embodiment, an instruction format may include one or more fields that identifies the first packed data destination/source 2301 and the second packed data source 2302. In the depicted embodiment, the first packed data destination/source 2301 and the second packed data source 2302 each include four elements (indexed 0-3). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the other packed data sources.

In one embodiment, first packed data destination/source 2301 is a four element location that stores intermediate message elements from an intermediate SHA512 message calculation instruction (e.g., VSHA512MSG1), respectively and second packed data source 2302 is a two element (e.g., or four elements, with two elements not utilized) location that stores input message elements W[i+14] and W[i+15], respectively. Input message elements may be sourced from an input message, e.g., a hashing input, and a previous intermediate SHA512 message calculation instruction (e.g., VSHA512MSG1). The input message may be from a previous message (e.g., a previous round to the round the current message is being determined).

In certain embodiments, final SHA512 message calculation circuitry 2312 of execution circuit 2310 performs message generation operations on the input message elements and intermediate message elements to generate a plurality (e.g., four) final message elements as indicated by the instruction (e.g., by the opcode). In one embodiment, the message generation operations are performed on each element in parallel. The packed data final message result (e.g., W[i+16], W[i+17], W[i+18], and W[i+19]) may then be stored (e.g., committed to be visible by other instructions) into destination 2301, for example, for use by a next (e.g., in program order) of the pair of message scheduling instructions.

At least some embodiments of the disclosed technologies can be described in view of the following examples:

Example 1. A processor comprising: a decode circuit to decode a single instruction into a decoded single instruction, the single instruction comprising at least one first field that identifies eight 32-bit state elements A, B, C, D, E, F, G, and H for a round according to a SM3 hashing standard and at least one second field that identifies an input message; and an execution circuit to execute the decoded single instruction to: rotate state element C left by 9 bits to form a rotated state element C, rotate state element D left by 9 bits to form a rotated state element D, rotate state element G left by 19 bits to form a rotated state element G, rotate state element H left by 19 bits to form a rotated state element H, perform two rounds according to the SM3 hashing standard on the input message and state element A, state element B, rotated state element C, rotated state element D, state element E, state element F, rotated state element G, and rotated state element H to generate an updated state element A, an updated state element B, an updated state element E, and an updated state element F, and store the updated state element A, the updated state element B, the updated state element E, and the updated state element F into a location specified by the single instruction.

Example 2. The processor of example 1, wherein the at least one first field includes: a first register field that identifies a first register that stores state elements C, D, G, and H, and a second register field that identifies a second register that stores state elements A, B, E, and F.

Example 3. The processor of example 2, wherein the at least one second field includes a third register field that identifies the input message.

Example 4. The processor of example 3, wherein the input message is four 32-bit message elements from a zeroth, first, fourth, and fifth element positions of a sixteen 32-bit message element input message.

Example 5. The processor of example 2, wherein the location specified by the single instruction to store the updated state element A, the updated state element B, the updated state element E, and the updated state element F is the first register.

Example 6. The processor of example 1, wherein: the decode circuit is to decode a second instruction into a decoded second instruction, the second instruction comprising at least one field that identifies four 32-bit initial state elements C, D, G, and H for an initial round of a data block according to the SM3 hashing standard; and the execution circuit is to execute the decoded second instruction to: rotate initial state element C right by 9 bits to form the state element C, rotate initial state element D right by 9 bits to form the state element D, rotate initial state element G right by 19 bits to form the state element G, rotate initial state element H right by 19 bits to form the state element H, and store the state element C, the state element D, the state element D, and the state element H in a location specified by the at least one first field of the single instruction.

Example 7. The processor of example 6, wherein the location is a first register.

Example 8. The processor of example 1, wherein: the decode circuit is to decode a second instruction into a decoded second instruction, the second instruction comprising at least one field that identifies the updated state elements C, D, G, and H generated by the single instruction for a final round of a data block according to the SM3 hashing standard; and the execution circuit is to execute the decoded second instruction to: rotate updated state element C left by 9 bits to form a final state element C of the data block, rotate updated state element D left by 9 bits to form a final state element D of the data block, rotate updated state element G left by 19 bits to form a final state element G of the data block, rotate updated state element H left by 19 bits to form a final state element H of the data block, and store the final state element C, the final state element D, the final state element D, and the final state element H in a location specified by the at least one field of the second instruction.

Example 9. A method comprising: decoding a single instruction into a decoded single instruction with a decode circuit of a processor, the single instruction comprising at least one first field that identifies eight 32-bit state elements A, B, C, D, E, F, G, and H for a round according to a SM3 hashing standard and at least one second field that identifies an input message; and executing the decoded single instruction with an execution circuit of the processor to: rotate state element C left by 9 bits to form a rotated state element C, rotate state element D left by 9 bits to form a rotated state element D, rotate state element G left by 19 bits to form a rotated state element G, rotate state element H left by 19 bits to form a rotated state element H, perform two rounds according to the SM3 hashing standard on the input message and state element A, state element B, rotated state element C, rotated state element D, state element E, state element F, rotated state element G, and rotated state element H to generate an updated state element A, an updated state element B, an updated state element E, and an updated state element F, and store the updated state element A, the updated state element B, the updated state element E, and the updated state element F into a location specified by the single instruction.

Example 10. The method of example 9, wherein the at least one first field includes: a first register field that identifies a first register that stores state elements C, D, G, and H, and a second register field that identifies a second register that stores state elements A, B, E, and F.

Example 11. The method of example 10, wherein the at least one second field includes a third register field that identifies the input message.

Example 12. The method of example 11, wherein the input message is four 32-bit message elements from a zeroth, first, fourth, and fifth element positions of a sixteen 32-bit message element input message.

Example 13. The method of example 10, wherein the location specified by the single instruction to store the updated state element A, the updated state element B, the updated state element E, and the updated state element F is the first register.

Example 14. The method of example 9, further comprising: decoding a second instruction into a decoded second instruction with the decode circuit, the second instruction comprising at least one field that identifies four 32-bit initial state elements C, D, G, and H for an initial round of a data block according to the SM3 hashing standard; and executing the decoded second instruction with the execution circuit to: rotate initial state element C right by 9 bits to form the state element C, rotate initial state element D right by 9 bits to form the state element D, rotate initial state element G right by 19 bits to form the state element G, rotate initial state element H right by 19 bits to form the state element H, and store the state element C, the state element D, the state element D, and the state element H in a location specified by the at least one first field of the single instruction.

Example 15. The method of example 14, further comprising repeating the decoding and the executing of the single instruction for multiple rounds of the data block according to the SM3 hashing standard.

Example 16. The method of example 15, further comprising: decoding a third instruction into a decoded third instruction with the decode circuit, the second instruction comprising at least one field that identifies the updated state elements C, D, G, and H generated by the single instruction for a final round of the multiple rounds of the data block according to the SM3 hashing standard; and executing the third instruction with the execution circuit to: rotate updated state element C left by 9 bits to form a final state element C of the data block, rotate updated state element D left by 9 bits to form a final state element D of the data block, rotate updated state element G left by 19 bits to form a final state element G of the data block, rotate updated state element H left by 19 bits to form a final state element H of the data block, and store the final state element C, the final state element D, the final state element D, and the final state element H in a location specified by the at least one field of the third instruction.

Example 17. A non-transitory machine readable medium that stores code that when executed by a machine causes the machine to perform a method comprising: decoding a single instruction into a decoded single instruction with a decode circuit of a processor, the single instruction comprising at least one first field that identifies eight 32-bit state elements A, B, C, D, E, F, G, and H for a round according to a SM3 hashing standard and at least one second field that identifies an input message; and executing the decoded single instruction with an execution circuit of the processor to: rotate state element C left by 9 bits to form a rotated state element C, rotate state element D left by 9 bits to form a rotated state element D, rotate state element G left by 19 bits to form a rotated state element G, rotate state element H left by 19 bits to form a rotated state element H, perform two rounds according to the SM3 hashing standard on the input message and state element A, state element B, rotated state element C, rotated state element D, state element E, state element F, rotated state element G, and rotated state element H to generate an updated state element A, an updated state element B, an updated state element E, and an updated state element F, and store the updated state element A, the updated state element B, the updated state element E, and the updated state element F into a location specified by the single instruction.

Example 18. The non-transitory machine readable medium of example 17, wherein the at least one first field includes: a first register field that identifies a first register that stores state elements C, D, G, and H, and a second register field that identifies a second register that stores state elements A, B, E, and F.

Example 19. The non-transitory machine readable medium of example 18, wherein the at least one second field includes a third register field that identifies the input message.

Example 20. The non-transitory machine readable medium of example 19, wherein the input message is four 32-bit message elements from a zeroth, first, fourth, and fifth element positions of a sixteen 32-bit message element input message.

Example 21. The non-transitory machine readable medium of example 18, wherein the location specified by the single instruction to store the updated state element A, the updated state element B, the updated state element E, and the updated state element F is the first register.

Example 22. The non-transitory machine readable medium of example 17, further comprising: decoding a second instruction into a decoded second instruction with the decode circuit, the second instruction comprising at least one field that identifies four 32-bit initial state elements C, D, G, and H for an initial round of a data block according to the SM3 hashing standard; and executing the decoded second instruction with the execution circuit to: rotate initial state element C right by 9 bits to form the state element C, rotate initial state element D right by 9 bits to form the state element D, rotate initial state element G right by 19 bits to form the state element G, rotate initial state element H right by 19 bits to form the state element H, and store the state element C, the state element D, the state element D, and the state element H in a location specified by the at least one first field of the single instruction.

Example 23. The non-transitory machine readable medium of example 22, further comprising repeating the decoding and the executing of the single instruction for multiple rounds of the data block according to the SM3 hashing standard.

Example 24. The non-transitory machine readable medium of example 23, further comprising: decoding a third instruction into a decoded third instruction with the decode circuit, the second instruction comprising at least one field that identifies the updated state elements C, D, G, and H generated by the single instruction for a final round of the multiple rounds of the data block according to the SM3 hashing standard; and executing the third instruction with the execution circuit to: rotate updated state element C left by 9 bits to form a final state element C of the data block, rotate updated state element D left by 9 bits to form a final state element D of the data block, rotate updated state element G left by 19 bits to form a final state element G of the data block, rotate updated state element H left by 19 bits to form a final state element H of the data block, and store the final state element C, the final state element D, the final state element D, and the final state element H in a location specified by the at least one field of the third instruction.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 24A:
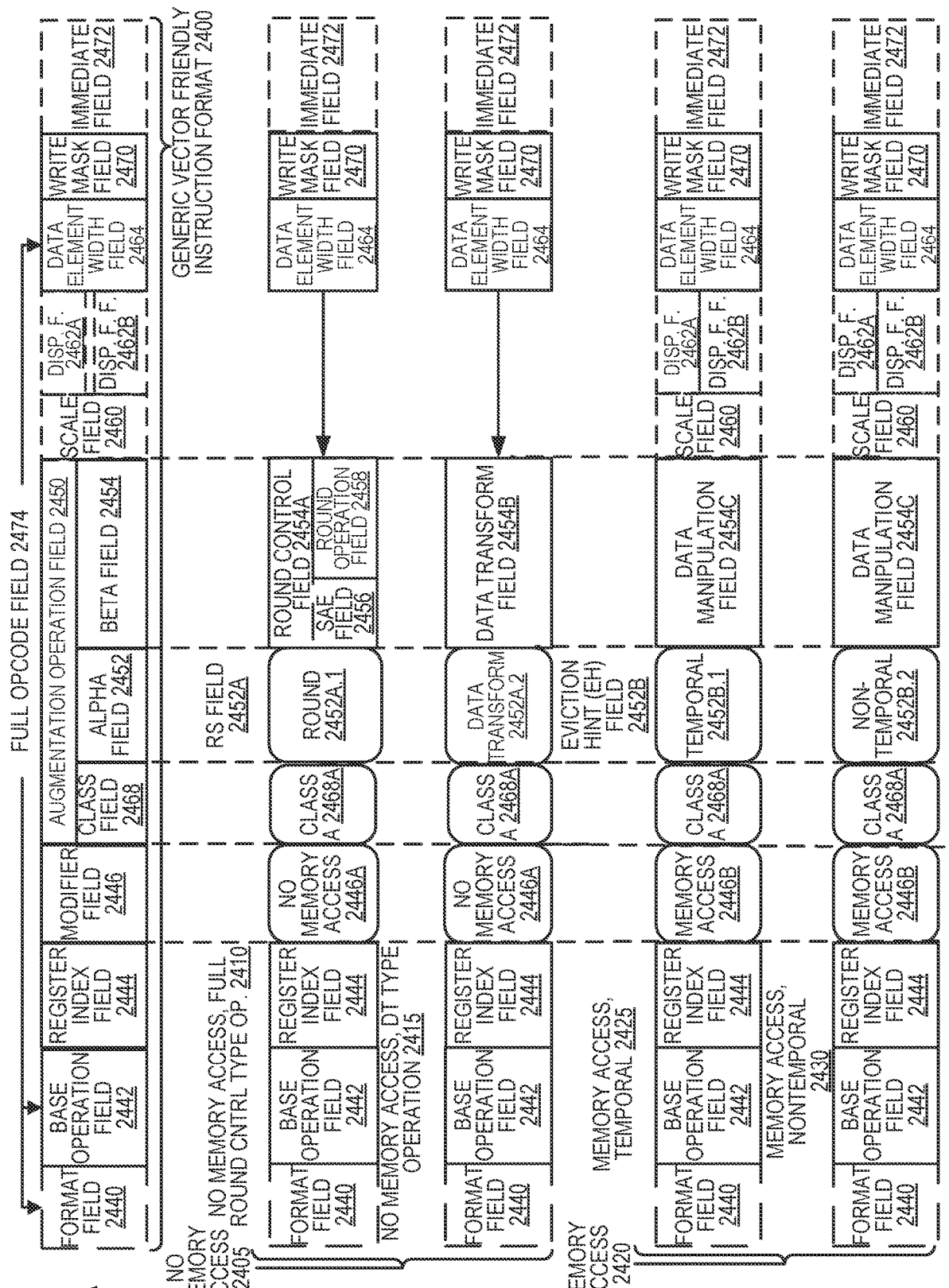
FIG. 24A is a block diagram illustrating a generic vector friendly instruction format and class A instruction templates thereof according to embodiments of the disclosure.
Figure 24B:
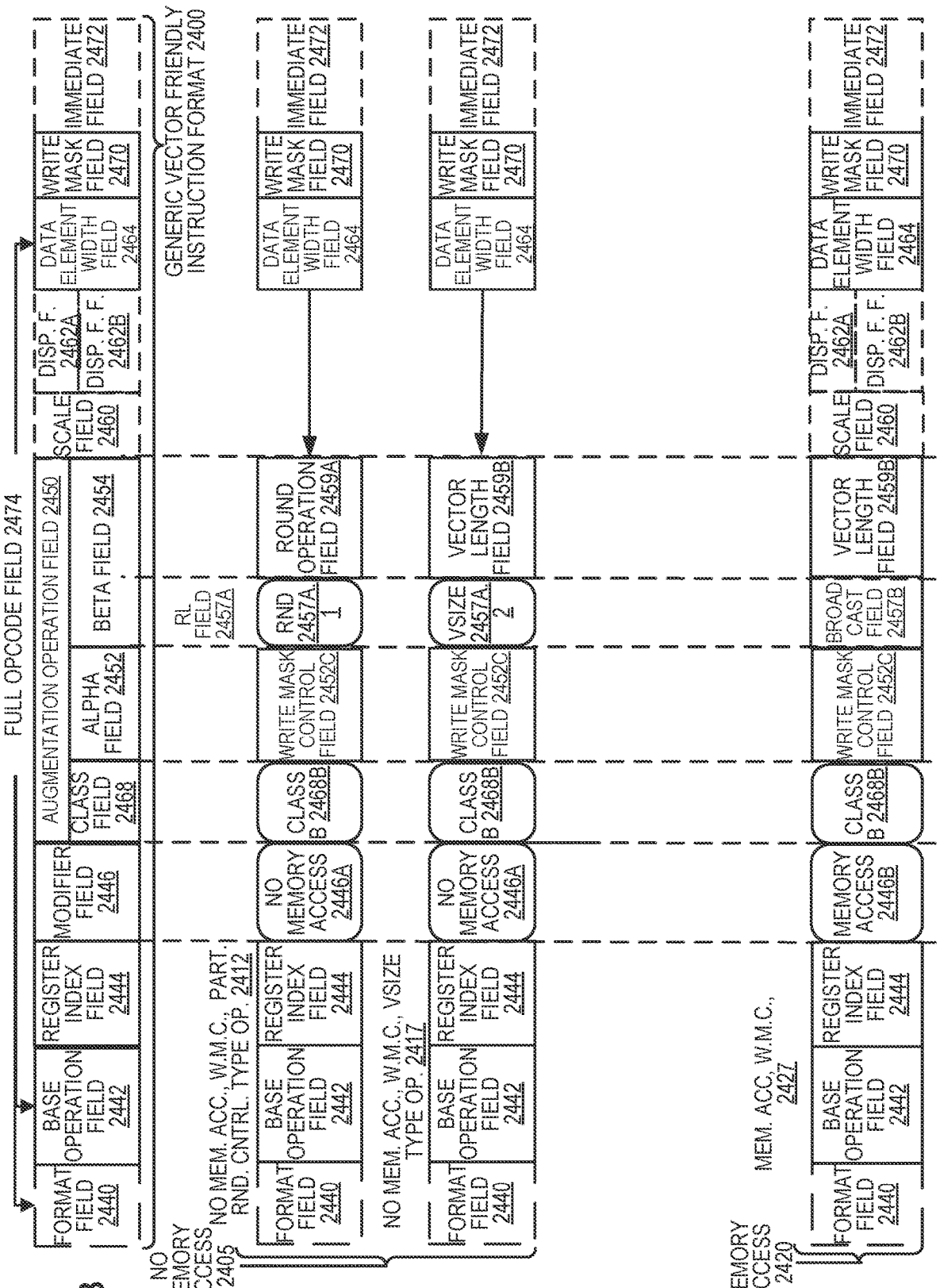
FIG. 24B is a block diagram illustrating the generic vector friendly instruction format and class B instruction templates thereof according to embodiments of the disclosure.

FIGS. 24A-24B are block diagrams illustrating a generic vector friendly instruction format and instruction templates thereof according to embodiments of the disclosure. FIG. 24A is a block diagram illustrating a generic vector friendly instruction format and class A instruction templates thereof according to embodiments of the disclosure; while FIG. 24B is a block diagram illustrating the generic vector friendly instruction format and class B instruction templates thereof according to embodiments of the disclosure. Specifically, a generic vector friendly instruction format 2400 for which are defined class A and class B instruction templates, both of which include no memory access 2405 instruction templates and memory access 2420 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand and sizes (e.g., 256 byte vector operands) with more, less, or different data element widths (e.g., 128 bit (16 byte) data element widths).

The class A instruction templates in FIG. 24A include: 1) within the no memory access 2405 instruction templates there is shown a no memory access, full round control type operation 2410 instruction template and a no memory access, data transform type operation 2415 instruction template; and 2) within the memory access 2420 instruction templates there is shown a memory access, temporal 2425 instruction template and a memory access, non-temporal 2430 instruction template. The class B instruction templates in FIG. 24B include: 1) within the no memory access 2405 instruction templates there is shown a no memory access, write mask control, partial round control type operation 2412 instruction template and a no memory access, write mask control, vsize type operation 2417 instruction template; and 2) within the memory access 2420 instruction templates there is shown a memory access, write mask control 2427 instruction template.

The generic vector friendly instruction format 2400 includes the following fields listed below in the order illustrated in FIGS. 24A-24B.

Format field 2440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2442—its content distinguishes different base operations.

Register index field 2444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2446—its content distinguishes occurrences of instructions in the generic vector instruction format that specify memory access from those that do not; that is, between no memory access 2405 instruction templates and memory access 2420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2450—its content distinguishes which one of a variety of different operations to be performed in addition to the base operation. This field is context specific. In one embodiment of the disclosure, this field is divided into a class field 2468, an alpha field 2452, and a beta field 2454. The augmentation operation field 2450 allows common groups of operations to be performed in a single instruction rather than 2, 3, or 4 instructions.

Scale field 2460—its content allows for the scaling of the index field's content for memory address generation (e.g., for address generation that uses $2^{scale}$*index+base).

Displacement Field 2462A—its content is used as part of memory address generation (e.g., for address generation that uses $2^{scale}$*index+base+displacement).

Displacement Factor Field 2462B (note that the juxtaposition of displacement field 2462A directly over displacement factor field 2462B indicates one or the other is used)—its content is used as part of address generation; it specifies a displacement factor that is to be scaled by the size of a memory access (N) —where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2474 (described later herein) and the data manipulation field 2454C. The displacement field 2462A and the displacement factor field 2462B are optional in the sense that they are not used for the no memory access 2405 instruction templates and/or different embodiments may implement only one or none of the two.

Data element width field 2464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2470 allows for partial vector operations, including loads, stores, arithmetic, logical, etc. While embodiments of the disclosure are described in which the write mask field's 2470 content selects one of a number of write mask registers that contains the write mask to be used (and thus the write mask field's 2470 content indirectly identifies that masking to be performed), alternative embodiments instead or additional allow the mask write field's 2470 content to directly specify the masking to be performed.

Immediate field 2472—its content allows for the specification of an immediate. This field is optional in the sense that it is not present in an implementation of the generic vector friendly format that does not support immediate and it is not present in instructions that do not use an immediate.

Class field 2468—its content distinguishes between different classes of instructions. With reference to FIGS. 24A-

B, the contents of this field select between class A and class B instructions. In FIGS. 24A-B, rounded corner squares are used to indicate a specific value is present in a field (e.g., class A 2468A and class B 2468B for the class field 2468 respectively in FIGS. 24A-B).

Instruction Templates of Class A

In the case of the non-memory access 2405 instruction templates of class A, the alpha field 2452 is interpreted as an RS field 2452A, whose content distinguishes which one of the different augmentation operation types are to be performed (e.g., round 2452A.1 and data transform 2452A.2 are respectively specified for the no memory access, round type operation 2410 and the no memory access, data transform type operation 2415 instruction templates), while the beta field 2454 distinguishes which of the operations of the specified type is to be performed. In the no memory access 2405 instruction templates, the scale field 2460, the displacement field 2462A, and the displacement scale filed 2462B are not present.

No-Memory Access Instruction Templates—Full Round Control Type Operation

In the no memory access full round control type operation 2410 instruction template, the beta field 2454 is interpreted as a round control field 2454A, whose content(s) provide static rounding. While in the described embodiments of the disclosure the round control field 2454A includes a suppress all floating point exceptions (SAE) field 2456 and a round operation control field 2458, alternative embodiments may support may encode both these concepts into the same field or only have one or the other of these concepts/fields (e.g., may have only the round operation control field 2458).

SAE field 2456—its content distinguishes whether or not to disable the exception event reporting; when the SAE field's 2456 content indicates suppression is enabled, a given instruction does not report any kind of floating-point exception flag and does not raise any floating point exception handler.

Round operation control field 2458—its content distinguishes which one of a group of rounding operations to perform (e.g., Round-up, Round-down, Round-towards-zero and Round-to-nearest). Thus, the round operation control field 2458 allows for the changing of the rounding mode on a per instruction basis. In one embodiment of the disclosure where a processor includes a control register for specifying rounding modes, the round operation control field's 2450 content overrides that register value.

No Memory Access Instruction Templates—Data Transform Type Operation

In the no memory access data transform type operation 2415 instruction template, the beta field 2454 is interpreted as a data transform field 2454B, whose content distinguishes which one of a number of data transforms is to be performed (e.g., no data transform, swizzle, broadcast).

In the case of a memory access 2420 instruction template of class A, the alpha field 2452 is interpreted as an eviction hint field 2452B, whose content distinguishes which one of the eviction hints is to be used (in FIG. 24A, temporal 2452B.1 and non-temporal 2452B.2 are respectively specified for the memory access, temporal 2425 instruction template and the memory access, non-temporal 2430 instruction template), while the beta field 2454 is interpreted as a data manipulation field 2454C, whose content distinguishes which one of a number of data manipulation operations (also known as primitives) is to be performed (e.g., no manipulation; broadcast; up conversion of a source; and down conversion of a destination). The memory access 2420 instruction templates include the scale field 2460, and optionally the displacement field 2462A or the displacement scale field 2462B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2452 is interpreted as a write mask control (Z) field 2452C, whose content distinguishes whether the write masking controlled by the write mask field 2470 should be a merging or a zeroing.

In the case of the non-memory access 2405 instruction templates of class B, part of the beta field 2454 is interpreted as an RL field 2457A, whose content distinguishes which one of the different augmentation operation types are to be performed (e.g., round 2457A.1 and vector length (VSIZE) 2457A.2 are respectively specified for the no memory access, write mask control, partial round control type operation 2412 instruction template and the no memory access, write mask control, VSIZE type operation 2417 instruction template), while the rest of the beta field 2454 distinguishes which of the operations of the specified type is to be performed. In the no memory access 2405 instruction templates, the scale field 2460, the displacement field 2462A, and the displacement scale filed 2462B are not present.

In the no memory access, write mask control, partial round control type operation 2410 instruction template, the rest of the beta field 2454 is interpreted as a round operation field 2459A and exception event reporting is disabled (a given instruction does not report any kind of floating-point exception flag and does not raise any floating point exception handler).

Round operation control field 2459A—just as round operation control field 2458, its content distinguishes which one of a group of rounding operations to perform (e.g., Round-up, Round-down, Round-towards-zero and Round-to-nearest). Thus, the round operation control field 2459A allows for the changing of the rounding mode on a per instruction basis. In one embodiment of the disclosure where a processor includes a control register for specifying rounding modes, the round operation control field's 2450 content overrides that register value.

In the no memory access, write mask control, VSIZE type operation 2417 instruction template, the rest of the beta field 2454 is interpreted as a vector length field 2459B, whose content distinguishes which one of a number of data vector lengths is to be performed on (e.g., 128, 256, or 512 byte).

In the case of a memory access 2420 instruction template of class B, part of the beta field 2454 is interpreted as a broadcast field 2457B, whose content distinguishes whether or not the broadcast type data manipulation operation is to be performed, while the rest of the beta field 2454 is interpreted the vector length field 2459B. The memory access 2420 instruction templates include the scale field 2460, and optionally the displacement field 2462A or the displacement scale field 2462B.

With regard to the generic vector friendly instruction format 2400, a full opcode field 2474 is shown including the format field 2440, the base operation field 2442, and the data element width field 2464. While one embodiment is shown where the full opcode field 2474 includes all of these fields, the full opcode field 2474 includes less than all of these fields in embodiments that do not support all of them. The full opcode field 2474 provides the operation code (opcode).

The augmentation operation field 2450, the data element width field 2464, and the write mask field 2470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 25 is a block diagram illustrating an exemplary specific vector friendly instruction format according to embodiments of the disclosure. FIG. 25 shows a specific vector friendly instruction format 2500 that is specific in the sense that it specifies the location, size, interpretation, and order of the fields, as well as values for some of those fields. The specific vector friendly instruction format 2500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 24 into which the fields from FIG. 25 map are illustrated.

It should be understood that, although embodiments of the disclosure are described with reference to the specific vector friendly instruction format 2500 in the context of the generic vector friendly instruction format 2400 for illustrative purposes, the disclosure is not limited to the specific vector friendly instruction format 2500 except where claimed. For example, the generic vector friendly instruction format 2400 contemplates a variety of possible sizes for the various fields, while the specific vector friendly instruction format 2500 is shown as having fields of specific sizes. By way of specific example, while the data element width field 2464 is illustrated as a one bit field in the specific vector friendly instruction format 2500, the disclosure is not so limited (that is, the generic vector friendly instruction format 2400 contemplates other sizes of the data element width field 2464).

The generic vector friendly instruction format 2400 includes the following fields listed below in the order illustrated in FIG. 25A.

EVEX Prefix (Bytes 0-3) 2502—is encoded in a four-byte form.

Format Field 2440 (EVEX Byte 0, bits [7:0]) —the first byte (EVEX Byte 0) is the format field 2440 and it contains 0x62 (the unique value used for distinguishing the vector friendly instruction format in one embodiment of the disclosure).

The second-fourth bytes (EVEX Bytes 1-3) include a number of bit fields providing specific capability.

REX field 2505 (EVEX Byte 1, bits [7-5]) —consists of an EVEX.R bit field (EVEX Byte 1, bit [7]-R), EVEX.X bit field (EVEX byte 1, bit [6]-X), and 2457BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2410—this is the first part of the REX' field 2410 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2515 (EVEX byte 1, bits [3:0]-mmmm) —its content encodes an implied leading opcode byte (0F, 0F 38, or 0F 3).

Data element width field 2464 (EVEX byte 2, bit [7]-W) —is represented by the notation EVEX.W. EVEX.W is used to define the granularity (size) of the datatype (either 32-bit data elements or 64-bit data elements).

EVEX.vvvv 2520 (EVEX Byte 2, bits [6:3]-vvvv) —the role of EVEX.vvvv may include the following: 1)

EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 2520 encodes the 4 low-order bits of the first source register specifier stored in inverted (1s complement) form. Depending on the instruction, an extra different EVEX bit field is used to extend the specifier size to 32 registers.

EVEX.U 2468 Class field (EVEX byte 2, bit [2]-U) —If EVEX.U=0, it indicates class A or EVEX.U0; if EVEX.U=1, it indicates class B or EVEX.U1.

Prefix encoding field 2525 (EVEX byte 2, bits [1:0]-pp) —provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2452 (EVEX byte 3, bit [7]-EH; also known as EVEX.EH, EVEX.rs, EVEX.RL, EVEX.write mask control, and EVEX.N; also illustrated with α) —as previously described, this field is context specific.

Beta field 2454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ) —as previously described, this field is context specific.

REX' field 2410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2470 (EVEX byte 3, bits [2:0]-kkk) —its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 2530 (Byte 4) is also known as the opcode byte. Part of the opcode is specified in this field.

MOD R/M Field 2540 (Byte 5) includes MOD field 2542, Reg field 2544, and R/M field 2546. As previously described, the MOD field's 2542 content distinguishes between memory access and non-memory access operations. The role of Reg field 2544 can be summarized to two situations: encoding either the destination register operand or a source register operand, or be treated as an opcode extension and not used to encode any instruction operand. The role of R/M field 2546 may include the following: encoding the instruction operand that references a memory address, or encoding either the destination register operand or a source register operand.

Scale, Index, Base (SIB) Byte (Byte 6) —As previously described, the scale field's 2450 content is used for memory address generation. SIB.xxx 2554 and SIB.bbb 2556—the contents of these fields have been previously referred to with regard to the register indexes Xxxx and Bbbb.

Displacement field 2462A (Bytes 7-10) —when MOD field 2542 contains 10, bytes 7-10 are the displacement field 2462A, and it works the same as the legacy 32-bit displacement (disp32) and works at byte granularity.

Displacement factor field 2462B (Byte 7) —when MOD field 2542 contains 01, byte 7 is the displacement factor field 2462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2462B is a reinterpretation of disp8; when using displacement factor field 2462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2462B substitutes the legacy x86 instruction set 8-bit displacement. Thus, the displacement factor field 2462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2472 operates as previously described.

Full Opcode Field

FIG. 25B is a block diagram illustrating the fields of the specific vector friendly instruction format 2500 that make up the full opcode field 2474 according to one embodiment of the disclosure. Specifically, the full opcode field 2474 includes the format field 2440, the base operation field 2442, and the data element width (W) field 2464. The base operation field 2442 includes the prefix encoding field 2525, the opcode map field 2515, and the real opcode field 2530.

Register Index Field

FIG. 25C is a block diagram illustrating the fields of the specific vector friendly instruction format 2500 that make up the register index field 2444 according to one embodiment of the disclosure. Specifically, the register index field 2444 includes the REX field 2505, the REX' field 2510, the MODR/M.reg field 2544, the MODR/M.r/m field 2546, the VVVV field 2520, xxx field 2554, and the bbb field 2556.

Augmentation Operation Field

Figure 25D:
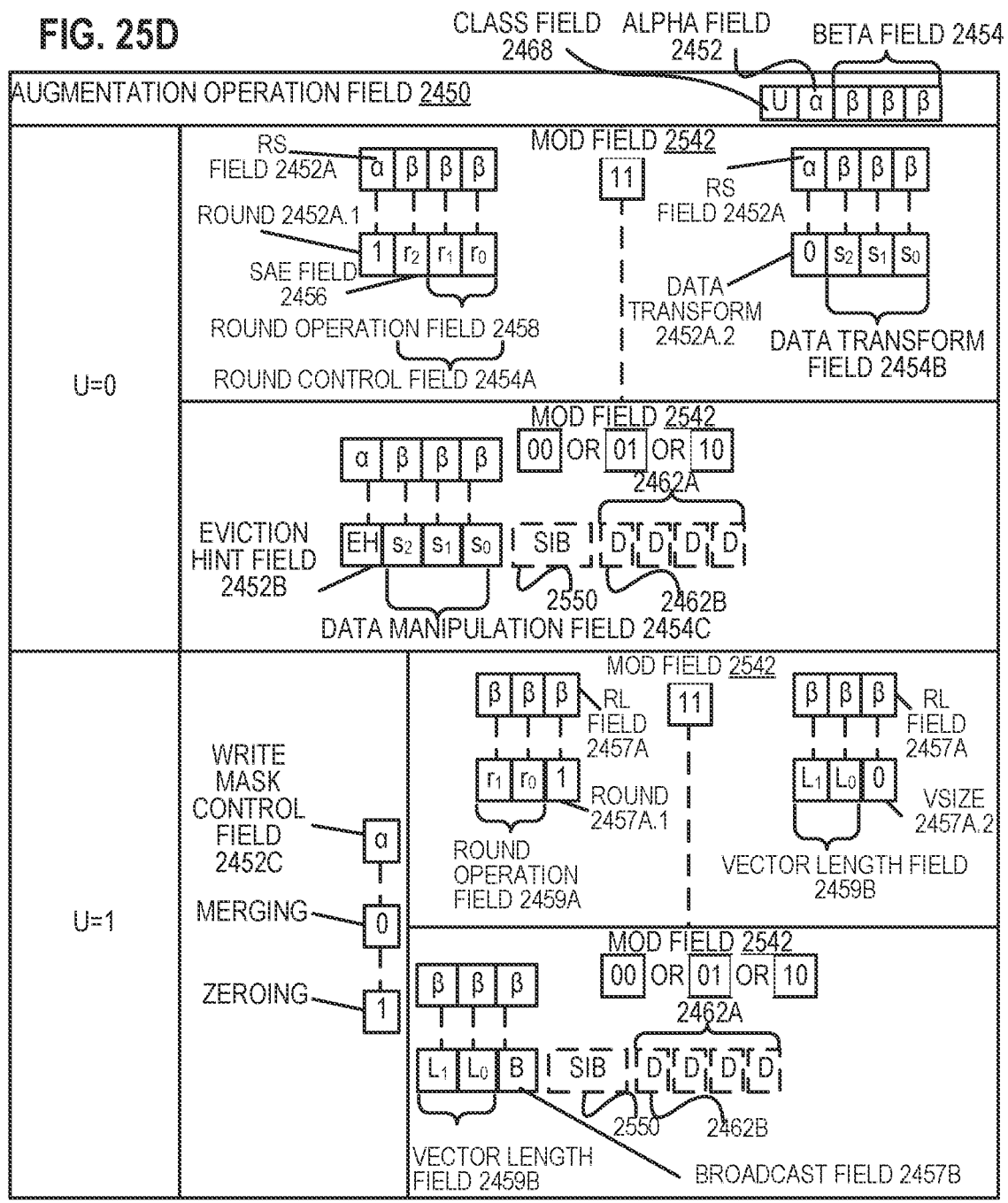
FIG. 25D is a block diagram illustrating the fields of the specific vector friendly instruction format in FIG. 25A that make up the augmentation operation field 2450 according to one embodiment of the disclosure.

FIG. 25D is a block diagram illustrating the fields of the specific vector friendly instruction format 2500 that make up the augmentation operation field 2450 according to one embodiment of the disclosure. When the class (U) field 2468 contains 0, it signifies EVEX.U0 (class A 2468A); when it contains 1, it signifies EVEX.U1 (class B 2468B). When U=0 and the MOD field 2542 contains 11 (signifying a no memory access operation), the alpha field 2452 (EVEX byte 3, bit [7]-EH) is interpreted as the rs field 2452A. When the rs field 2452A contains a 1 (round 2452A.1), the beta field 2454 (EVEX byte 3, bits [6:4]-SSS) is interpreted as the round control field 2454A. The round control field 2454A includes a one bit SAE field 2456 and a two bit round operation field 2458. When the rs field 2452A contains a 0 (data transform 2452A.2), the beta field 2454 (EVEX byte 3, bits [6:4]-SSS) is interpreted as a three bit data transform field 2454B. When U=0 and the MOD field 2542 contains 00, 01, or 10 (signifying a memory access operation), the alpha field 2452 (EVEX byte 3, bit [7]-EH) is interpreted as the eviction hint (EH) field 2452B and the beta field 2454 (EVEX byte 3, bits [6:4]-SSS) is interpreted as a three bit data manipulation field 2454C.

When U=1, the alpha field 2452 (EVEX byte 3, bit [7]-EH) is interpreted as the write mask control (Z) field 2452C. When U=1 and the MOD field 2542 contains 11 (signifying a no memory access operation), part of the beta field 2454 (EVEX byte 3, bit [4]-$S_0$) is interpreted as the RL field 2457A; when it contains a 1 (round 2457A.1) the rest of the beta field 2454 (EVEX byte 3, bit [6-5]-$S_{2-1}$) is interpreted as the round operation field 2459A, while when the RL field 2457A contains a 0 (VSIZE 2457.A2) the rest of the beta field 2454 (EVEX byte 3, bit [6-5]-$S_{2-1}$) is interpreted as the vector length field 2459B (EVEX byte 3, bit [6-5]-$L_{1-0}$). When U=1 and the MOD field 2542 contains 00, 01, or 10 (signifying a memory access operation), the beta field 2454 (EVEX byte 3, bits [6:4]-SSS) is interpreted as the vector length field 2459B (EVEX byte 3, bit [6-5]-$L_{1-0}$) and the broadcast field 2457B (EVEX byte 3, bit [4]-B).

Exemplary Register Architecture

Figure 26:
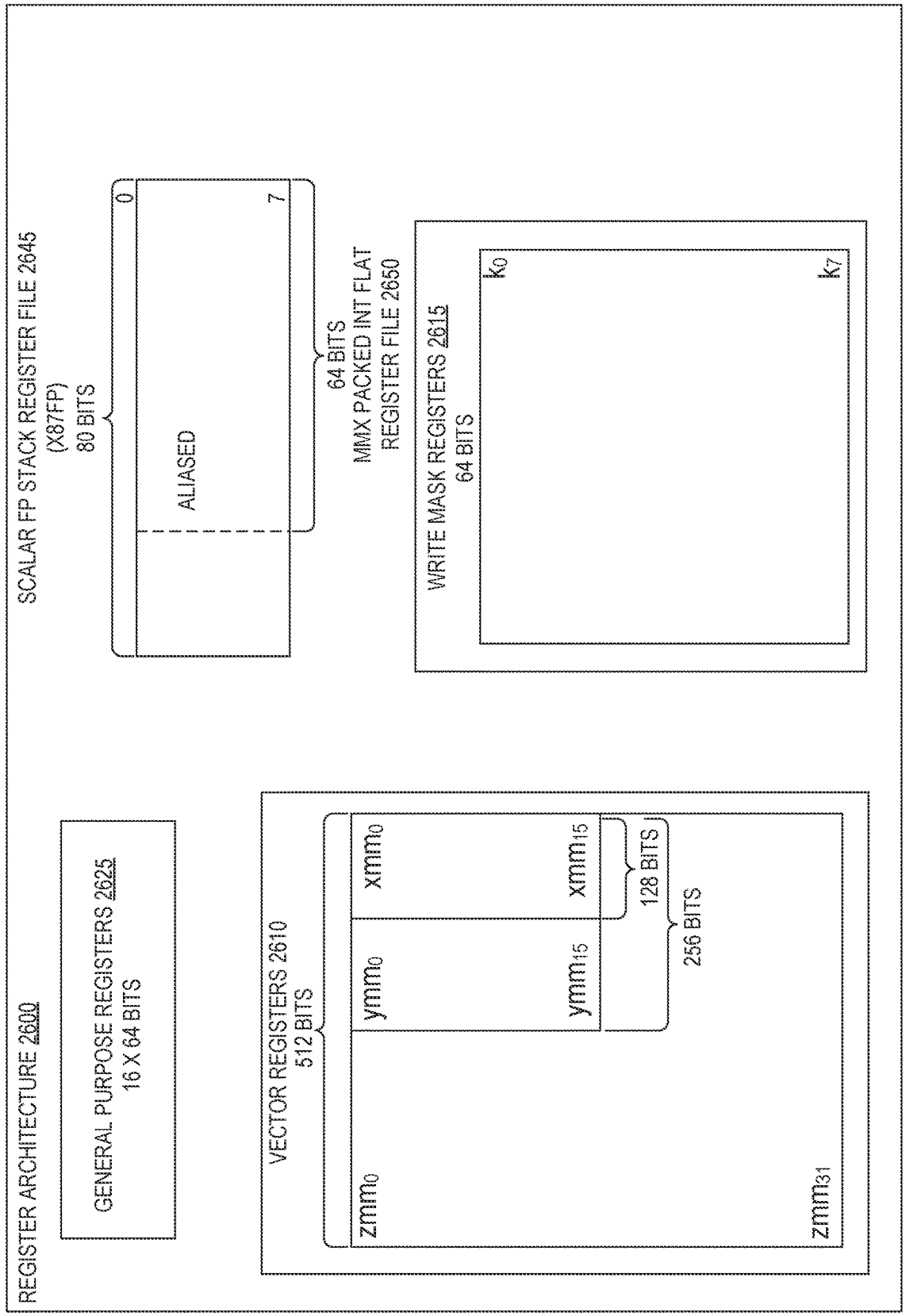
FIG. 26 is a block diagram of a register architecture according to one embodiment of the disclosure

FIG. 26 is a block diagram of a register architecture 2600 according to one embodiment of the disclosure. In the embodiment illustrated, there are 32 vector registers 2610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2500 operates on these overlaid register file as illustrated in the below tables.

| Adjustable Vector Length | Class | Operations | Registers |
|---|---|---|---|
| Instruction Templates that do not include the vector length field 2459B | A (FIG. 24A; U = 0) | 2410, 2415, 2425, 2430 | zmm registers (the vector length is 64 byte) |
| | B (FIG. 24B; U = 1) | 2412 | zmm registers (the vector length is 64 byte) |
| Instruction templates that do include the vector length field 2459B | B (FIG. 24B; U = 1) | 2417, 2427 | zmm, ymm, or xmm registers (the vector length is 64 byte, 32 byte, or 16 byte) depending on the vector length field 2459B |

In other words, the vector length field 2459B selects between a maximum length and one or more other shorter lengths, where each such shorter length is half the length of the preceding length; and instructions templates without the vector length field 2459B operate on the maximum vector length. Further, in one embodiment, the class B instruction templates of the specific vector friendly instruction format 2500 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 2615—in the embodiment illustrated, there are 8 write mask registers (k0 through k7), each 64 bits in size. In an alternate embodiment, the write mask registers 2615 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 2625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2645, on which is aliased the MMX packed integer flat register file 2650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 27A is a block diagram illustrating both an exemplary in-order pipeline and an exemplary register renaming, out-of-order issue/execution pipeline according to embodiments of the disclosure. FIG. 27B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 27A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 27A, a processor pipeline 2700 includes a fetch stage 2702, a length decode stage 2704, a decode stage 2706, an allocation stage 2708, a renaming stage 2710, a scheduling (also known as a dispatch or issue) stage 2712, a register read/memory read stage 2714, an execute stage 2716, a write back/memory write stage 2718, an exception handling stage 2722, and a commit stage 2724.

FIG. 27B shows processor core 2790 including a front end unit 2730 coupled to an execution engine unit 2750, and both are coupled to a memory unit 2770. The core 2790 may be a reduced instruction set computing (RISC) core, a complex instruction set computing (CISC) core, a very long instruction word (VLIW) core, or a hybrid or alternative core type. As yet another option, the core 2790 may be a special-purpose core, such as, for example, a network or communication core, compression engine, coprocessor core, general purpose computing graphics processing unit (GPGPU) core, graphics core, or the like.

The front end unit 2730 includes a branch prediction unit 2732 coupled to an instruction cache unit 2734, which is coupled to an instruction translation lookaside buffer (TLB) 2736, which is coupled to an instruction fetch unit 2738, which is coupled to a decode unit 2740. The decode unit 2740 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2790 includes a microcode ROM or other medium that stores microcode for certain macro-instructions (e.g., in decode unit 2740 or otherwise within the front end unit 2730). The decode unit 2740 is coupled to a rename/allocator unit 2752 in the execution engine unit 2750.

The execution engine unit 2750 includes the rename/allocator unit 2752 coupled to a retirement unit 2754 and a set of one or more scheduler unit(s) 2756. The scheduler unit(s) 2756 represents any number of different schedulers, including reservations stations, central instruction window, etc. The scheduler unit(s) 2756 is coupled to the physical register file(s) unit(s) 2758. Each of the physical register file(s) units 2758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2758 comprises a vector registers unit, a write mask registers unit, and a scalar registers unit. These register units may provide architectural vector registers, vector mask registers, and general purpose registers. The physical register file(s) unit(s) 2758 is overlapped by the retirement unit 2754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2754 and the physical register file(s) unit(s) 2758 are coupled to the execution cluster(s) 2760. The execution cluster(s) 2760 includes a set of one or more execution units 2762 (e.g., execution circuits) and a set of one or more memory access units 2764. The execution units 2762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2756, physical register file(s) unit(s) 2758, and execution cluster(s) 2760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2764). It should also be understood that where separate pipelines are used, one or more of these pipelines may be out-of-order issue/execution and the rest in-order.

The set of memory access units 2764 is coupled to the memory unit 2770, which includes a data TLB unit 2772 coupled to a data cache unit 2774 coupled to a level 2 (L2) cache unit 2776. In one exemplary embodiment, the memory access units 2764 may include a load unit, a store address unit, and a store data unit, each of which is coupled to the data TLB unit 2772 in the memory unit 2770. The instruction cache unit 2734 is further coupled to a level 2 (L2) cache unit 2776 in the memory unit 2770. The L2 cache unit 2776 is coupled to one or more other levels of cache and eventually to a main memory.

By way of example, the exemplary register renaming, out-of-order issue/execution core architecture may implement the pipeline 2700 as follows: 1) the instruction fetch 2738 performs the fetch and length decoding stages 2702 and 2704; 2) the decode unit 2740 performs the decode stage 2706; 3) the rename/allocator unit 2752 performs the allocation stage 2708 and renaming stage 2710; 4) the scheduler unit(s) 2756 performs the schedule stage 2712; 5) the physical register file(s) unit(s) 2758 and the memory unit 2770 perform the register read/memory read stage 2714; the execution cluster 2760 perform the execute stage 2716; 6) the memory unit 2770 and the physical register file(s) unit(s) 2758 perform the write back/memory write stage 2718; 7) various units may be involved in the exception handling stage 2722; and 8) the retirement unit 2754 and the physical register file(s) unit(s) 2758 perform the commit stage 2724.

The core 2790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 2790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 2734/2774 and a shared L2 cache unit 2776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 28B:
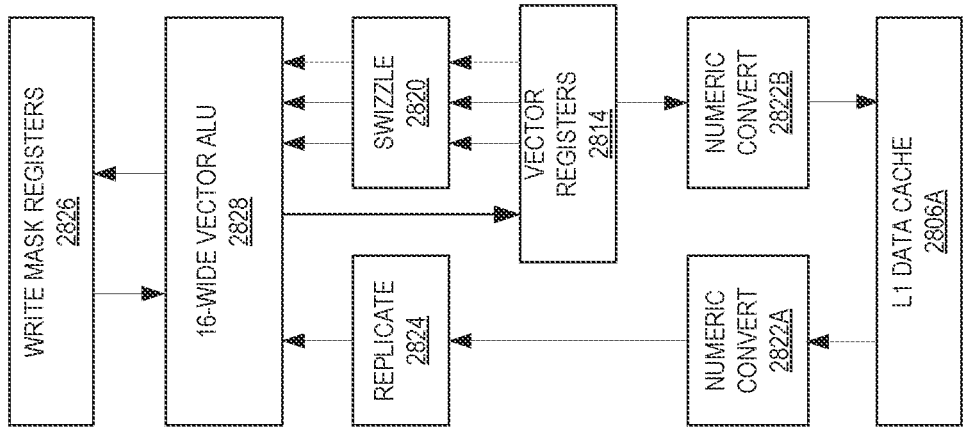
FIG. 28B is an expanded view of part of the processor core in FIG. 28A according to embodiments of the disclosure.
Figure 28A:
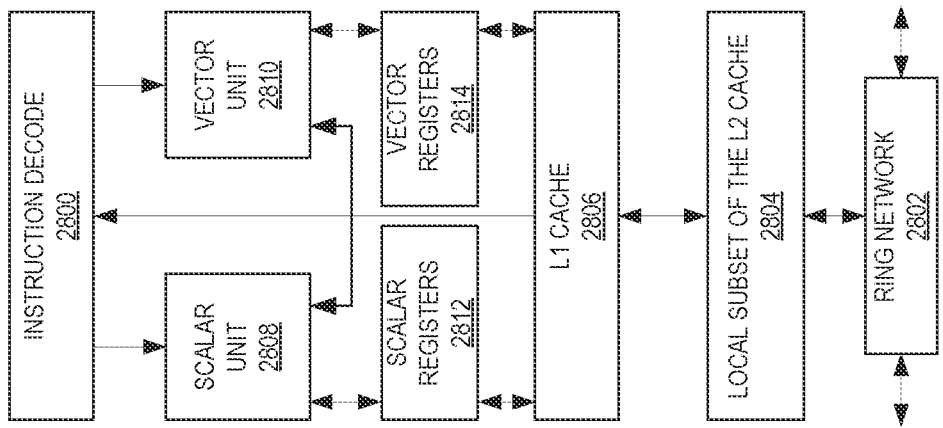
FIG. 28A is a block diagram of a single processor core, along with its connection to the on-die interconnect network and with its local subset of the Level 2 (L2) cache, according to embodiments of the disclosure.

FIGS. 28A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 28A is a block diagram of a single processor core, along with its connection to the on-die interconnect network 2802 and with its local subset of the Level 2 (L2) cache 2804, according to embodiments of the disclosure. In one embodiment, an instruction decode unit 2800 supports the x86 instruction set with a packed data instruction set extension. An L1 cache 2806 allows low-latency accesses to cache memory into the scalar and vector units. While in one embodiment (to simplify the design), a scalar unit 2808 and a vector unit 2810 use separate register sets (respectively, scalar registers 2812 and vector registers 2814) and data transferred between them is written to memory and then read back in from a level 1 (L1) cache 2806, alternative embodiments of the disclosure may use a different approach (e.g., use a single register set or include a communication path that allow data to be transferred between the two register files without being written and read back).

The local subset of the L2 cache 2804 is part of a global L2 cache that is divided into separate local subsets, one per processor core. Each processor core has a direct access path to its own local subset of the L2 cache 2804. Data read by a processor core is stored in its L2 cache subset 2804 and can be accessed quickly, in parallel with other processor cores accessing their own local L2 cache subsets. Data written by a processor core is stored in its own L2 cache subset 2804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 28B is an expanded view of part of the processor core in FIG. 28A according to embodiments of the disclosure. FIG. 28B includes an L1 data cache 2806A part of the L1 cache 2804, as well as more detail regarding the vector unit 2810 and the vector registers 2814. Specifically, the vector unit 2810 is a 16-wide vector processing unit (VPU) (see the 16-wide ALU 2828), which executes one or more of integer, single-precision float, and double-precision float instructions. The VPU supports swizzling the register inputs with swizzle unit 2820, numeric conversion with numeric convert units 2822A-B, and replication with replication unit 2824 on the memory input. Write mask registers 2826 allow predicating resulting vector writes.

Figure 29:
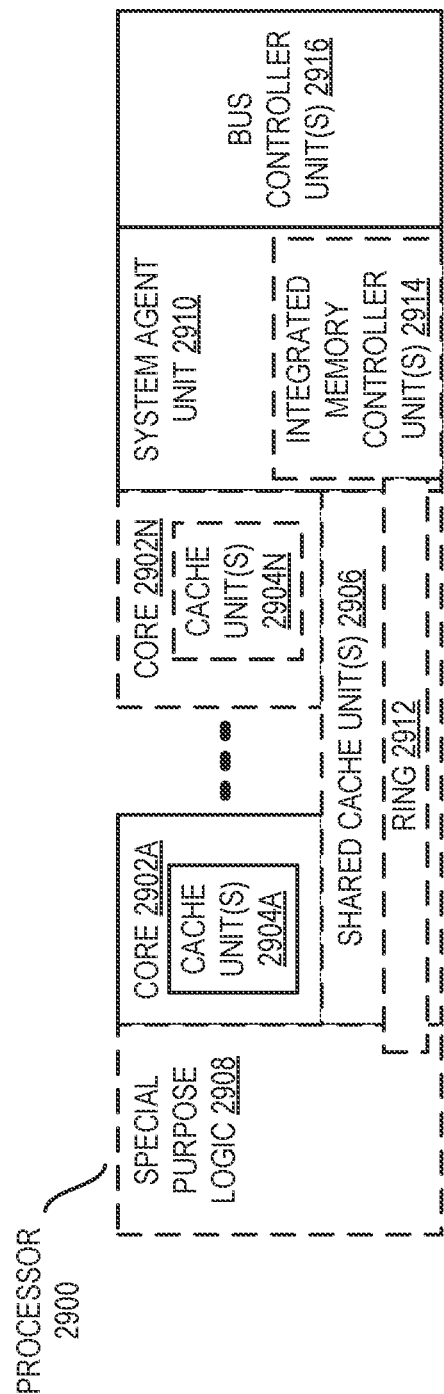
FIG. 29 is a block diagram of a processor that may have more than one core, may have an integrated memory controller, and may have integrated graphics according to embodiments of the disclosure.

FIG. 29 is a block diagram of a processor 2900 that may have more than one core, may have an integrated memory controller, and may have integrated graphics according to embodiments of the disclosure. The solid lined boxes in FIG. 29 illustrate a processor 2900 with a single core 2902A, a system agent 2910, a set of one or more bus controller units 2916, while the optional addition of the dashed lined boxes illustrates an alternative processor 2900 with multiple cores 2902A-N, a set of one or more integrated memory controller unit(s) 2914 in the system agent unit 2910, and special purpose logic 2908.

Thus, different implementations of the processor 2900 may include: 1) a CPU with the special purpose logic 2908 being integrated graphics and/or scientific (throughput) logic (which may include one or more cores), and the cores 2902A-N being one or more general purpose cores (e.g., general purpose in-order cores, general purpose out-of-order cores, a combination of the two); 2) a coprocessor with the cores 2902A-N being a large number of special purpose cores intended primarily for graphics and/or scientific (throughput); and 3) a coprocessor with the cores 2902A-N being a large number of general purpose in-order cores. Thus, the processor 2900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2906, and external memory (not shown) coupled to the set of integrated memory controller units 2914. The set of shared cache units 2906 may include one or more mid-level caches, such as level 2 (L2), level 3 (L3), level 4 (L4), or other levels of cache, a last level cache (LLC), and/or combinations thereof. While in one embodiment a ring based interconnect unit 2912 interconnects the integrated graphics logic 2908, the set of shared cache units 2906, and the system agent unit 2910/integrated memory controller unit(s) 2914, alternative embodiments may use any number of well-known techniques for interconnecting such units. In one embodiment, coherency is maintained between one or more cache units 2906 and cores 2902-A-N.

In some embodiments, one or more of the cores 2902A-N are capable of multithreading. The system agent 2910 includes those components coordinating and operating cores 2902A-N. The system agent unit 2910 may include for example a power control unit (PCU) and a display unit. The PCU may be or include logic and components needed for regulating the power state of the cores 2902A-N and the integrated graphics logic 2908. The display unit is for driving one or more externally connected displays.

The cores 2902A-N may be homogenous or heterogeneous in terms of architecture instruction set; that is, two or more of the cores 2902A-N may be capable of execution the same instruction set, while others may be capable of executing only a subset of that instruction set or a different instruction set.

Exemplary Computer Architectures

FIGS. 30-33 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 30:
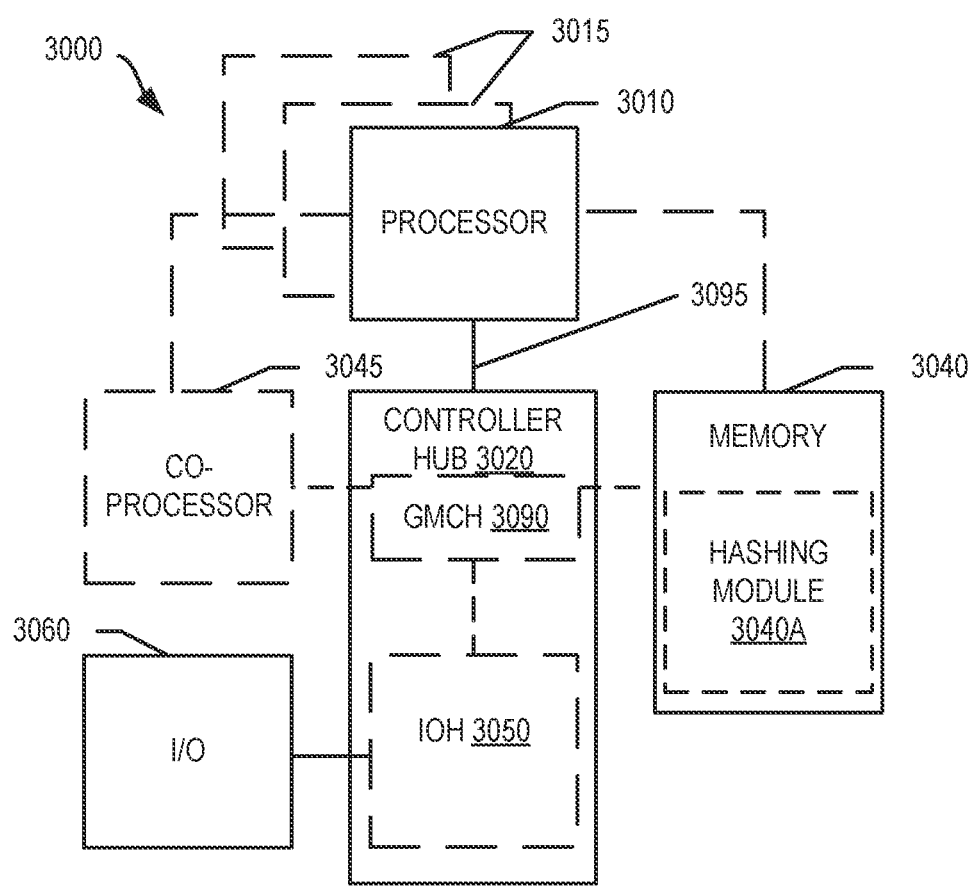
FIG. 30 is a block diagram of a system in accordance with one embodiment of the present disclosure.

Referring now to FIG. 30, shown is a block diagram of a system 3000 in accordance with one embodiment of the present disclosure. The system 3000 may include one or more processors 3010, 3015, which are coupled to a controller hub 3020. In one embodiment the controller hub 3020 includes a graphics memory controller hub (GMCH) 3090 and an Input/Output Hub (IOH) 3050 (which may be on separate chips); the GMCH 3090 includes memory and graphics controllers to which are coupled memory 3040 and a coprocessor 3045; the IOH 3050 is couples input/output (I/O) devices 3060 to the GMCH 3090. Alternatively, one or both of the memory and graphics controllers are integrated within the processor (as described herein), the memory 3040 and the coprocessor 3045 are coupled directly to the processor 3010, and the controller hub 3020 in a single chip with the IOH 3050. Memory 3040 may include a hashing module 3040A, for example, to store code that when executed causes a processor to perform any method of this disclosure.

The optional nature of additional processors 3015 is denoted in FIG. 30 with broken lines. Each processor 3010, 3015 may include one or more of the processing cores described herein and may be some version of the processor 2900.

The memory 3040 may be, for example, dynamic random access memory (DRAM), phase change memory (PCM), or a combination of the two. For at least one embodiment, the controller hub 3020 communicates with the processor(s) 3010, 3015 via a multi-drop bus, such as a frontside bus (FSB), point-to-point interface such as Quickpath Interconnect (QPI), or similar connection 3095.

In one embodiment, the coprocessor 3045 is a special-purpose processor, such as, for example, a high-throughput MIC processor, a network or communication processor, compression engine, graphics processor, GPGPU, embedded processor, or the like. In one embodiment, controller hub 3020 may include an integrated graphics accelerator.

There can be a variety of differences between the physical resources 3010, 3015 in terms of a spectrum of metrics of merit including architectural, microarchitectural, thermal, power consumption characteristics, and the like.

In one embodiment, the processor 3010 executes instructions that control data processing operations of a general type. Embedded within the instructions may be coprocessor instructions. The processor 3010 recognizes these coprocessor instructions as being of a type that should be executed by the attached coprocessor 3045. Accordingly, the processor 3010 issues these coprocessor instructions (or control signals representing coprocessor instructions) on a coprocessor bus or other interconnect, to coprocessor 3045. Coprocessor(s) 3045 accept and execute the received coprocessor instructions.

Figure 31:
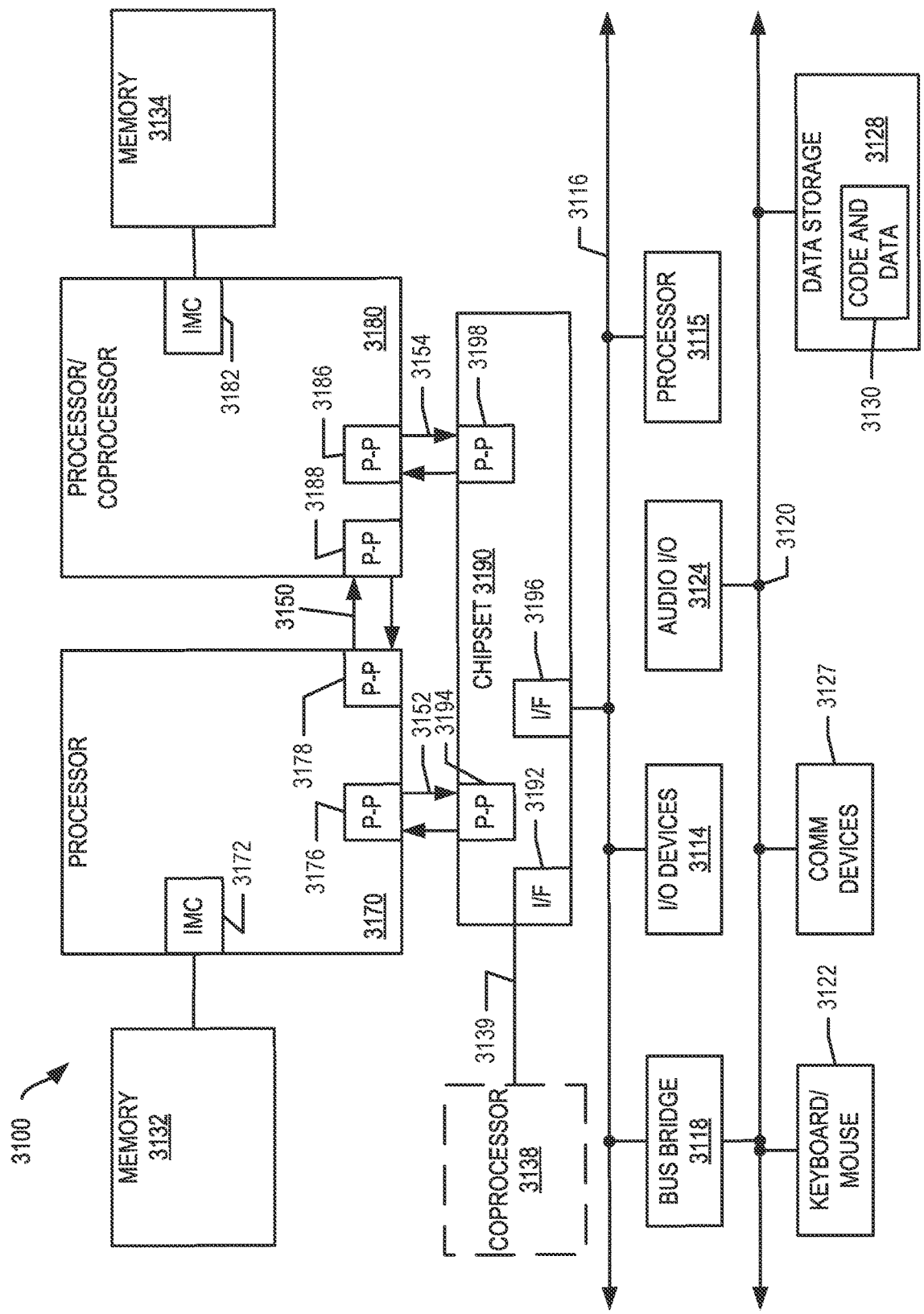
FIG. 31 is a block diagram of a more specific exemplary system in accordance with an embodiment of the present disclosure.

Referring now to FIG. 31, shown is a block diagram of a first more specific exemplary system 3100 in accordance with an embodiment of the present disclosure. As shown in FIG. 31, multiprocessor system 3100 is a point-to-point interconnect system, and includes a first processor 3170 and a second processor 3180 coupled via a point-to-point interconnect 3150. Each of processors 3170 and 3180 may be some version of the processor 2900. In one embodiment of the disclosure, processors 3170 and 3180 are respectively processors 3010 and 3015, while coprocessor 3138 is coprocessor 3045. In another embodiment, processors 3170 and 3180 are respectively processor 3010 coprocessor 3045.

Processors 3170 and 3180 are shown including integrated memory controller (IMC) units 3172 and 3182, respectively. Processor 3170 also includes as part of its bus controller units point-to-point (P-P) interfaces 3176 and 3178; similarly, second processor 3180 includes P-P interfaces 3186 and 3188. Processors 3170, 3180 may exchange information via a point-to-point (P-P) interface 3150 using P-P interface circuits 3178, 3188. As shown in FIG. 31, IMCs 3172 and 3182 couple the processors to respective memories, namely a memory 3132 and a memory 3134, which may be portions of main memory locally attached to the respective processors.

Processors 3170, 3180 may each exchange information with a chipset 3190 via individual P-P interfaces 3152, 3154 using point to point interface circuits 3176, 3194, 3186, 3198. Chipset 3190 may optionally exchange information with the coprocessor 3138 via a high-performance interface 3139. In one embodiment, the coprocessor 3138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3190 may be coupled to a first bus 3116 via an interface 3196. In one embodiment, first bus 3116 may be a Peripheral Component Interconnect (PCI) bus, or a bus such as a PCI Express bus or another third generation I/O interconnect bus, although the scope of the present disclosure is not so limited.

As shown in FIG. 31, various I/O devices 3114 may be coupled to first bus 3116, along with a bus bridge 3118 which couples first bus 3116 to a second bus 3120. In one embodiment, one or more additional processor(s) 3115, such as coprocessors, high-throughput MIC processors, GPGPU's, accelerators (such as, e.g., graphics accelerators or digital signal processing (DSP) units), field programmable gate arrays, or any other processor, are coupled to first bus 3116. In one embodiment, second bus 3120 may be a low pin count (LPC) bus. Various devices may be coupled to a second bus 3120 including, for example, a keyboard and/or mouse 3122, communication devices 3127 and a storage unit 3128 such as a disk drive or other mass storage device which may include instructions/code and data 3130, in one embodiment. Further, an audio I/O 3124 may be coupled to the second bus 3120. Note that other architectures are possible. For example, instead of the point-to-point architecture of FIG. 31, a system may implement a multi-drop bus or other such architecture.

Figure 32:
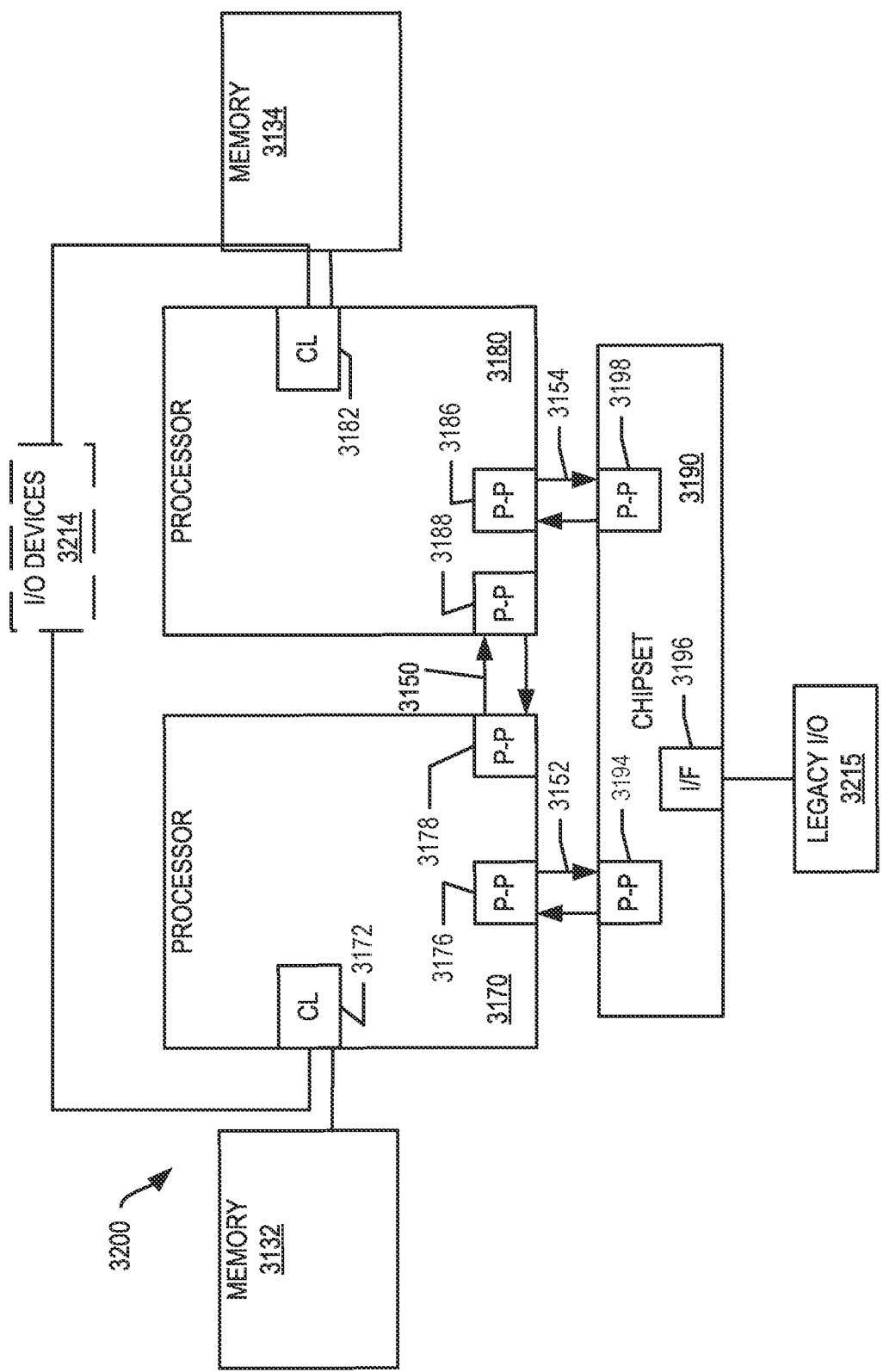
FIG. 32 is a block diagram of a second more specific exemplary system in accordance with an embodiment of the present disclosure.

Referring now to FIG. 32, shown is a block diagram of a second more specific exemplary system 3200 in accordance with an embodiment of the present disclosure. Like elements in FIGS. 31 and 32 bear like reference numerals, and certain aspects of FIG. 31 have been omitted from FIG. 32 in order to avoid obscuring other aspects of FIG. 32.

FIG. 32 illustrates that the processors 3170, 3180 may include integrated memory and I/O control logic ("CL") 3172 and 3182, respectively. Thus, the CL 3172, 3182 include integrated memory controller units and include I/O control logic. FIG. 32 illustrates that not only are the memories 3132, 3134 coupled to the CL 3172, 3182, but also that I/O devices 3214 are also coupled to the control logic 3172, 3182. Legacy I/O devices 3215 are coupled to the chipset 3190.

Figure 33:
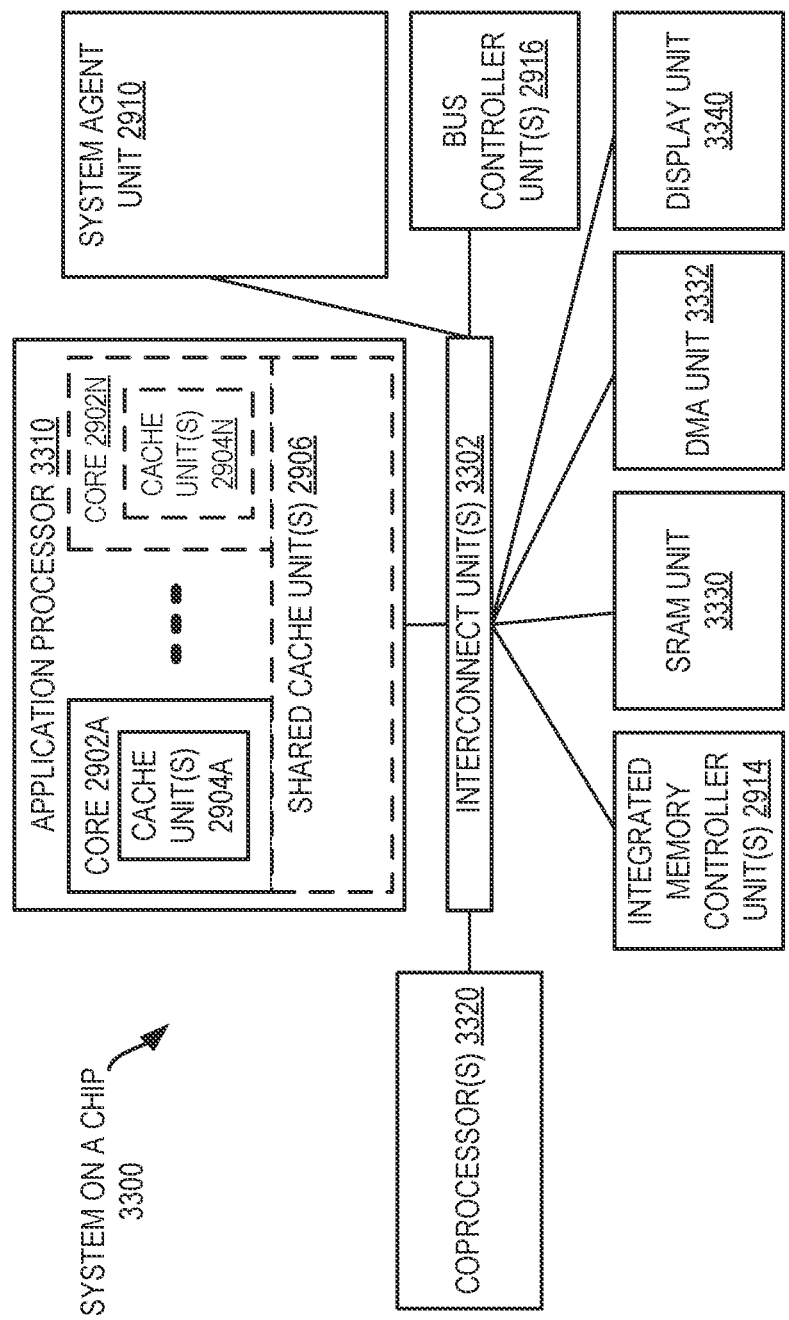
FIG. 33 is a block diagram of a system on a chip (SoC) in accordance with an embodiment of the present disclosure.

Referring now to FIG. 33, shown is a block diagram of a SoC 3300 in accordance with an embodiment of the present disclosure. Similar elements in FIG. 29 bear like reference numerals. Also, dashed lined boxes are optional features on more advanced SoCs. In FIG. 33, an interconnect unit(s) 3302 is coupled to: an application processor 3310 which includes a set of one or more cores 202A-N and shared cache unit(s) 2906; a system agent unit 2910; a bus controller unit(s) 2916; an integrated memory controller unit(s) 2914; a set or one or more coprocessors 3320 which may include integrated graphics logic, an image processor, an audio processor, and a video processor; a static random access memory (SRAM) unit 3330; a direct memory access (DMA) unit 3332; and a display unit 3340 for coupling to one or more external displays. In one embodiment, the coprocessor(s) 3320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 3130 illustrated in FIG. 31, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 34:
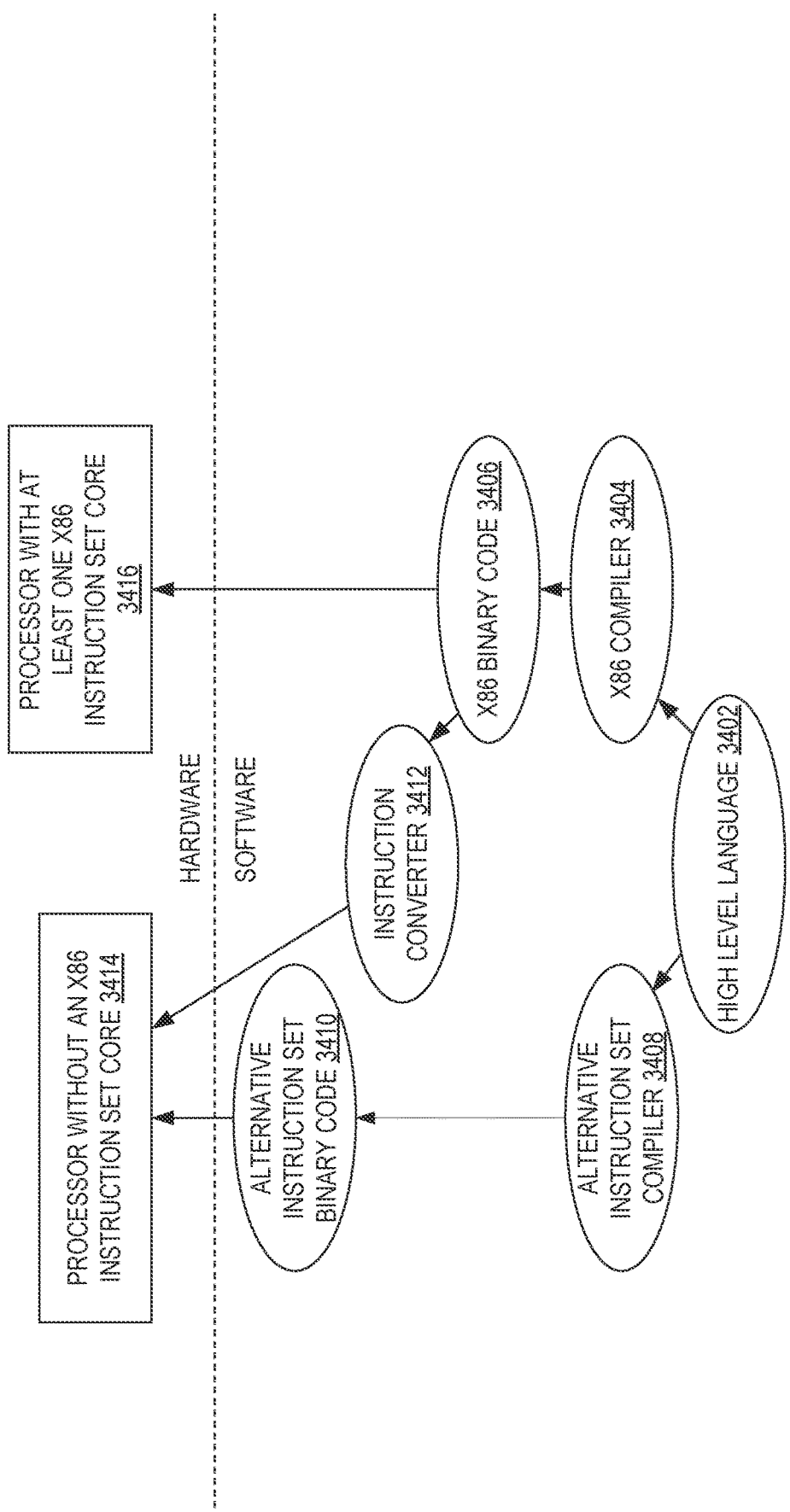
FIG. 34 is a block diagram contrasting the use of a software instruction converter to convert binary instructions in a source instruction set to binary instructions in a target instruction set according to embodiments of the disclosure.

FIG. 34 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 34 shows a program in a high level language 3402 may be compiled using an x86 compiler 3404 to generate x86 binary code 3406 that may be natively executed by a processor with at least one x86 instruction set core 3416. The processor with at least one x86 instruction set core 3416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 3404 represents a compiler that is operable to generate x86 binary code 3406 (e.g., object code) that can, with or without additional linkage processing, be executed on the processor with at least one x86 instruction set core 3416. Similarly, FIG. 34 shows the program in the high level language 3402 may be compiled using an alternative instruction set compiler 3408 to generate alternative instruction set binary code 3410 that may be natively executed by a processor without at least one x86 instruction set core 3414 (e.g., a processor with cores that execute the MIPS instruction set of MIPS Technologies of Sunnyvale, CA and/or that execute the ARM instruction set of ARM Holdings of Sunnyvale, CA). The instruction converter 3412 is used to convert the x86 binary code 3406 into code that may be natively executed by the processor without an x86 instruction set core 3414. This converted code is not likely to be the same as the alternative instruction set binary code 3410 because an instruction converter capable of this is difficult to make; however, the converted code will accomplish the general operation and be made up of instructions from the alternative instruction set. Thus, the instruction converter 3412 represents software, firmware, hardware, or a combination thereof that, through emulation, simulation or any other process, allows a processor or other electronic device that does not have an x86 instruction set processor or core to execute the x86 binary code 3406.

What is claimed is:

1. A processor comprising:
   a fetch circuit to fetch a single instruction, the single instruction having at least one first field to identify eight 32-bit state elements A, B, C, D, E, F, G, and H for a round according to an SM3 hash function and at least one second field to identify an input message;
   a decode circuit to decode the single instruction; and
   an execution circuit to perform operations corresponding to the single instruction, including to:
   rotate the state element C left by 9 bits to form a rotated state element C,
   rotate the state element D left by 9 bits to form a rotated state element D,
   rotate the state element G left by 19 bits to form a rotated state element G,
   rotate the state element H left by 19 bits to form a rotated state element H,
   perform two rounds according to the SM3 hash function on the input message and the state element A, the state element B, the rotated state element C, the rotated state element D, the state element E, the state element F, the rotated state element G, and the rotated state element H to generate an updated state element A, an updated state element B, an updated state element E, and an updated state element F, and
   store the updated state element A, the updated state element B, the updated state element E, and the updated state element F to a location specified by the single instruction.

2. The processor of claim 1, wherein the at least one first field includes:
- a first field to identify a first register that is to store the state elements C, D, G, and H, and a second field to identify a second register that is to store the state elements A, B, E, and F.

3. The processor of claim 2, wherein the at least one second field includes a third field to identify the input message.

4. The processor of claim 2, wherein the location specified by the single instruction to store the updated state element A, the updated state element B, the updated state element E, and the updated state element F is the first register.

5. The processor of claim 1, wherein the state elements A, B, E, and F are to be stored in a first 128-bit register.

6. The processor of claim 5, wherein the state element A is to be stored in a least significant doubleword data element position of the first 128-bit register.

7. The processor of claim 6, wherein the state elements C, D, G, and H are to be stored in a second 128-bit register.

8. The processor of claim 7, wherein the state element C is to be stored in a least significant doubleword data element position of the second 128-bit register.

9. A method comprising:
- fetching, by a fetch circuit, a single instruction, the single instruction having at least one first field to identify eight 32-bit state elements A, B, C, D, E, F, G, and H for a round according to an SM3 hash function and at least one second field to identify an input message;
- decoding, by a decode circuit, the single instruction; and
- executing, by an execution circuit, the single instruction to perform operations comprising:
  - rotating the state element C left by 9 bits to form a rotated state element C,
  - rotating the state element D left by 9 bits to form a rotated state element D,
  - rotating the state element G left by 19 bits to form a rotated state element G,
  - rotating the state element H left by 19 bits to form a rotated state element H,
  - performing two rounds according to the SM3 hash function on the input message and the state element A, the state element B, the rotated state element C, the rotated state element D, the state element E, the state element F, the rotated state element G, and the rotated state element H to generate an updated state element A, an updated state element B, an updated state element E, and an updated state element F, and
  - storing the updated state element A, the updated state element B, the updated state element E, and the updated state element F to a location specified by the single instruction.

10. The method of claim 9, wherein the at least one first field includes:
- a first field to identify a first register that is to store the state elements C, D, G, and H, and
- a second field to identify a second register that is to store the state elements A, B, E, and F.

11. The method of claim 10, wherein the at least one second field includes a third field to identify the input message.

12. The method of claim 10, wherein the location specified by the single instruction that stores the updated state element A, the updated state element B, the updated state element E, and the updated state element F is the first register.

13. The method of claim 9, wherein the state elements A, B, E, and F are stored in a first 128-bit register.

14. The method of claim 13, wherein the state element A is stored in a least significant doubleword data element position of the first 128-bit register.

15. The method of claim 14, wherein the state elements C, D, G, and H are stored in a second 128-bit register.

16. The method of claim 15, wherein the state element C is stored in a least significant doubleword data element position of the second 128-bit register.

17. A non-transitory machine readable medium that stores code that when executed by a machine causes the machine to perform a method comprising:
- fetching, by a fetch circuit, a single instruction, the single instruction having at least one first field to identify eight 32-bit state elements A, B, C, D, E, F, G, and H for a round according to an SM3 hash function and at least one second field to identify an input message;
- decoding, by a decode circuit, the single instruction; and
- executing, by an execution circuit, the single instruction to perform operations comprising:
  - rotating the state element C left by 9 bits to form a rotated state element C,
  - rotating the state element D left by 9 bits to form a rotated state element D,
  - rotating the state element G left by 19 bits to form a rotated state element G,
  - rotating the state element H left by 19 bits to form a rotated state element H,
  - performing two rounds according to the SM3 hash function on the input message and the state element A, the state element B, the rotated state element C, the rotated state element D, the state element E, the state element F, the rotated state element G, and the rotated state element H to generate an updated state element A, an updated state element B, an updated state element E, and an updated state element F, and
  - storing the updated state element A, the updated state element B, the updated state element E, and the updated state element F to a location specified by the single instruction.

18. The non-transitory machine readable medium of claim 17, wherein the at least one first field includes:
- a first field to identify a first register that is to store the state elements C, D, G, and H, and
- a second field to identify a second register that is to store the state elements A, B, E, and F.

19. The non-transitory machine readable medium of claim 18, wherein the at least one second field includes a third field to identify the input message.

20. The non-transitory machine readable medium of claim 18, wherein the location specified by the single instruction that stores the updated state element A, the updated state element B, the updated state element E, and the updated state element F is the first register.

21. The non-transitory machine readable medium of claim 17, wherein the state elements A, B, E, and F are stored in a first 128-bit register.

22. The non-transitory machine readable medium of claim 21, wherein the state element A is stored in a least significant doubleword data element position of the first 128-bit register.

23. The non-transitory machine readable medium of claim 22, wherein the state elements C, D, G, and H are stored in a second 128-bit register.

24. The non-transitory machine readable medium of claim 23, wherein the state element C is stored in a least significant doubleword data element position of the second 128-bit register.

* * * * *